United States Patent [19]

Terminella et al.

[11] Patent Number: 5,746,043
[45] Date of Patent: May 5, 1998

[54] CONVERTIBLE FORM, FILL AND SEAL PACKAGING MACHINE AND METHOD

[75] Inventors: Emanuele Terminella; Frank Terminella; Joseph Terminella, all of Fayetteville, Ark.

[73] Assignee: Pacmac, Inc., Fayetteville, Ark.

[21] Appl. No.: 604,255

[22] Filed: Feb. 21, 1996

Related U.S. Application Data

[63] Continuation of provisional application No. 60/004,889, Oct. 6, 1995, and a continuation-in-part of Ser. No. 76,018, Jun. 14, 1993, Pat. No. 5,400,565, and a continuation-in-part of Ser. No. 410,673, Mar. 27, 1995, abandoned, which is a continuation-in-part of Ser. No. 355,933, Dec. 14, 1994, Pat. No. 5,505,037, which is a continuation of Ser. No. 905,903, Jun. 29, 1992, abandoned, said Ser. No. 76,018, is a continuation-in-part of Ser. No. 905,903.

[51] Int. Cl.$^6$ ............................................. B65B 9/00
[52] U.S. Cl. .............................. 53/451; 53/551; 53/552
[58] Field of Search ...................... 53/551, 552, 554, 53/555, 451, 452, 133.4, 139.2, 373.6

[56] References Cited

U.S. PATENT DOCUMENTS

| | | | |
|---|---|---|---|
| 2,741,079 | 4/1956 | Rausing | 53/180 |
| 2,872,762 | 2/1959 | Dreeben | 53/28 |
| 2,950,588 | 8/1960 | Gausman | 53/51 |
| 3,156,160 | 11/1964 | Meyer et al. | 92/13 |
| 3,488,915 | 1/1970 | Delestatius | 53/112 |
| 3,538,676 | 11/1970 | Runo et al. | 53/182 |
| 3,636,826 | 1/1972 | Bowen et al. | 93/59 R |
| 3,779,836 | 12/1973 | Henry et al. | 156/466 |
| 3,807,118 | 4/1974 | Pike | 53/14 |
| 4,288,965 | 9/1981 | James | 53/451 |
| 4,669,251 | 6/1987 | Inagaki | 53/385 |
| 4,693,058 | 9/1987 | Kovacs | 53/552 |
| 4,768,326 | 9/1988 | Kovacs | 53/373 |
| 4,790,126 | 12/1988 | Boeckmann | 53/451 |

(List continued on next page.)

OTHER PUBLICATIONS

Kawashima KBF–608Z and KBF–608ZW Vertical Form–Fill–Seal Packaging Machine Specification Sheet, Kawashima Packaging Machinery Ltd., Soka, Saitama 340, Japan.

Pacmac TERM–A–ZIP 9200 Vertical Form, Fill and Seal Machine One Sheet Brochure, Pacmac, Inc., Fayetteville, Arkanasas, U.S.

Package Transpack II Vertical Form/Fill/Seal Machine Brochure, Eagle Packaging Group, Oakland, California, U.S.

*Primary Examiner*—John Sipos
*Assistant Examiner*—Ed Tolan
*Attorney, Agent, or Firm*—Head, Johnson & Kachigian

[57] ABSTRACT

A convertible, vertical form, fill and seal packaging machine and method for making a variety of types and styles of bags and seals is disclosed. The machine produces durable, substantially air-tight bags at high speed and provides for the production of different size and make of bags and different amounts and types of product in the bags. The machine includes a film drive and pinch roll pair, a pair of film pull belts, and a pair of zipper drive rollers for pulling plastic film and zipper strip through the machine. The machine is convertible from one for producing reclosable edge fin seal bags to another for producing nonreclosable midline seal pillow type bags. Conversion from one to another is facilitated by having the pinch seal assembly mounted on a base plate which is releasably secured to a drawer-like device. This allows the pinch seal assembly to be pulled out of the machine, indexed 90°, and pushed back into the machine. The film pull belts are part of a self-contained pull belt unit which can be adjusted or removed from the machine, inverted and placed back into the machine. Different formers, fill tubes, and/or vertical sealing units are used to produce different types and styles of bags. The production of different size bags is facilitated by having the film drive roll, pull belts, and zipper drive rollers simultaneously driven in bag length increments by a common drive source. Also, to accommodate the production of different size bags, the machine includes a programmable control system, an optical mark sensor, and an adjustable film path length.

36 Claims, 20 Drawing Sheets

U.S. PATENT DOCUMENTS

| | | | |
|---|---|---|---|
| 4,800,707 | 1/1989 | Rabus | 53/552 |
| 4,872,360 | 10/1989 | Lew et al. | 74/110 |
| 4,874,257 | 10/1989 | Inagaki | 383/63 |
| 4,894,975 | 1/1990 | Ausnit | 53/412 |
| 4,974,395 | 12/1990 | McMahon | 53/551 |
| 4,986,054 | 1/1991 | McMahon | 53/451 |
| 5,031,386 | 7/1991 | Schneider | 53/551 |
| 5,054,270 | 10/1991 | McMahon | 53/552 |
| 5,055,152 | 10/1991 | Inagaki | 156/244.11 |
| 5,072,571 | 12/1991 | Boeckmann | 53/133.4 |
| 5,127,208 | 7/1992 | Custer et al. | 53/412 |
| 5,167,107 | 12/1992 | Terminella et al. | 53/551 |
| 5,185,909 | 2/1993 | Inagaki | 24/587 |
| 5,241,804 | 9/1993 | Tsuruta et al. | 53/504 |
| 5,279,098 | 1/1994 | Fukuda | 53/451 |
| 5,369,941 | 12/1994 | Rapparini | 53/546 |
| 5,377,474 | 1/1995 | Kovacs et al. | 53/64 |
| 5,400,565 | 3/1995 | Terminella et al. | 53/133.4 |
| 5,417,035 | 5/1995 | English | 53/412 |
| 5,505,037 | 4/1996 | Terminella et al. | 53/133.4 |
| 5,537,798 | 7/1996 | Fukuda et al. | 53/451 |
| B1 4,288,965 | 3/1985 | James | 53/451 |

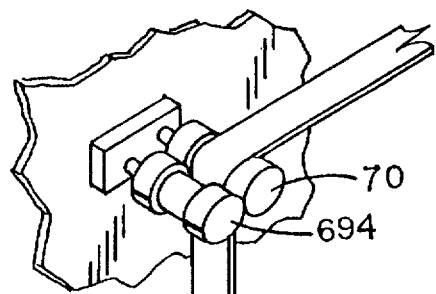
FIG. 13
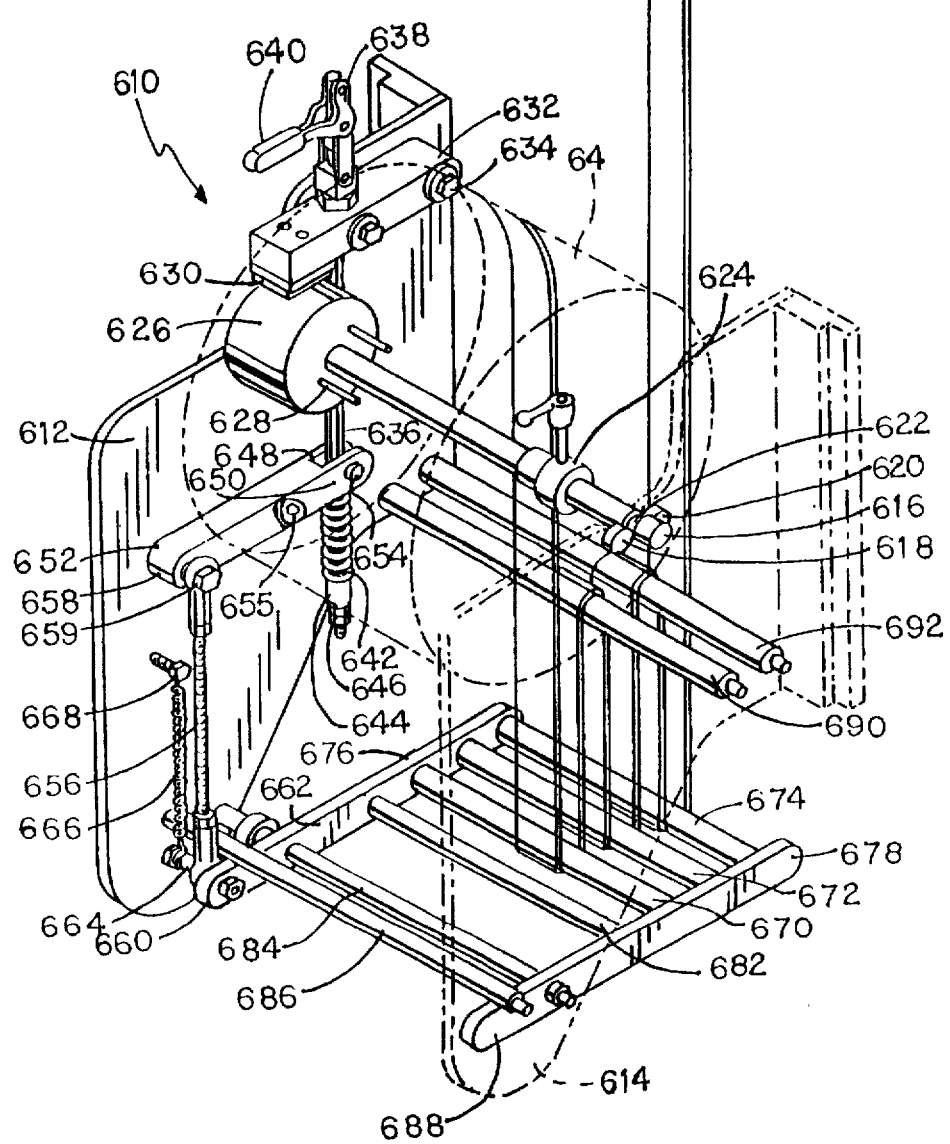

CONVERTIBLE FORM, FILL AND SEAL PACKAGING MACHINE AND METHOD

CROSS REFERENCE TO RELATED APPLICATIONS

This application is a continuation of U.S. provisional patent application Ser. No. 60/004,889 filed Oct. 6, 1995. Also, this application is a continuation-in-part of U.S. patent application Ser. No. 08/410,673, filed Mar. 27, 1995, now abandoned, which is a CIP of U.S. patent application Ser. No. 08/355,933, filed Dec. 14, 1994, now U.S. Pat. No. 5,505,037, which is a continuation of U.S. patent application Ser. No. 08/153,273, filed Nov. 16, 1993, now abandoned, which is a continuation of U.S. patent application Ser. No. 07/905,903, filed Jun. 29, 1992, now abandoned. This application is also a continuation-in-part of U.S. patent application Ser. No. 08/076,018, filed Jun. 14, 1993, now U.S. Pat. No. 5,400,565, which is a continuation-in-part of U.S. patent application Ser. No. 07/905,903, filed Jun. 29, 1992, now abandoned.

BACKGROUND OF THE INVENTION

The present invention relates to apparatus and methods for making bags or packages, and, more particularly, concerns a multiple purpose convertible vertical form, fill and seal machine and method for making a variety of styles or types of bags including overlap or fin seals, pillow, potatochip, nonreclosable or reclosable, product-filled bags.

Package or bag making machines generally referred to as vertical form, fill and seal machines and methods for manufacturing individual pillow type packages with nonreclosable, midline overlap longitudinal seams or seals are described, for example, in U.S. Pat. Nos. 2,200,971 to Sonneborn et al., granted May 14, 1940 (U.S. Cl. 93-3); 2,145,941 to Maxfield, granted Feb. 7, 1939 (U.S. Cl. 93-3); 2,154,521 to Maxfield, granted Apr. 18, 1939 (U.S. Cl. 93-3); 2,852,898 to Berg, granted Sep. 23, 1958 (U.S. Cl. 53-182); 2,869,298 to Zwoyer, granted Jan. 20, 1959 (U.S. Cl. 53-51); 2,960,808 to Pike, granted Nov. 22, 1960 (U.S. Cl. 53-241); 3,055,154 to Markley, et al., granted Sep. 25, 1962 (U.S. Cl. 53-182); 3,262,244 to Cutler, et al., granted Jul. 26, 1966 (U.S. Cl. 53-182); 3,425,185 to Samways, et al., granted Feb. 4, 1969 (U.S. Cl. 53-182); 3,466,850 to Hudson, et al., granted Sep. 16, 1969 (U.S. Cl. 53-28); 3,530,642 to Leimert, granted Sep. 29, 1970 (U.S. Cl. 53-180); 3,925,139 to Simmons, granted Dec. 9, 1975 (U.S. Cl. 156/358); 4,023,327 to Simmons, granted May 17, 1977 (U.S. Cl. 53/51); 4,040,237 to O'Brien, granted Aug. 9, 1977 (U.S. Cl. 53/180); 4,043,098 to Putnam, Jr., et al., granted Aug. 23, 1977 (U.S. Cl. 53/180); 4,077,308 to Scully, granted Mar. 7, 1978 (U.S. Cl. 93/19); 4,117,647 to Rossi, granted Oct. 3, 1978 (U.S. Cl. 53/502); 4,128,985 to Simmons, granted Dec. 12, 1978 (U.S. Cl. 53/51); 4,136,505 to Putnam, Jr., et al., granted Jan. 30, 1979 (U.S. Cl. 53/551); 4,171,605 to Putnam, Jr., et al., granted Oct. 23, 1979 (U.S. Cl. 53/552); 4,144,693 to Ogata, granted Mar. 20, 1979 (U.S. Cl. 53/433); 4,288,965 to James, granted Sep. 15, 1981 (U.S. Cl. 53/451); 4,501,109 to Monsees, granted Feb. 26, 1985 (U.S. Cl. 53/451); 4,532,753 to Kovacs, granted Aug. 6, 1985 (U.S. Cl. 53/451); 4,768,327 to Mosher, granted Sep. 6, 1988 (U.S. Cl. 53/451); 4,965,986 to Klinkel, granted Oct. 30, 1990 (U.S. Cl. 53/551); 4,999,974 to Kovacs, et al., granted Mar. 19, 1991 (U.S. Cl. 53/434); and 5,279,098 to Fukuda, granted Jan. 18, 1994 (U.S. Cl. 53/451). Typically, a heat sealable web material is supplied from a roll and is guided to a former located at the upper end of the machine. The former folds the flat web material into a vertically oriented tube surrounding a tubular filling mandrel or pipe. The edges of the folded web material overlap one another, and, as the folded tube moves downwardly over the mandrel, the overlapped marginal edge portions are heat sealed to one another by a cyclicly operated longitudinal sealing mechanism. The web is thus formed into a web tube which is advanced through the machine in package length increments. As packages are formed by the machine, product is also filled into them by a feeder device located on top of the machine. The feeder device is driven in synchronism with the remainder of the machine and cyclicly discharges measured quantities or charges of product into the upper end of the filling mandrel. A transverse or end sealing mechanism below the filling mandrel forms package end seals in the web tube by cyclicly flattening the tube and heat sealing the two layers of the flattened tube to one another through the use of two relatively moving jaws which reciprocate toward and away from the web tube from the front and back of the machine. During one closing movement of the jaws, the sealing mechanism simultaneously forms the top end seal of the leading package and the bottom end seal of the following package, and it also cuts the web material between the two seals to separate the leading package from the web tube. Between successive operations of the jaws, the is web tube is advanced in package length increments by vertically reciprocating the sealing jaws or by using intermittently operated feed belts.

In the above-mentioned patents, the midline longitudinal overlap or fin seam or seal is formed as the web material lays relatively flat against the product filling pipe or mandrel. Packaging machines which form longitudinal fin seams or seals while the edges of the web material extend outwardly from the product filling mandrel are described, for example, in U.S. Pat. Nos. 5,255,497 to Zoromski, et al., granted Oct. 26, 1993 (U.S. Cl. 53/551) and 4,691,499 to Umeda, et al., granted Sep. 8, 1987 (U.S. Cl. 53/451).

Vertical form, fill and seal machines and methods for making reclosable bags from a bag forming film and a separate plastic zipper element with edge fin seals which extend outwardly from the product fill pipe are described, for example, in U.S. Pat. Nos. 4,709,533 to Ausnit, granted Dec. 1, 1987 (U.S. Cl. 53/451); 4,894,975 to Ausnit, granted Jan. 23, 1990 (U.S. Cl. 53/412); and 5,400,565 to Terminella, et al., granted Mar. 28, 1995 (U.S. Cl. 53/133.4). The plastic zipper element is fed between the film edges and the film and zipper are joined by vertically oriented heated sealing bars. The thus formed and sealed tube is filled with product through the fill tube and horizontal cross-seals and cross-cutters complete the individual bags. In these machines, the vertical and horizontal seals are formed by sealing members or jaws which reciprocate toward and away from the plastic film from the right and left sides of the device.

U.S. Pat. Nos. 4,355,494 to Tilman, granted Oct. 26, 1982 (U.S. Cl. 53/416); 4,745,731 to Talbott, et al., granted May 24, 1988 (U.S. Cl. 53/451); 4,829,745 to Behr, et al., granted May 16, 1989 (U.S. Cl. 53/451); 4,869,048 to Boeckmann, granted Sep. 26, 1989 (U.S. Cl. 53/451); and 5,054,270 to McMahon, granted Oct. 8, 1991 (U.S. Cl. 53/552) describe vertical form, fill and seal machines which produce reclosable, edge fin seal bags or packages from a film or web having respective zipper profiles integral with or attached to each edge of the film.

Vertical form, fill and seal machines and methods for making reclosable pillow bags with a midline overlap or fin seal and a zipper element running along one side edge are described in U.S. Pat. Nos. 4,840,012 to Boeckmann, granted Jun. 20, 1989 (U.S. Cl. 53/410) and 5,127,208 to Custer, et al., granted Jul. 7, 1992 (U.S. Cl. 53/412).

Each of U.S. Pat. Nos. 4,617,683 to Christoff, granted Oct. 14, 1986 (U.S. Cl. 383/63) and 4,909,017 to McMahon, et al., granted Mar. 20, 1990 (U.S. Cl. 53/410) describe packaging machines for forming reclosable pillow type bags with midline fin seals and horizontal zipper segments.

Packaging machines and methods for manufacturing tetrahedral packages are described in, for example, U.S. Pat. Nos. 2,741,079 to Rausing, granted Apr. 10, 1956 (U.S. Cl. 53-180); 3,082,586 to Schneider, et al., granted Mar. 26, 1963 (U.S. Cl. 53-182); 3,090,175 to Berglund, granted May 21, 1963 (U.S. Cl. 53-28); 3,470,672 to Tuma, granted Oct. 7, 1969 (U.S. Cl. 53-59); and 3,546,835 to Mobley, granted Dec. 15, 1970 (U.S. Cl. 53-28).

Attempts have been made to provide a vertical form, fill and seal machine which produces more than one type of package. For example, packaging machines with vertically reciprocating cross-sealing jaws mounted on a 90° rotatable platform for making nonreclosable tetrahedral or pillow type packages are described in U.S. Pat. Nos. 3,320,719 to Murray, granted May 23, 1967 (U.S. Cl. 53-182); 3,320,720 to Murray, granted May 23, 1967 (U.S. Cl. 53-182); 3,320,721 to Murray, granted May 23, 1967 (U.S. Cl. 53-182); and 3,332,206 to Murray, granted Jul. 25, 1967 (U.S. Cl. 53-182).

U.S. Pat. No. 4,874,257 to Inagaki, granted Oct. 17, 1989 (U.S. Cl. 383/63), describes a vertical form, fill and seal apparatus for making reclosable, edge fin seal bags or reclosable, midline fin seal pillow bags. The apparatus is shown to include two different pairs of cross-sealing jaws.

Although the above-described patents provide examples of vertical form, fill and seal apparatus and methods for forming bags or packages, there is a need for an improved vertical form, fill and seal machine and method which not only forms edge fin seal, reclosable or nonreclosable, product-filled bags, but also which is convertible and adapted to produce a variety of types of seals and bags, has a compact construction, is simple to convert from one type or style of bag to another, operates at high speeds, which facilitates the production of different size bags, and/or readily accommodates the addition of different types and amounts of product.

SUMMARY OF THE INVENTION

In accordance with an exemplary embodiment of the present invention, a convertible, highly adaptable, versatile vertical form, fill and seal machine and method is provided which not only makes edge fin seal nonreclosable or reclosable bags, but also has a compact construction, is easily converted to produce other styles and types of durable, substantially air tight, product-filled bags at high speed and provides for the production of different size bags and accommodates different types and amounts of product in the bags.

In accordance with another exemplary embodiment of the present invention, a vertical form, fill and seal machine and method is provided which makes edge fin seal nonreclosable or reclosable product-filled bags. In accordance with yet another exemplary embodiment of the present invention, a vertical form, fill and seal machine and method is provided which makes midline overlap or fin seal pillow style non-reclosable or reclosable product-filled bags.

Generally, the convertible vertical form, fill and seal machine and method of the present invention produces reclosable, product-filled bags by joining a reclosable zipper strip to the edges of a plastic, bag-forming film which is wrapped around a product fill tube. The zipper strip is joined to the plastic film parallel to the longitudinal axis of the fill tube by heat sealing to form a flexible, plastic tube. Separate, product-filled bags are formed by cross-sealing, filling and severing the flexible, plastic tube downstream of the product fill tube.

More particularly, the convertible vertical form, fill and seal machine of the present invention includes a common drive source for intermittently driving a drive and pinch roll pair, a pair of film pull belts, and a pair of zipper strip drive rollers for pulling the plastic film and the zipper strip through the machine in bag length increments. In accordance with one embodiment of the present invention, the production of different size bags is facilitated by having the common drive source activated by a control means which receives input from a registration mark sensor which senses marks on the plastic film. In accordance with another embodiment, the production of different size bags is facilitated by changing the path length of the plastic film through the machine using an adjustable idler roller. The plastic film drive roll is driven at a slightly slower speed than the film pull belts and zipper drive rollers to provide the proper film tension and accommodate stretch of the plastic film as it passes through the machine.

Further, the convertible vertical, form, fill and seal machine and method of the present invention ensures for airtight seals along the edges of each reclosable, product-filled bag by having the zipper drive rollers and a bag grabber mechanism stretch or tension the bag material and a bag squeezer assembly squeeze the air out of the product-filled tube prior to severing and cross-sealing the bag material. The bag squeezer assembly also serves to eliminate unnecessary air and to compact the product in the filled bags to thereby reduce the size of the finished bags, to decrease the risk of damage to the bags during shipping, handling, and storage by reducing, if not eliminating, air pockets, and/or reducing the quantity of air in the finished bag to lessen air or frost damage to the product in the bag.

In order to accommodate high rates of bag production, for example 30–100 bags per minute, the convertible vertical form, fill and seal machine of the present invention incorporates pressurized air cooling vents adjacent each of the vertical and horizontal heat sealing bars to cool the heat seals between the zipper strip and plastic film and the heat seals along the lower and upper edges of each bag.

In accordance with an exemplary embodiment, the convertible vertical form, fill and seal machine of the present invention produces edge fin seal, reclosable, product-filled bags by repeatedly drawing bag length increments of plastic film and zipper strip down along the fill tube, heat sealing the zipper strip to the plastic film wrapped around the fill tube to form a flexible plastic tube (bag precursor) using vertically oriented platens which are reciprocated into and out of contact with the edges of the plastic film, cooling the heat seal between the zipper strip and the plastic film using pressurized air, flattening or crushing the zipper strip at bag length increments to ensure an air tight seal is formed along the edges of the bags, stretching the plastic tube transverse to the fill tube, sealing the plastic tube transverse to the fill tube, filling the plastic tube with product, incrementing the plastic tube one bag length, stretching the plastic tube transverse to the longitudinal axis of the fill tube, squeezing the air out of the product-filled tube, forming another transverse seal in the plastic tube using reciprocating heater bars which are brought into and out of contact with the plastic tube, cooling the transverse seals using pressurized air, severing the plastic tube, and ejecting a product-filled, reclosable bag.

In accordance with another exemplary embodiment, the convertible vertical form, fill and seal machine of the present invention produces edge fin seal nonreclosable, product-filled bags by repeatedly drawing bag length increments of plastic film and cap or tear strip down along the fill tube, heat sealing the cap strip to the plastic film wrapped around the fill tube to form a flexible plastic tube (bag precursor) using vertically oriented platens which are reciprocated into and out of contact with the edges of the plastic film, cooling the heat seal between the cap strip and the plastic film using pressurized air, stretching the flexible plastic tube transverse to the fill tube, sealing the plastic tube transverse to the fill tube, filling the plastic tube with product, incrementing the plastic tube one bag length, stretching the plastic tube transverse to the longitudinal axis of the fill tube, squeezing the air out of the product-filled tube, forming another transverse seal in the plastic tube using reciprocating heater bars which are brought into and out of contact with the plastic tube, cooling the transverse seals using pressurized air, severing the plastic tube, and ejecting a product-filled nonreclosable bag.

In accordance with still another exemplary embodiment, the convertible vertical form, fill and seal machine of the present invention produces midline overlap seal, pillow style, nonreclosable, product-filled bags by repeatedly drawing bag length increments of plastic film down along the fill tube with the edges of the film overlapping one another, heat sealing the overlapping edges of the plastic film wrapped around the fill tube to form a flexible plastic tube (bag precursor) using a vertically oriented platen which is reciprocated into and out of contact with one edge of the plastic film, cooling the heat seal between the overlapping edges of the plastic film using pressurized air, stretching the flexible plastic tube transverse to the fill tube, sealing the plastic tube transverse to the fill tube, filling the plastic tube with product, incrementing the plastic tube one bag length, stretching the plastic tube transverse to the longitudinal axis of the fill tube, forming another transverse seal in the plastic tube using reciprocating heater bars which are brought into and out of contact with the plastic tube, cooling the transverse seals using pressurized air, severing the plastic tube, and ejecting a product-filled pillow bag.

In accordance with a further exemplary embodiment, the convertible vertical form, fill and seal machine of the present invention produces midline fin seal, pillow style, nonreclosable, product-filled bags by repeatedly drawing bag length increments of plastic film down along the fill tube with the edges of the plastic film abutting one another, heat sealing the abutting edges of the plastic film together to form a flexible plastic tube (bag precursor) using one or more vertically oriented platens which are reciprocated into and out of contact with one or both of the edges of the plastic film, cooling the heat seal between the edges of the plastic film using pressurized air, stretching the flexible plastic tube transverse to the fill tube, sealing the plastic tube transverse to the fill tube, filling the plastic tube with product, incrementing the plastic tube one bag length, stretching the plastic tube transverse to the longitudinal axis of the fill tube, forming another transverse seal in the plastic tube using reciprocating heater bars which are brought into and out of contact with the plastic tube, cooling the transverse seals using pressurized air, severing the plastic tube, and ejecting a product-filled pillow bag.

In accordance with still another exemplary embodiment, the convertible vertical form, fill and seal machine of the present invention produces reclosable, product-filled pillow style bags by repeatedly drawing bag length increments of plastic film and zipper strip down along the fill tube, heat sealing the edges of the plastic film to one another and heat sealing the zipper strip to the plastic film wrapped around the fill tube to form a flexible plastic tube (bag precursor) using vertically oriented platens which are reciprocated into and out of contact with the plastic film, cooling the heat seals between the edges of the plastic film and the zipper strip and the plastic film using pressurized air, flattening or crushing the zipper strip at bag length increments to ensure an air tight seal is formed along the edges of the bags, stretching the plastic tube transverse to the fill tube, sealing the plastic tube transverse to the fill tube, filling the plastic tube with product, incrementing the plastic tube one bag length, stretching the plastic tube transverse to the longitudinal axis of the fill tube, forming another transverse seal in the plastic tube using reciprocating heater bars which are brought into and out of contact with the plastic tube, cooling the transverse seals using pressurized air, severing the plastic tube, and ejecting a product-filled, reclosable pillow style bag.

In accordance with yet another exemplary embodiment, the convertible vertical form, fill and seal machine of the present invention produces reclosable, product-filled pillow style bags by repeatedly drawing bag length increments of plastic film and zipper strip down along the fill tube, heat sealing the zipper strip to the plastic film wrapped around the fill tube to form a flexible plastic tube (bag precursor) using vertically oriented platens which are reciprocated into and out of contact with the plastic film, cooling the heat seal between the zipper strip and the plastic film using pressurized air, flattening or crushing the zipper strip at bag length increments to ensure an air tight seal is formed along the edges of the bags, stretching the plastic tube transverse to the fill tube, sealing the plastic tube transverse to the fill tube, filling the plastic tube with product, incrementing the plastic tube one bag length, stretching the plastic tube transverse to the longitudinal axis of the fill tube, squeezing the air out of the product-filled tube, forming another transverse seal in the plastic tube using reciprocating heater bars which are brought into and out of contact with the plastic tube, cooling the transverse seals using pressurized air, severing the plastic tube, and ejecting a product-filled, reclosable pillow style bag.

In accordance with one example, the convertible vertical form, fill and seal machine of the present invention may be converted from a machine for making reclosable, edge fin seal, product-filled bags to a machine for making midline overlap seal, pillow type, nonreclosable bags by changing the bag forming film stock roll in the back of the machine, adjusting the film path length and machine controls for the new bag type, size, product, etc., changing the former and fill tube, and indexing the pinch seal assembly 90° so that the respective clamping jaws are located in front and behind the plastic tube rather than to the right and left sides thereof. In accordance with a particular example, indexing of the pinch seal assembly is facilitated by having the entire assembly mounted on a base plate which is itself mounted on a drawer mechanism which allows the pinch seal assembly to be pulled forwardly out of the machine, lifted from the drawer, indexed 90°, set back into the drawer and then pushed back into the machine.

The principle object of the present invention is the provision of a convertible vertical form, fill and seal machine and method for forming a variety of styles and types of nonreclosable and reclosable, sealed, product-filled bags.

Another object of the present invention is the provision of an improved vertical form, fill and seal machine and method for forming reclosable, sealed, product-filled bags.

Yet another object of the present invention is the provision of an improved vertical form, fill and seal machine and method for making pillow style, sealed, product-filled bags.

Still another object of the present invention is the provision of a machine and method for forming product-filled bags which facilitate the production of bags of different size and which accommodates different types and amounts of product.

A still further object of the present invention is the provision of an improved, vertical form, fill and seal machine and method for making bags which provides for a high rate of bag production.

Still yet another object of the present invention is the provision of an improved bag making machine including bag squeezing means for selectively reducing the quantity of air retained in the finished product-filled bags.

Other objects and further scope of the applicability of the present invention will become apparent from the detailed description to follow taken in conjunction with the accompanying drawings wherein like parts are designated by like reference numerals.

BRIEF DESCRIPTION OF THE DRAWINGS

FIG. 13 is a front perspective view representation of the zipper strip supply assembly;

DETAILED DESCRIPTION OF THE PREFERRED EMBODIMENTS

Figure 1:
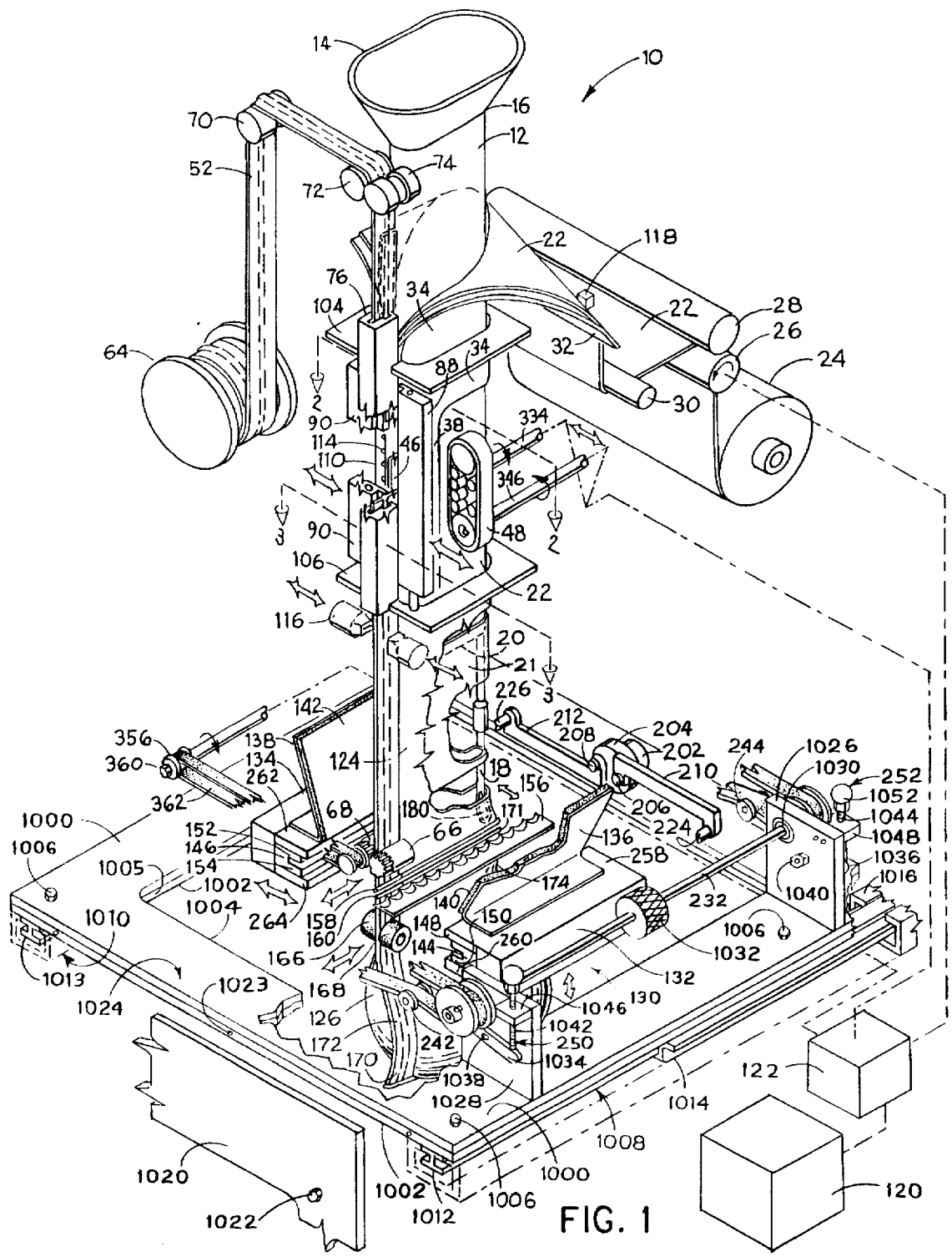
FIG. 1 is a schematic front perspective view of the convertible vertical form, fill and seal machine of the present invention.

In accordance with an exemplary embodiment of the present invention as shown in FIG. 1 of the drawings, a convertible vertical form, fill and seal machine set up for making reclosable, edge fin seal bags is generally designated by the reference numeral and shown to include a vertically oriented, oval, product fill tube 12 having a product receiving funnel 14 at its upper end 16 and a depending rod or whisker 18 extending from a lower end 20. The fill tube 12, funnel 14, and whisker 18 are preferably formed of stainless steel which provides for easy cleaning and disinfection at the end of each working cycle. The funnel 14 is adapted to receive the lower end of a conventional conveyor or scale which deposits discrete bag quantities of product to the machine 10 at a selected interval during the formation of each bag. A flexible boot or sleeve 21 is added to the lower end of fill tube 12 and serves as a flexible extension of the fill tube 12.

A heat sealable, continuous, bag forming plastic film 22 is pulled from a plastic film supply roll 24 and passes between a drive and pinch roll pair 26 and 28 oriented substantially horizontal and transverse to the longitudinal or vertical axis of the fill tube 12. The plastic film 22 passes under a directional idler roller 30 and is fed over a forming collar 32 which causes the plastic film 22 to wrap around the fill tube 12. Plastic film 22 passes between the oval fill tube 12 and a concentric substantially oval guide member 34 which extends from the collar 32 down along a length of the fill tube. Elongate and arcuate members 36 and 38 extend from the front of guide member 34 and serve as heat shields. Collar 32, guide member 34, and shields 36 and 38 are preferably formed of stainless steel to be easily cleansed and disinfected at the end of each working cycle.

Figure 2:
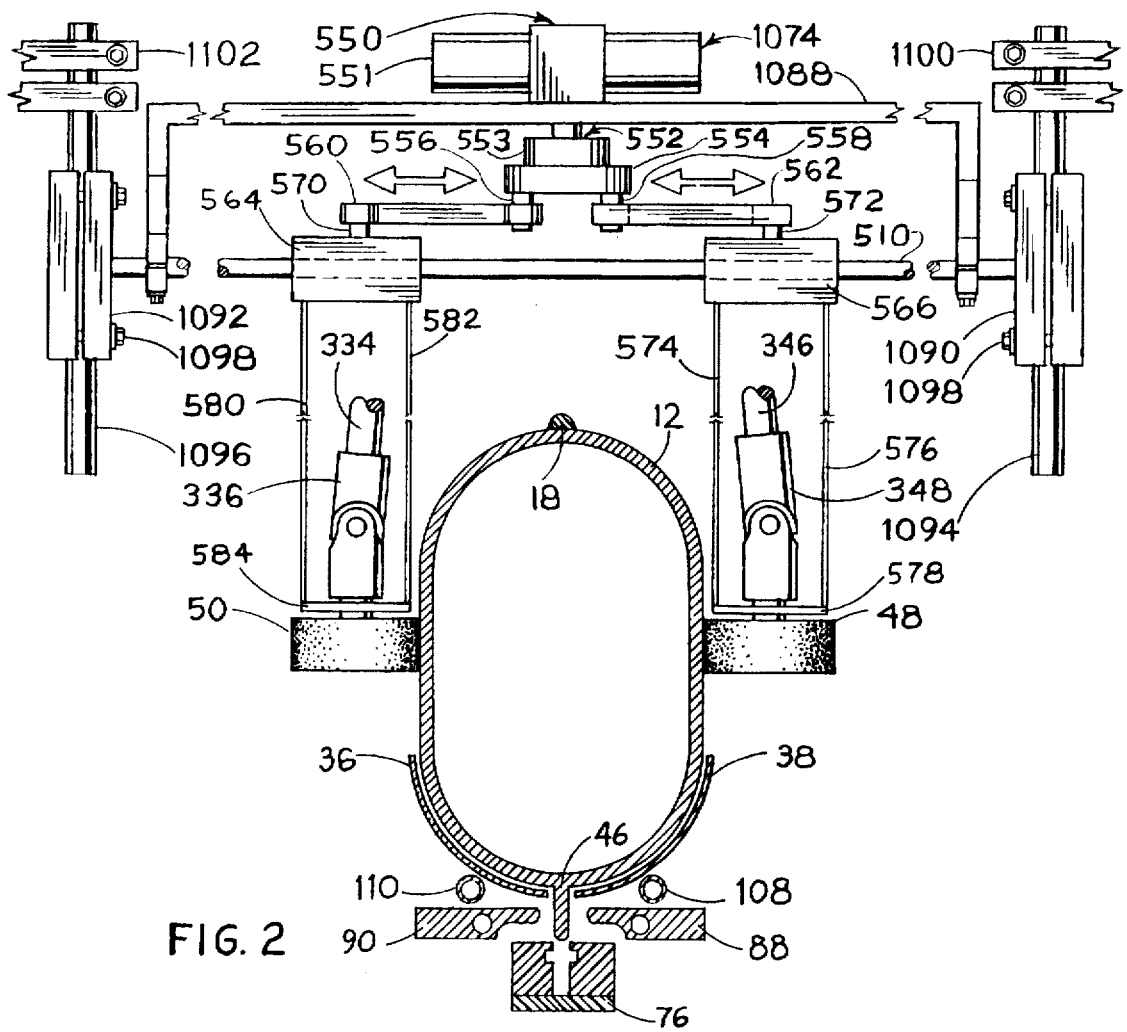
FIG. 2 is a horizontal section taken along line 2—2 in FIG. 1.
Figure 3:
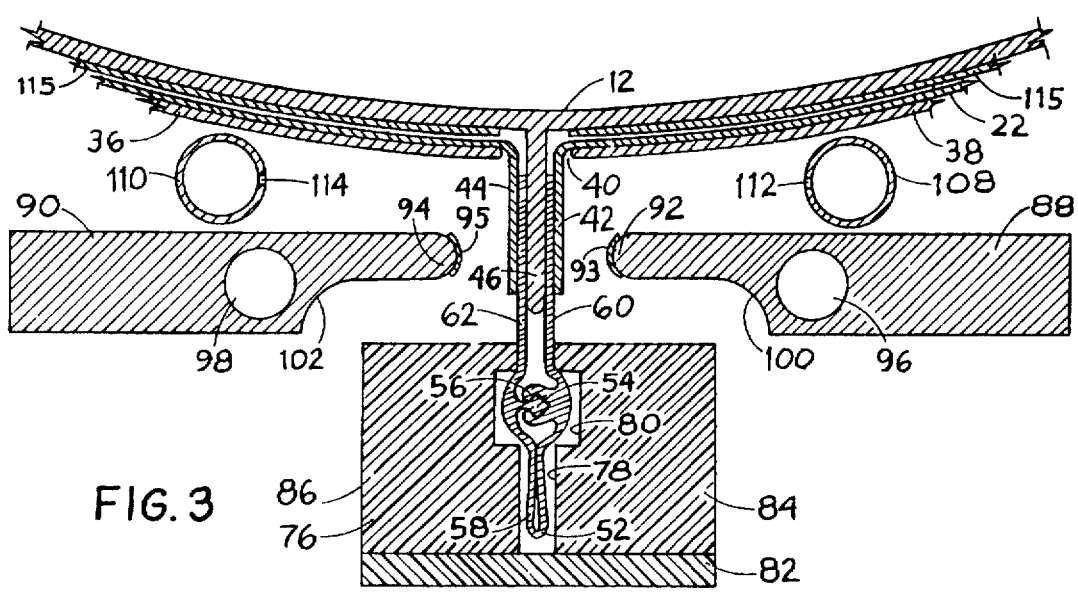
FIG. 3 is a horizontal section taken along line 3—3 in FIG. 1.

As shown in FIGS. 2 and 3 of the drawings, guide member 34 and heat shields 36 and 38 do not extend across the entire face of the fill tube 12 but leave a small axially extending gap 40 which allows right and left hand edges 42 and 44 of plastic film 22 to extend therefrom. The gap 40 is dimensioned to cooperate with a flange or divider 46 which projects from the front face of fill tube 12 and runs axially along its length. The divider 46 is preferably formed of stainless steel with a silicon or other non-stick coating on its exterior surface.

With reference again to FIGS. 1 and 2 of the drawings, plastic film 22 is drawn down the sides of fill tube 12 at least in part by a pair of endless film pull belts 48 and 50 which are preferably spring-biased against the plastic film 22 and sides of the fill tube 12 to provide the proper drive force against the plastic film 22. The machine 10 is designed to accommodate heat sealable plastic films ranging in width from about six to thirty two inches and in thickness from about one to ten thousandths of an inch (mils). One such plastic film is a heat sealable polyethylene, twenty eight inches wide, two to three mils thick, 7601PS Series produced by ARMIN Corp.

As illustrated in FIGS. 1 and 3 of the drawings, a heat sealable plastic zipper cap strip 52 having opposing and interlocking male and female reclosable fastener elements 54 and 56 forming a continuous zipper, an interconnecting web 58, and opposing right and left hand webs 60 and 62 is pulled from a zipper strip supply roll 64 by the action of pull belts 48 and 50 and a pair of zipper drive rollers 66 and 68. It is preferred that the heat sealable webs 60 and 62 of zipper strip 52 be slightly thicker than the heat sealable plastic film 22. For example, if a 3.35 mil thick plastic film is used, then the webs of the zipper strip should be about 3.5 mils thick. A suitable zipper strip product is produced by Minigrip, Inc. of Orangeburg, N.Y.

Zipper strip 52 passes up and over a grooved, directional idler roller 70 and down between a pair of grooved idler rollers 72 and 74. Idler roller 70 is located off to one side of fill tube 12 while idler rollers 72 and 74 are positioned so that zipper strip 52 passes down the front of the fill tube 12 and along its midline. Right and left hand webs 60 and 62 of zipper strip 52 are separated by the divider 46 as zipper strip 52 passes down along the front of the fill tube 12. Reclosable fastener elements 54 and 56, interconnecting web 58, and a portion of the webs 60 and 62 are entrained within a guide bar 76. Guide bar 76 extends down along the length of the fill tube 12 below the grooved idler rollers 72 and 74 and opposite the divider 46 to align and guide the zipper strip 52 down along the front of the fill tube 12. Guide bar 76 includes an axial slot 78 having an enlarged portion 80 which accommodates the male and female fastener elements 54 and 56 of zipper strip 52. Guide bar 76 is preferably formed of a hard nylon material or other synthetic resin polymer and includes face plate 82 and right and left hand grooved bars 84 and 86 attached to face plate 82 by, for example, threaded fasteners. Also, it is preferred that each of the grooved idler rollers 70, 72 and 74 be formed of a hard nylon or other synthetic resin polymer material.

As shown in FIGS. 1–3 of the drawings, grooved idler roller pair 72 and 74, guide bar 76 and zipper drive rollers 66 and 68 are all vertically aligned on a common vertical axis parallel to the fill tube 12 and extending along its midline. In this position, the grooved idler rollers 72 and 74, guide bar 76 and zipper drive rollers 66 and 68 all cooperate with the divider 46 to feed the zipper strip 52 down along the front of the fill tube 12 with the webs 60 and 62 of zipper strip 52 located inwardly and in abutting relationship with the edges 42 and 44 of the plastic film 22.

Vertically oriented heater platens 88 and 90 are positioned on opposite sides of the guide bar 76 and have respective convex ends 92 and 94 which are reciprocated into and out of contact with the outer surfaces of edges 42 and 44 of plastic film 22. The heater platens 88 and 90 seal the edges 42 and 44 of plastic film 22 to the webs 60 and 62 of the zipper strip 52. Heat shields 36 and 38 serve to shield the remainder of the plastic film 22 and the fill tube 12 from the heat given off by heater platens 88 and 90. Heater platens 88 and 90 include one or more heater elements 96 and 98 extending axially along the length of each heater platen 88 and 90.

Figure 11:
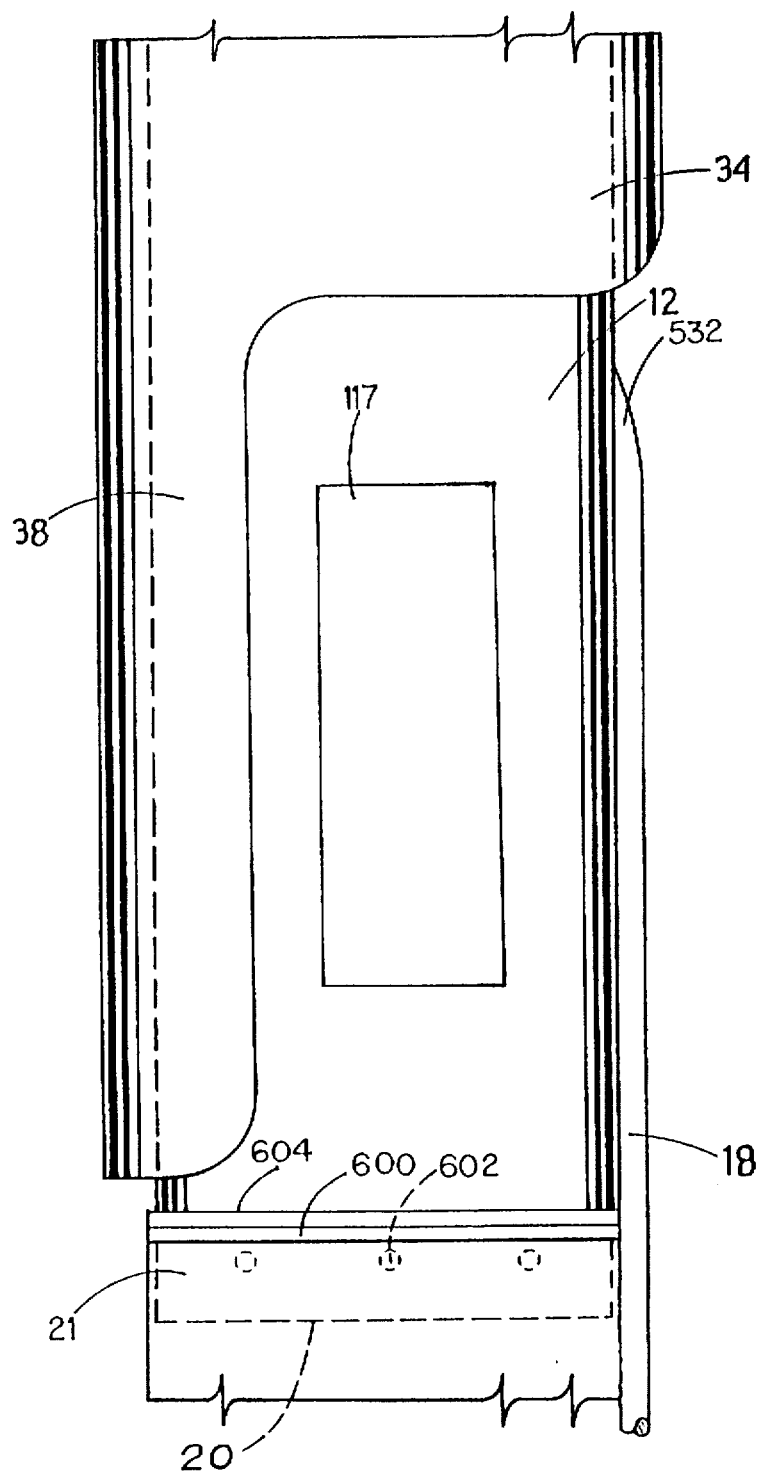
FIG. 11 is a fragmentary side view illustration of a portion of the fill tube.

With reference again to FIG. 3 of the drawings and in accordance with one embodiment of the present invention, a major portion of the exterior surface of fill tube 12 is covered with a thin layer 115 of friction reducing synthetic resin polymer coated fiberglass tape. The synthetic resin polymer material reduces friction between the fill tube 12 and plastic film 22 while at the same time reduces sweating or moisture accumulation on the plastic film 22. Thus, the polymer layer 115 facilitates incremental movement of the plastic film 22 by pull belts 48 and 50. Although the machine 10 will operate without the polymer layer 115 on fill tube 12, it is preferred to at least cover the exterior surface of the flat sides of fill tube 12 with a friction reducing wear strip 117 in the area of the pull belts 48 and 50 especially when the pull belts are spring biased against the fill tube (FIG. 11). Thus, the plastic film 22 is sandwiched between the friction reducing (slick) material 115 or 117 and pull belts 48 and 50. It is preferred to use a synthetic resin polymer tape as the polymer material 115 since it is easily replaced or patched when it becomes worn and plural layers can be added as needed in heavy service areas such as adding a wear strip 117 over top of the material 115 in the area of the pull belts 48 and 50 (FIG. 11).

Friction reducing material, such as, synthetic resin polymer tape can be added to other wear surfaces in the machine 10. For example, layers 93 and 95 of synthetic resin polymer tape are added to the working surfaces 92 and 94 of vertical heater platens 88 and 90.

Guide bar 76 and shields 36 and 38 are supported by spaced horizontal brackets 104 and 106 which also serve to support pressurized air conduits or pipes 108 and 110 each having a plurality of openings 112 and 114 for discharging air along the length of the vertical seal between the edges 42 and 44 of plastic film 22 and webs 60 and 62 of zipper strip 52 for cooling the seal.

Located below the guide bar 76 is a zipper crushing or flattening means 116 for flattening the plastic zipper at bag length increments to ensure an airtight seal along the upper and lower edges of the bag in the area of the zipper. Zipper flattening means 116 is shown as an ultrasonic device, but it is contemplated that a pair of opposing heated bars which are reciprocated into and out of contact with the zipper strip 52 may also be used.

Located upstream of the forming collar 32, is an optical sensor 118 for sensing registration marks on the plastic film 22. For example, registration marks such as black bars located at bag length intervals may be located near the center of the plastic film 22 and used not only to provide an indication of bag length increments, but also proper centering or registration of the plastic film 22 in the machine 10. Signals or information from the optical sensor 118 are fed to a computer control system 120 which provides control signals for starting and stopping a common drive source 122 which simultaneously drives the plastic film drive roll 26, endless film pull belts 48 and 50, and zipper drive rollers 66 and 68. In this manner, the plastic film 22 and zipper strip 52 are fed through the machine 10 in bag length increments.

The machine 10 is designed to accommodate the use of marked or unmarked plastic film. When unmarked plastic film 22 (film which does not have registration marks printed thereon) is to be used in the machine 10, the control system 120 is set up for unmarked film so that the output of optical sensor 118 is ignored. The common drive source 122 operates at a constant running speed. For unmarked plastic film, control system 120 provides a selected time interval drive signal to drive source 122 for feeding a bag length increment of unmarked film and zipper strip through the machine 10. The time interval drive signal is based on the length of bag to be produced set by operator input to computer control system 120.

When marked plastic film (plastic film having registration marks printed thereon) is being used, the computer control system 120 is set up to recognize and react to the output of optical sensor 118. When optical sensor 118 senses a registration mark, control system 120 sends a stop signal to drive source 122. The control system 120 can be programmed to send a stop signal to drive source 122 immediately upon the sensing of a registration mark (leading edge) or to send the stop signal a certain distance past the sensing of the mark.

The present invention encompasses a variety of ways to accommodate the production of different length bags using marked plastic film 22. In accordance with one embodiment, the registration marks on the plastic film are located (printed) a set distance downstream from the trailing edge of each bag. For example, if it takes one-fifth (⅕) of a second for the drive source 122 to come to a complete stop after receiving a stop signal from the control system 120 and this one-fifth (⅕) of a second interval relates to three (3) inches of travel of plastic film 22 through the machine, then each of the registration marks is located three (3) inches ahead of the trailing edge of each bag length increment of plastic film. When the registration marks are so located, the path length of plastic film 22 between the mark sensor 118 and the horizontal severing means can be adjusted so that an integral number of bag lengths of plastic film exists therebetween.

Figure 16:
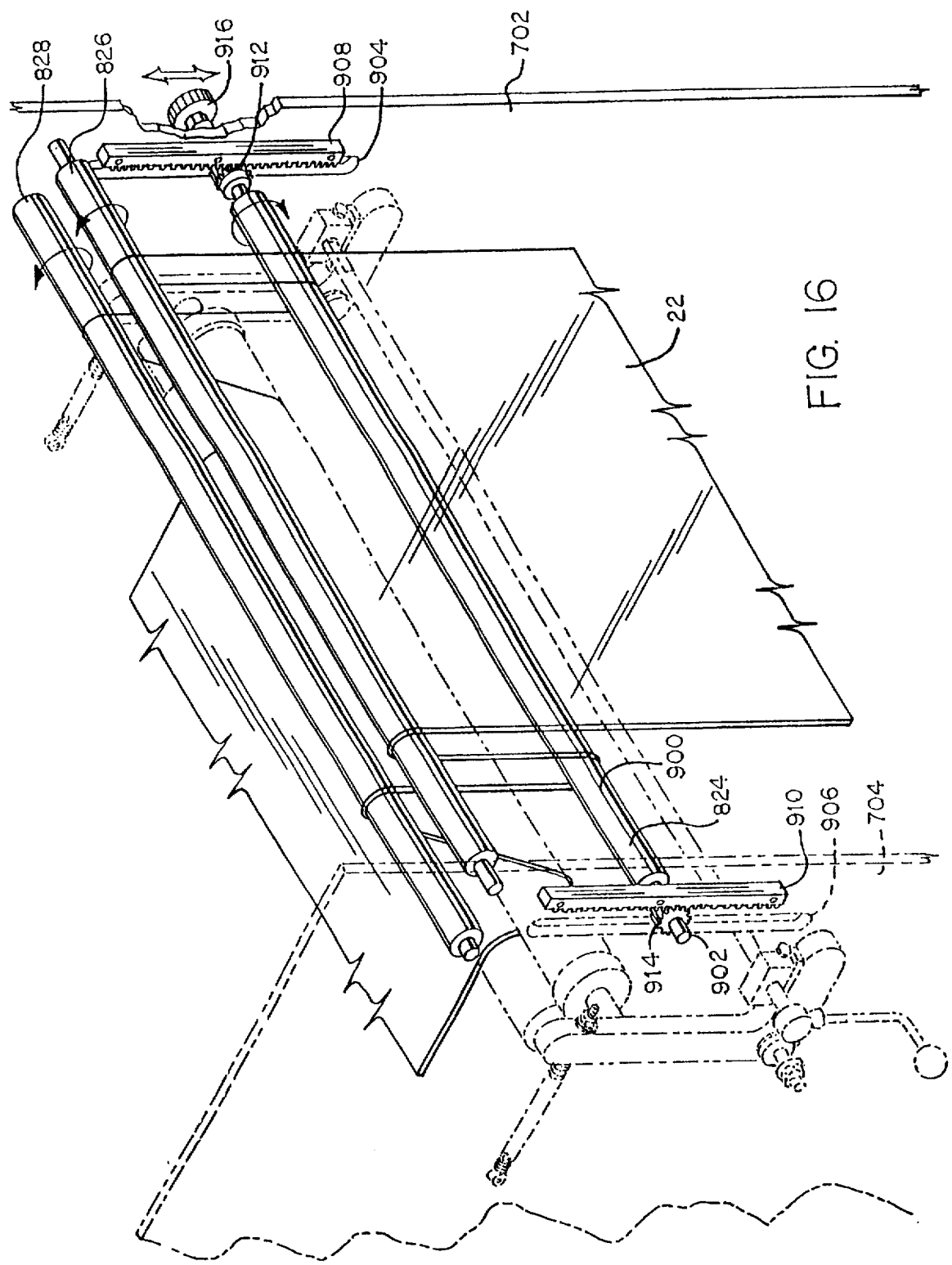
FIG. 16 is an enlarged perspective view of the adjustable slack roller of FIG. 14.
Figure 20:
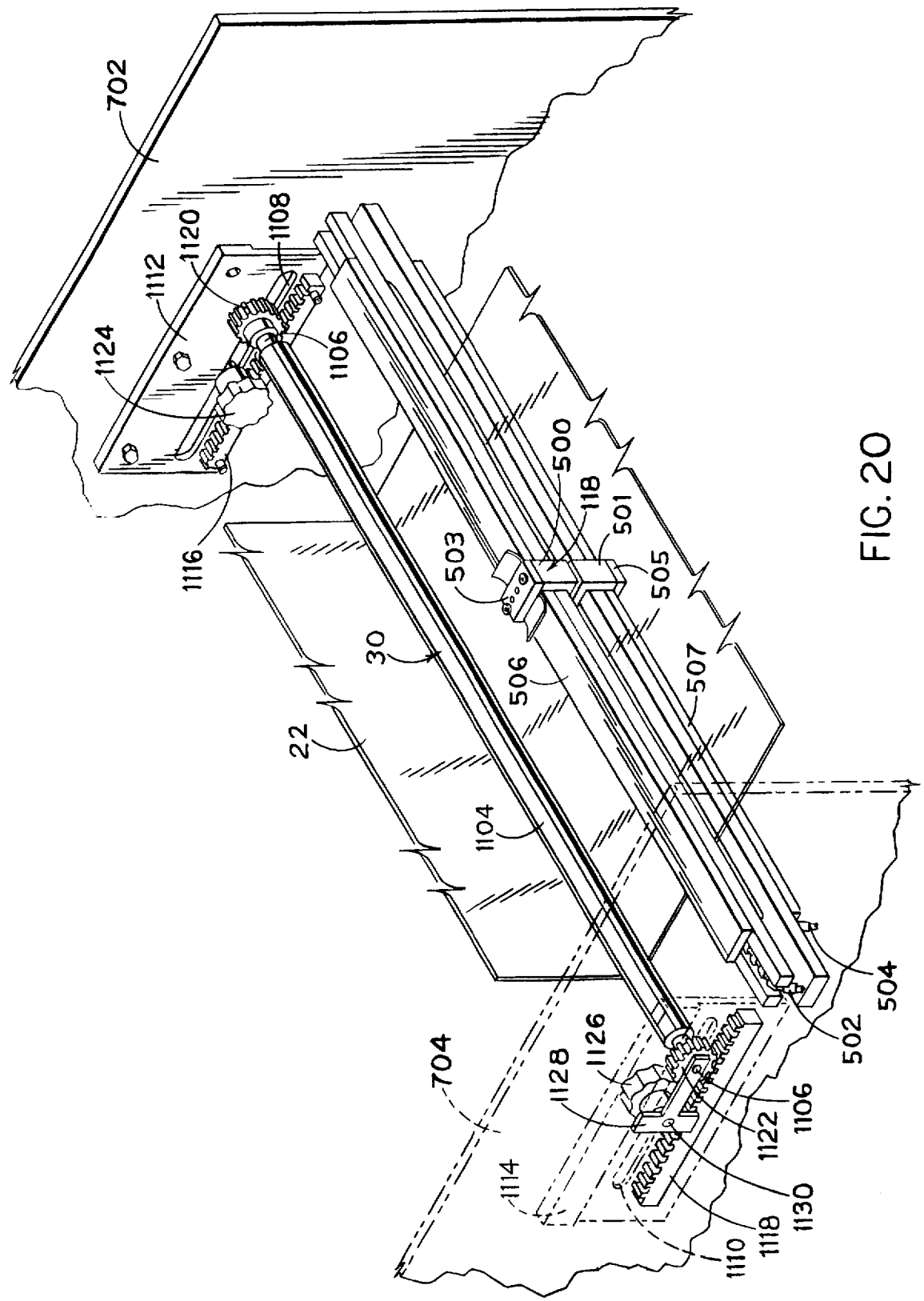
FIG. 20 is a rear perspective view depiction of the mark sensor and film path length adjustment roller of the machine of FIG. 1.

The plastic film path length between the sensor 118 and the horizontal severing means can be adjusted by allowing for adjustment of the location of the optical sensor 118. An example of such a vertically adjustable mark sensor is described in U.S. Pat. No. 5,400,565 issued on Mar. 28, 1995, and which is hereby incorporated by reference. Alternatively, the plastic film path length between the mark sensor 118 and the horizontal severing means can be adjusted as shown in FIG. 20 using a fixed mark sensor located upstream of a horizontally adjustable (movable) idler roller which serves as a phaser roller to adjust the path length of plastic film through the machine. An example of a vertically movable phaser roller is described in U.S. Pat. No. 5,014,489 issued on May 14, 1991, and which is hereby incorporated by reference. U.S. Pat. No. 5,014,489 discloses a vertically movable roller which serves to adjust the path length of a film sheet through a film wrapping machine. It is contemplated that the idler roller may be moved vertically either manually as shown in FIG. 3 of U.S. Pat. No. 5,014,489 or as shown in FIGS. 16 and 20 of the drawings of the present application, or by a motorized, linear actuator.

In accordance with another embodiment of the present invention, different bag lengths are accommodated while having mark sensor 118 fixed in position by printing the registration marks in a location which accommodates for both the time it takes for the drive source and plastic film to stop and the fixed path length between the mark sensor and bag severing means. This requires the registration marks to be printed in a different location for different sized bags and different stopping distances.

In accordance with common practice, each of the registration marks is printed in the center of each bag length increment of plastic film regardless of bag size (length). To ensure that the plastic film is severed in the correct location and to accommodate different length bags, either the mark sensor 118 is movable (adjustable) along the path of the plastic film, the mark sensor is placed upstream of an adjustable idler roller and the film path length from the mark sensor to the bag severing means is adjusted, and/or the drive signal is adjusted by operator input to computer control system 120.

Yet another embodiment calls for the mark to be placed on each bag length increment a fixed distance upstream from the leading edge of each bag length increment regardless of bag length.

When forming reclosable bags from plastic film having registration marks at bag length intervals, it is preferred that computer control system 120 activate drive source 122 during a bag forming cycle and continues to activate drive source 122 until computer control system 120 receives input from optical sensor 118 that the leading edge of a registration mark has been sensed. Hence, control system 120 automatically adjusts the duration of the drive pulse sent to common drive source 122 to accommodate the production of different length bags. It is contemplated that computer control system 120 can provide for operator input to adjust the drive signal to drive source 122 and to override the output of optical sensor 118.

Figure 4:
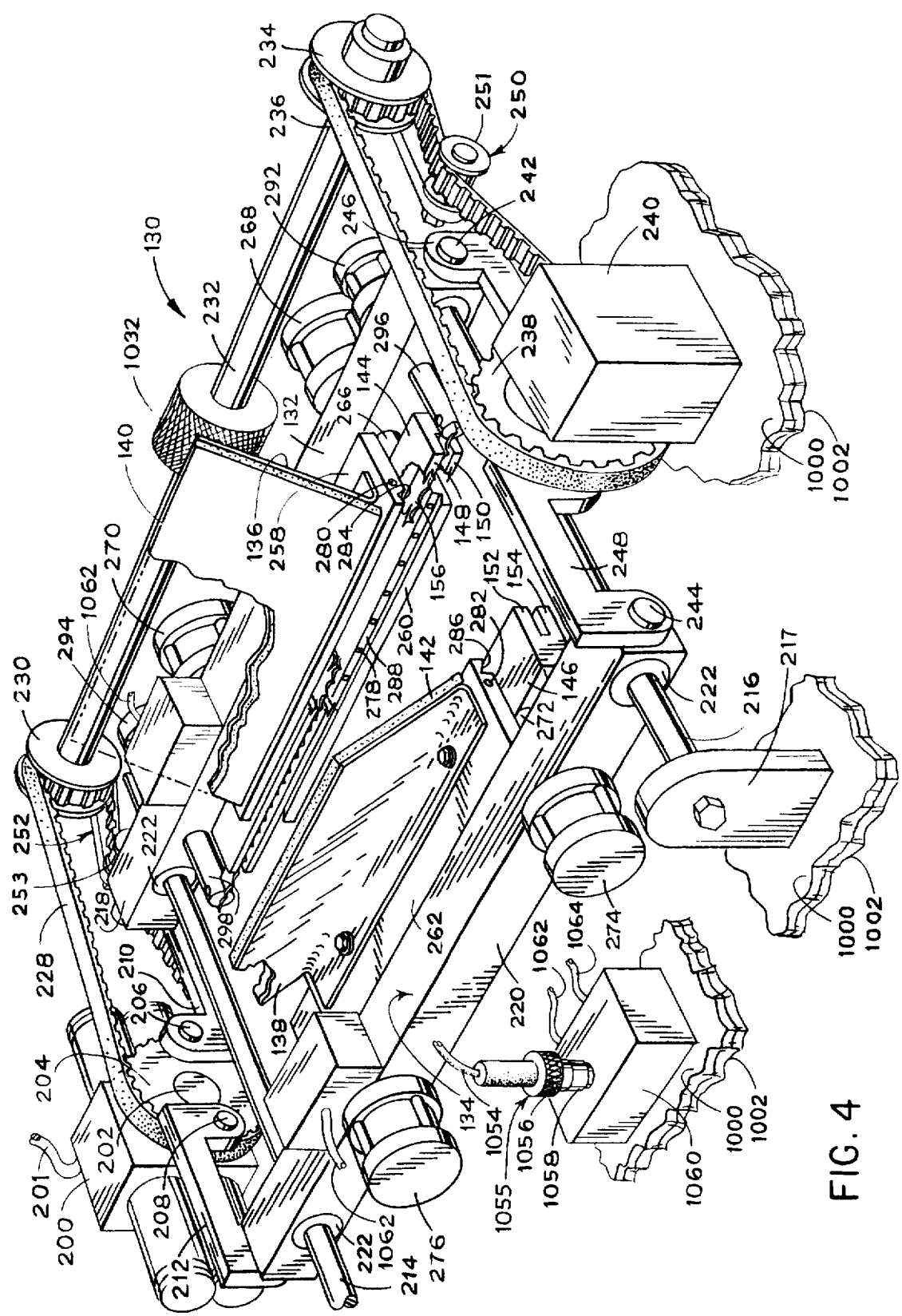
FIG. 4 is an enlarged, more detailed perspective view of the horizontal sealing and severing apparatus of FIG. 1.

As illustrated in FIGS. 1 and 4 of the drawings, the plastic film 22 and the zipper strip 52 are joined together by heat sealing the edges of the plastic film to the webs of the zipper strip to form a plastic tube 124 which is sealed along its lower edge by a first horizontal or transverse seal, filled with product, sealed along its upper edge by a second horizontal or transverse seal, and severed from the upstream portion of tube 124 to form a separate, product-filled, reclosable bag 126. This cross-sealing and severing of plastic tube 124 is accomplished by a pinch seal assembly 130 located downstream of the zipper drive rollers 66 and 68 and whisker 18. Pinch seal assembly 130 includes a pair of opposing clamping jaws 132 and 134 which are reciprocated in a substantially horizontal plane into and out of contact with the tube 124. Jaws 132 and 134 support respective angled product stagers 136 and 138, each having padded upper surfaces 140 and 142.

Figure 7:
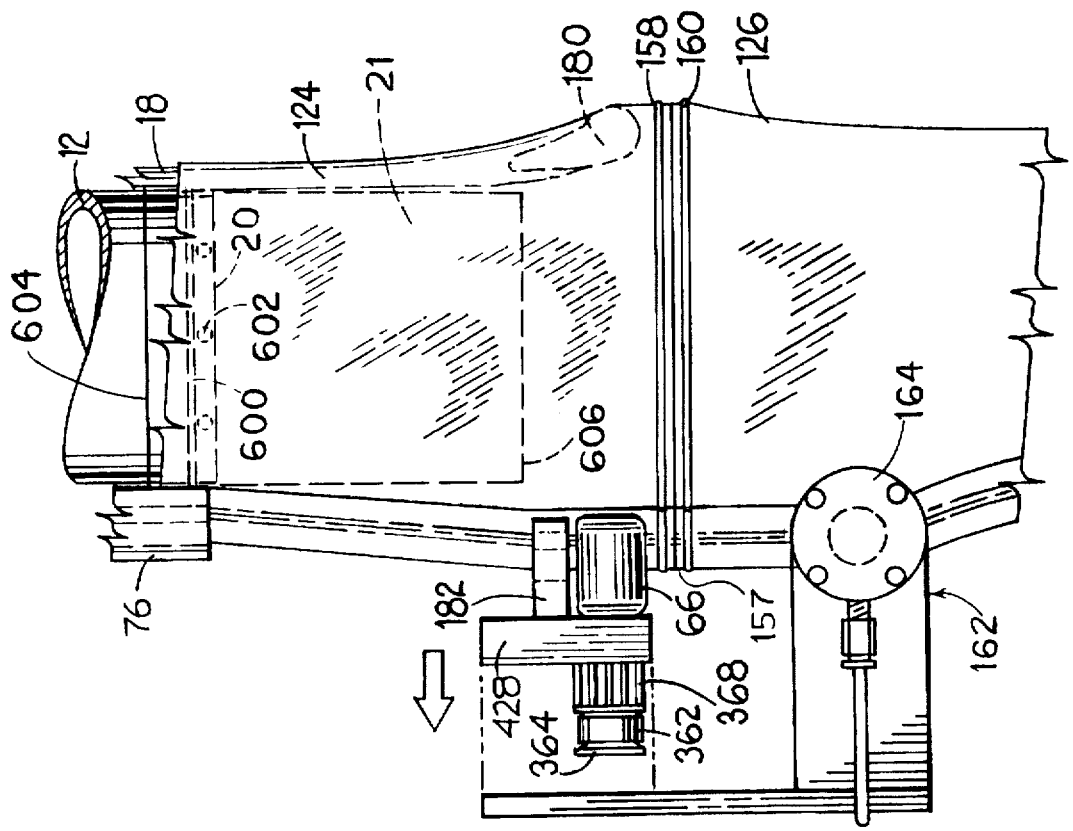
FIG. 7 is a side view representation similar to that of FIG. 6 except that the zipper drive rollers and bag grabber mechanism are shown in their extended plastic tube tensioning position.

Supported for reciprocation relative to the jaws 132 and 134 are C-shaped heater elements 144 and 146 each having respective upper and lower heating surfaces 148 and 150 and 152 and 154 for forming first and second horizontal seals 158 and 160 across the tube 124. A knife or cutting blade 156 is located within the opening in either heater element 144 or 146 and is reciprocated in order to sever the tube 124 along a line 157 midway between the first and second horizontal seals 158 and 160 (FIG. 7). In accordance with one embodiment of the present invention, the plastic tube 124 is severed by blade 156 during initial formation of the horizontal seals 158 and 160 because the severing occurs more quickly and cleanly when the plastic tube 124 is cold.

As will be described in greater detail below, pinch seal assembly 130 is mounted on a rectangular base plate 1000, which is itself mounted on a rectangular drawer bottom 1002. Base plate 1000 and drawer bottom 1002 each have a central rectangular opening 1004 and 1005 which provides for passage of the bag precursor 124, product and bags 126 therethrough. Base plate 1000 is releasably attached to drawer bottom 1002 by four threaded fasteners 1006 (one near each corner of the base plate) received in respective threaded openings in drawer bottom 1002. The drawer bottom 1002 is attached to respective right and left drawer slides or guides 1008 and 1010 which allow the entire pinch seal assembly 130, base plate 1000, and drawer bottom 1002 to be pulled forwardly out of the machine for servicing, maintenance, adjustment or for converting the machine to produce pillow type bags. Each drawer guide 1008 and 1010 includes an I channel 1012 and 1013, which slides in a U channel 1014, which slides in a C channel 1016 and 1018. A front drawer panel 1020 is attached to the drawer bottom 1002 by a plurality of threaded fasteners 1022 received in respective threaded openings 1023 in the front surface of drawer bottom 1002.

With reference to FIGS. 1, 6, 7, and 9 of the drawings, downstream of the pinch seal assembly 130 is a bag grabber mechanism 162 including opposing identical pneumatic actuators 163 and 164 each having respective piston rods with resilient rubber end caps 166 and 168 mounted on the end of each piston rod. The end caps 166 and 168 are forced against opposing sides of zipper cap strip 52 and thereby grab or clamp one corner of the bag 126 during the final stages of bag formation and tension the tube 124 as will be described in greater detail below. Bag grabber 162 is designed to cooperate with an adjacent roller conveyor (not shown) which feeds finished, product-filled, reclosable bags to an automatic case packer or other similar packing or packaging apparatus.

Typically, the completed product-filled reclosable bag 126 has side edges 170 and 171, a reclosable, sealed top edge 172, and a base edge 174. Usually, the reclosable zipper is located along the top of a finished product-filled bag. However, certain products are now being marketed with a reclosable zipper along the side or bottom of the bag. Thus, it is to be understood that the finished bag could have the reclosable zipper along any edge by orienting the package design, printing, label, etc., in the desired orientation on the plastic film 22.

In accordance with one example of the present invention, the fill tube 12 is an oval cross section five inches wide and eight inches long and has a vertical length of thirty-six inches. This fill tube is used with a twenty-four inch wide, two to three mil thick polyethylene film to produce product-filled bags 126 having a top 172 to bottom 174 dimension of about twelve inches and a width (edge 170 to edge 171) in the range of from about four to nineteen inches.

It is contemplated that the vertical form, fill and seal machine 10 of the present invention can produce edge fin seal bags having a top 172 to bottom 174 dimension of from about four to sixteen inches determined by the size and shape of the fill tube and width of the plastic film. The amount of product added to each bag may range from about zero to ten pounds. The machine 10 can produce product-filled reclosable bags at high rates of from thirty to one hundred or more bags per minute depending on the size of bag being produced. At a bag production rate of thirty bags per minute, each bag forming sequence is about two seconds which requires the different components of the machine 10 to operate very rapidly. At thirty bags per minute, the machine 10 can produce 1,800 bags an hour and 14,400 bags in an eight hour shift if the machine were operated continuously.

With reference to FIGS. 1 and 17–19 of the drawings, and in accordance with one embodiment of the present invention, downstream of the pinch seal assembly 130 and bag grabber mechanism 162 and below base plate 1000 and drawer bottom plate 1002 is a bag squeezer unit 950 including opposing squeeze plates 952 and 954 each having respective squeeze pads 956 and 958 attached to the inner surface thereof. The pads 956 and 958 are forced against opposing sides of the product-filled tube 124 following tensioning of the tube (stretching) by zipper drive rollers 66 and 68 and bag grabber mechanism 162 and prior to horizontal sealing and severing of the tube by pinch seal assembly 130 in the final stages of bag formation. The bag squeezer unit 950 removes excess air and/or compacts the product in the product-filled tube 124 prior to sealing and completion of the reclosable bag 126. Removal of the excess air and compaction of the product serves to enhance the aesthetic appearance of the finished bags, and reduces the size of the finished bags thereby allowing for a greater number of bags to be packed into a case and/or allowing the case size to be reduced facilitating the shipment and storage of more cases per pallet, truck, train, etc. Reducing the size of the bags also reduces shelf space or storage requirements by retail outlets and consumers. Also, by removing excess air from the bags, the bag squeezer unit 950 reduces freezer burn or frost damage to frozen packaged products and reduces damage to the bags and products during shipping, handling and storage by reducing or eliminating air pockets and shifting of the products in the bags.

In accordance with the present invention, an exemplary bag forming sequence is started by retracting the squeeze pads 956 and 958 of bag squeezer 950 and the bag grabber end caps 166 and 168 of pneumatic actuators 163 and 164 to release a previously formed product-filled reclosable bag 126. Next, a bag length increment of plastic film 22 and zipper strip 52 is drawn down through the machine 10 by activating common drive source 122 and thereby rotating drive roll 26, film pull belts 48 and 50, and zipper drive rollers 66 and 68 in an accelerate-run-decelerate cycle increment. When the bag length increment of plastic film and zipper strip is being pulled down through the machine 10, the zipper drive rollers 66 and 68 are in their retracted position (FIG. 6) where they are aligned vertically with the guide bar 76 and grooved idler rollers 72 and 74 along a vertical axis parallel to the longitudinal axis of the fill tube 12.

Next, heater platens 88 and 90 are reciprocated inwardly toward the divider 46 so that heating surfaces 92 and 94 are brought into contact with edges 42 and 44 of the plastic film 22 in order to produce a heat seal between the webs 60 and 62 of zipper strip 52 and the plastic film 22. Zipper flattening means 116 is brought into contact with the zipper portion of the zipper strip 52 in order to flatten the zipper in the area where the tube 124 is to receive horizontal seals and be severed.

Prior to clamping jaws 132 and 134 against tube 124, the bag grabber end caps 166 and 168 are clamped against the zipper strip 52 of plastic tube 124 and then zipper drive rollers 66 and 68 and bag grabber end caps 166 and 168 are extended away from fill tube 12 to stretch the plastic tube 124 opposite a lower flattened end 180 of the whisker 18 (FIG. 7). Zipper drive rollers 66 and 68 and end caps 166 and 168 are kept in their extended bag tensioning or stretching position until the end of the bag-forming cycle so that the tube 124 is stretched at its base during filling with product, severing, and the formation of the horizontal seals. Stretching of the tube 124 prior to severing and sealing helps to ensure a clean sever and that airtight horizontal seals are formed by eliminating wrinkles from that area of the tube 124. Also, the bag grabber end caps 166 and 168 and/or bag squeezer squeeze pads 956 and 958 support the previously filled and sealed tube portion to further reduce wrinkling in the area of the tube 124 to be horizontally sealed and severed.

While the tube 124 is being stretched by the zipper drive rollers and bag grabber, squeeze plates 952 and 954 or pads 956 and 958 of bag squeezer 950 are brought together to squeeze the excess air from the product-filled plastic tube. Next, clamping jaws 132 and 134 are brought together so that tube 124 is clamped therebetween and stagers 136 and 138 are brought into proximity with tube 124 and allow product to be dropped down through funnel 14 and fill tube 12 into the area of the tube 124 above the stagers 136 and 138. Surfaces 140 and 142 of the stagers are padded to cushion the impact of the product against the tube 124.

The C-shaped heater bars 144 and 146 are brought into contact with the tube 124 to form the first and second horizontal seals 158 and 160. The cutting blade or knife 156 is reciprocated to slice through the tube 124. As heater platens 88 and 90 are pulled away from the zipper strip 52 and plastic film edges 42 and 44, and heater bars 144 and 146 are reciprocated away from the plastic tube 124, the vertical seals and cross-seals (horizontal seals) are cooled with pressurized air.

It is to be understood that FIG. 1 of the drawings is somewhat schematic for the sake of clarity. For example, a portion of the plastic tube 124 has been removed in the area of the base 20 of the fill tube 12 and the depending whisker 18. Also, knife blade 156 is shown separate from the jaws 132 and 134 when, in fact as shown in FIG. 4 of the drawings, knife blade 156 is supported within the heater bar 144 of jaw 132. Further, at the end of a bag forming cycle and the beginning of the next cycle, the jaws 132 and 134 would be clamped against the tube 124 and the tube 124 would be filled with a bag increment of product in the area of stagers 136 and 138.

With reference again to FIG. 2 of the drawings, the machine 10 is shown without the plastic film 22 or zipper strip 52 loaded therein. It is a simple matter to load and unload the plastic film and zipper strip to and from the machine 10. For example, at the end of the work day when the machine is to be cleansed and disinfected, one need only cut the plastic film 22 upstream of the drive roll 26 and cut the plastic zipper strip 52 between the grooved rollers 70 and 72, and thereafter drive the film pull belts 48 and 50 and zipper drive rollers 66 and 68 a sufficient length of time to pull the entire remaining pieces of plastic film 22 and zipper strip 52 through the machine 10. Next, endless film pull belts 48 and 50 are reciprocated away from fill tube 12 and heater platens 88 and 90 are reciprocated away from divider 46 a sufficient distance to allow them to pass by guide bar 76 and be moved away from fill tube 12. Then, fill tube 12, guide member 34, collar 32, heat shields 36 and 38, air conduits 108 and 110, guide bar 76 and horizontal brackets 104 and 106 are moved forward on slides or guides away from the other machine components a sufficient distance to be cleansed and sanitized using conventional high pressure hot water cleaning equipment.

Figure 6:
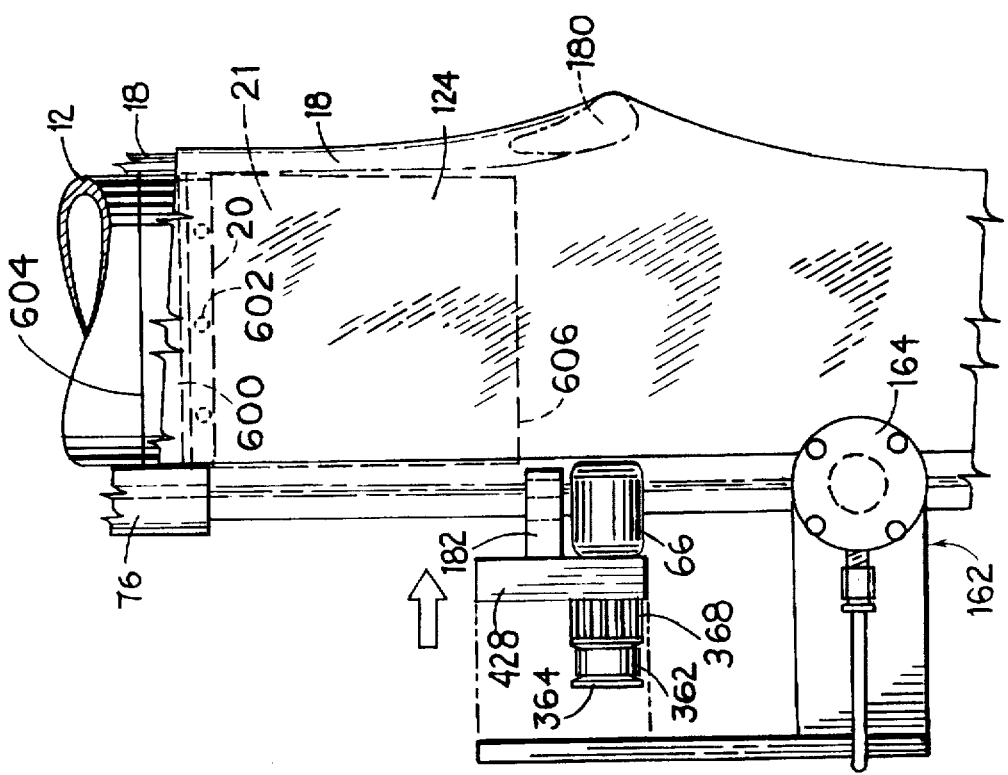
FIG. 6 is a side view illustration of the lower portion of the fill tube, the zipper drive roller and bag grabber assembly of the machine of FIG. 1 with the zipper drive rollers and bag grabber mechanism in their retracted position.

Loading of the plastic film 22 and the zipper strip 52 in the machine merely requires feeding the end of the plastic film 22 between the drive and pinch rolls 26 and 28, under directional roller 30, over collar 32 and down between guide member 34 and fill tube 12 and feeding zipper strip 52 over grooved roller 70, down between grooved rollers 72 and 74, down over divider 46, and into guide bar 76. Pulsing of the common drive source 122 causes drive roll 26 and endless film pull belts 48 and 50 to move the plastic film 22 and zipper strip down along fill tube 12 and through guide bar 76. Although it is not shown in FIG. 1, it is to be understood that a short zipper strip guide element 182 having the same cross-section as guide bar 76 can be added just above zipper drive rollers 66 and 68 to ensure that zipper strip 52 is fed to and remains in the correct position between the rollers 66 and 68 (FIGS. 6 and 7). Once the plastic film 22 and zipper strip 52 have been fed down between clamping jaws 132 and 134, the machine 10 is ready to produce product-filled reclosable bags.

Figure 8:
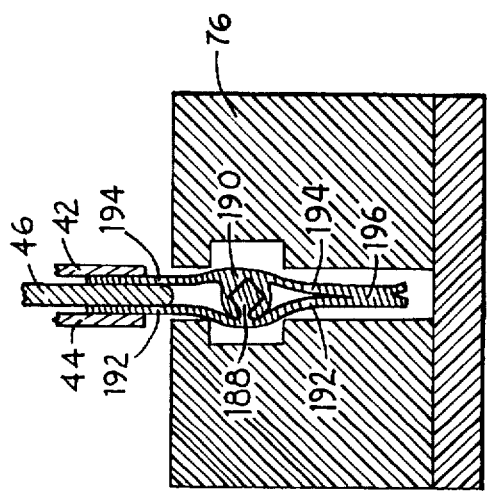
FIG. 8 is a partial section view similar to FIG. 3.

With reference to FIG. 8 of the drawings and in accordance with a different embodiment of the present invention, the zipper strip 52 is replaced with a different zipper strip 186 having interlocking male and female fastener elements 188 and 190, each attached to a central area of respective plastic webs 192 and 194 with webs 192 and 194 being ultrasonically joined or heat sealed together at their outer edge 196. The inner edges of the webs 192 and 194 are joined to the outer edges 42 and 44 of plastic film 22 in the same fashion as the webs 60 and 62 of zipper strip 52.

With reference again to FIGS. 1 and 4 of the drawings, and in accordance with an exemplary embodiment of the present invention, the pinch seal assembly 130 is shown to include a rotary actuator 200 which is operated under computer control by computer control system 120. As illustrated, the rotary actuator 200 may comprise a Schrader Bellows PTR252 or NUMATICS dual rack and pinion rotary actuator or a two inch bore double rack pneumatic rotary actuator sold under the trademark "BIMBA PNEUTURN" by BIMBA Mfg. Corp. The rotary actuator 200 provides approximately 180° of clockwise or counterclockwise rotation with up to several hundred inch pounds of torque. Various other forms of rotary actuators including pneumatic, hydraulic, or electric motor actuators and other cylinder actuators are available and may alternatively be utilized for the rotary actuator 200. It will be noted, however, that the double rack mechanism has the advantage that the linear forces involved tend to balance due to the oppositely directed linear motion of the two racks. The rotary actuator 200 is provided with a flexible air hose 201 connected to an air pressure source via solenoid valves responsive to electronic signals from the computer control system 120, and possibly air flow control valves for controlling speed and acceleration of the mechanism. The pinch sealer drive mechanism of the present invention is similar to that shown in U.S. Pat. No. 5,167,107 issued on Dec. 1, 1992.

The rotary actuator 200 is secured in a fixed position on the jaw base plate 1000 and has an output shaft 202 on which is mounted a disc 204 serving as a two lever crank and also as a belt sprocket. The crank function of disc 204 is implemented by pins 206 and 208 serving as pivots for links 210 and 212. Each of the links 210 and 212 has an offset or dogleg to permit rotation of disc 204 through 180° without interference between links 210 and 212.

Two slide rods 214 and 216, which are fixed to the base plate 1000 by upstanding brackets 217, serve as a track for the reciprocating motions of pinch seal sliders 218 and 220. Low friction bushings or bearings 222 serve to reduce the sliding friction of sliders 218 and 220 on rods 214 and 216. Sliders 218 and 220 are provided with pins 224 and 226 serving as pivot pins to connect one end of slider 218 to link 210 and one end of slider 220 to link 212. As shown in FIG. 4 of the drawings, sliders 218 and 220 are in their most distant position and will be drawn together by clockwise motion of disc 204 and will reach their most proximate position after about 180° rotation of disc 204.

An endless toothed belt 228 provides a driving connection between disc 204 and a sprocket 230 mounted on a rotatable shaft 232. Shaft 232 is beyond the range of travel of slider 220 and extends to and beyond the opposite end of slider 220 where a sprocket 234 is secured thereon. Rotation of disc 204 is transmitted by belt 228, sprocket 230, shaft 232, sprocket 234, and through a belt 236 to a disc 238 which is rotatably mounted on a shaft coaxial with the output shaft 202 of rotary actuator 200 and supported in a bushing or bearing in the rear surface of a support block 240 fixed to base plate 1000. Pins in disc 238 pivotally connect disc 238 to links 246 and 248. Links 246 and 248 are pivotally connected at their extreme ends by pins 242 and 244 to the sliders 218 and 220. Belt tensioning assemblies 250 and 252, each including grooved idler rollers 251 and 253, are provided for tensioning the belts 236 and 228.

Thus, it will be seen that there is provided a link and slider mechanism operated by disc 238 which is an exact counterpart of the mechanism operated by disc 204, and that disc 238 operates in unison with disc 204 thereby causing the motion of the one end of sliders 218 and 220 to conform to the motion of the other end thereof. It is contemplated that rotary actuator 200 could be operatively attached to either end of shaft 232 or to the shaft supported by block 240 in place of being attached to shaft 202 and still provide the necessary rotary actuation to the pinch seal assembly 130.

In accordance with the particular embodiment shown in FIG. 4 of the drawings, the clamping jaw 132 of pinch seal assembly 130 is made up of the slider or slider bar 218 and upper and lower parallel plates 258 and 260 projecting inwardly toward the center of the assembly from the inner surface of slider 218 (FIG. 1). Likewise, jaw 134 is made up of the slider 220 and upper and lower parallel plates 262 and 264 projecting from the inner surface of the slider 220. Stagers 136 and 138 are mounted on the upper surface of the plates 258 and 262 respectively. Heater bar 144 is mounted for reciprocation relative to jaw 132 by being supported on piston rods 266 of air cylinder units 268 and 270. Air cylinder units 268 and 270 are mounted on the exterior surface of the slider 218 with each cylinder rod 266 passing through the slider 218 and being connected to the rear surface of the heater bar 144. Similarly, the heater bar 146 is mounted for reciprocation relative to jaw 134 by being attached to respective cylinder rods 272 of air cylinder units 274 and 276. The air cylinder units 274 and 276 are mounted on the exterior surface of the slider 220 with each cylinder rod 272 passing through slider 220 and being connected to the rear surface of the heater bar 146.

Activation of the air cylinder units 268, 270, 274, and 276 causes extension of their respective cylinder rods and, as such, forces the front surfaces 148 and 150 of the heater bar 144 to extend beyond the front surface of the jaw 132 and likewise causes the front surfaces 152 and 154 of the heater bar 146 to extend beyond the front surface of jaw 134. Deactivation of air cylinder units 268, 270, 274 and 276 causes retraction of their respective cylinder rods and, hence, retraction of the heater bars 144 and 146 back into clamping jaws 132 and 134. Each of the air cylinder units 268, 270, 274, and 276 is provided with a flexible air hose connected with a source of pressurized or compressed air via solenoid valves responsive to electronic signals from control system 120.

Each of the upper and lower plates 258 and 260 of clamping jaw 132 and 262 and 264 of clamping jaw 134 includes a plurality of small air passages 278 for supplying pressurized air in the area of the heater bars 144 and 146 to cool the cross-seals 158 and 160 formed in the plastic tube 124. In accordance with the particular embodiment shown, each of the plates 258, 260, 262 and 264 includes one elongate air passage extending along the length of the plate and set back a short distance from the front surface of each plate (passage 280 in plate 258 and passage 282 in plate 262), a groove running along the length of each plate parallel to the elongate air passage (groove 284 in plate 258, groove 286 in plate 262, and groove 288 in plate 260), and a plurality of cross passages which provide fluid connection between the elongate air passage (284 and 286) extending along the length of each plate and the groove in each plate (air passages 278 in groove 288 of plate 260). A source of pressurized air is connected via flexible conduits and a solenoid valve to each of the elongate air passages in each of the plates 258, 260, 262, and 264.

With reference again to FIG. 4 of the drawings, knife blade 156 is mounted for reciprocation relative to heater bar 144 and clamping jaw 132 via a pair of air cylinder units 292 and 294, each having a respective piston rod or shaft 296 and 298 connected to opposite ends of the knife blade 156. The air cylinder units 292 and 294 are mounted on the outer surface of the slider 218 and have their respective shafts 296 and 298 passing through the slider 218. Although knife blade 156 is shown mounted within the central cutout or groove of heater bar 144, it is contemplated that the knife blade 156 could be mounted for reciprocation with respect to either heater bar 144 or 146. Activation of the air cylinder units 292 and 294 causes extension of the shafts 296 and 298 which forces knife blade 156 to extend beyond the front boundary of heater bar 144 and slice through the plastic tube 124 between the location of the upper and lower horizontal seals 158 and 160. Deactivation of the air cylinder units 292 and 294 causes retraction of the shafts 296 and 298, which pull the knife blade 156 back within the confines of the heater bar 144. A source of pressurized air is connected via flexible conduits and solenoid valves to each of the air cylinder units 292 and 294. The solenoid valves are operated under control of the computer control system 120 to provide for extension and retraction of the respective shafts. Suitable air cylinder units are produced by BIMBA Mfg. Corp.

The stagers 136 and 138 serve to support the product dropped down through funnel 14, fill tube 12, and into the plastic tube 124 prior to reciprocation of the clamping jaws 132 and 134 away from the tube 124. The padded surfaces 140 and 142 of the stagers 136 and 138 cushion the dynamic force of the product as it is stopped within the plastic tube 124 after falling down through fill tube 12 to prevent any damage to plastic tube 124. In accordance with a preferred embodiment of the present invention, the flexible boot or sleeve 21 is added to the lower end 20 of fill tube 12 and extends down to the area between the stagers 136 and 138. The sleeve 21 serves as an extension of the fill tube 12, aids padded surfaces 140 and 142 in protecting the plastic tube 124 from being damaged by falling product, and keeps the inner surface of the plastic tube 124 free of product, moisture and grease in the area to be cross-sealed and severed. Keeping the inner surface of the plastic tube 124 clean in the area to be sealed and severed facilitates the production of air tight seals, seals which will not pull apart, and is clean and straight severing of the plastic tube. The flexible boot 21 is preferably formed of a heavy duty flexible plastic material, such as, polyurethane belt material and is preferably removably attached to the exterior of the fill tube 12 by, for example, a plurality of threaded fasteners, a removable or replaceable metal band (FIGS. 6, 7 and 11), or an elastic band. The flexible boot 21 can be washed and sanitized or replaced at the end of each working cycle of the machine 10.

The pinch seal assembly 130 provides for rapid reciprocating motion of the sliders 218 and 220 with a mechanical linkage which produces the rapid accelerations for high speed operation while at the same time having the linkage so balanced that undesirable vibrations are almost entirely eliminated. Furthermore, the linkage, having 180° travel of the crank, causes smooth decelerations minimizing shock and further enhancing the smoothness of operation and durability of the system. The throughput of a form, fill and seal machine is often limited by the speed of operation of the pinch sealer and the apparatus of the present invention provides capability for substantially more than one hundred operations per minute with excellent reliability and minimal vibration.

In accordance with the exemplary embodiment of the present invention shown in FIGS. 1, 4, 9, and 22 of the drawings, the pinch seal assembly 130 and base plate 1000 form a self-contained pinch seal unit 1024 which can be pulled forwardly out of the machine 10 on drawer bottom 1002 and slides 1008 and 1010 for service or to index the entire pinch seal assembly 90° clockwise to produce pillow type bags. Shaft 232 of pinch seal assembly 130 is supported for rotation by upstanding brackets 1026 and 1028 and friction reducing bushings or bearings 1030 (FIG. 1). The brackets 1026 and 1028 are fixed to base plate 1000. Attached to the center of shaft 232 is a large knurled disc 1032 which facilitates manual rotation of shaft 232 and the opening or closing of jaws 132 and 134.

Each of the belt tensioning assemblies 250 and 252 is of similar construction and includes the idler pulley 251 and 253 mounted on one end of a lever arm 1034 and 1036 pivoted near its center by a threaded fastener 1038 and 1040 supported in the bracket 1028 and 1026. Each of the pulleys 251 and 253 is biased upwardly to tension the belts 236 and 228 by a vertically oriented threaded member 1042 and 1044 supported in a threaded opening in a horizontal bracket 1046 and 1048 and which contacts the opposite end of the lever 1034 and 1036. A spherical knob 1050 and 1052 is fixed to the top of each of the members 1042 and 1044 to facilitate the manual turning of the members. The tension is increased by clockwise rotation of knobs 1050 and 1052.

The air hose or hoses 201 to the rotary actuator 200, to the air passages 280 and 282 in the plates 258, 260, 262 and 264, and to each of the cylinders 268, 270, 274, 276, 292, and 294 are elongated by an extra three or four feet or include quick disconnect couplings to allow the pinch seal assembly and base plate unit 1024 to be pulled forwardly out of the machine 10 and to is allow the pinch seal unit 1024 to be indexed 90°. Likewise, an electrical connection or cable 1054 between the control system 120 and the pinch seal assembly 130 is elongated or includes a quick disconnect coupling 1055 having a knurled threaded ring 1056 releasably attached to a base plug 1058 extending from the top surface of a distribution box 1060 attached to base plate 1000. Extending from the side of box 1060 are the electrical wires 1062 for the heater bars 144 and 146 and electrical wires 1064 for a jaw position sensor such as a metal detecting type proximity sensor or switch. The wires 1062 are of the necessary length to accommodate the movement of jaws 132 and 134.

Figure 21:
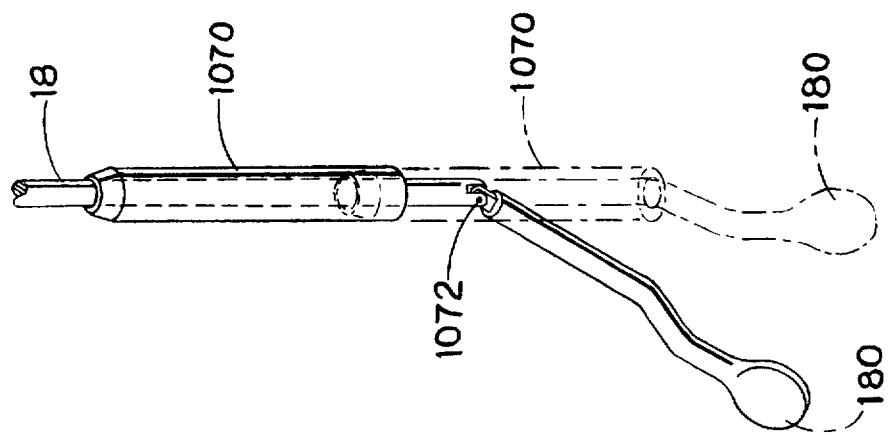
FIG. 21 is an enlarged detail view of the hinged tensioning whisker of the machine of FIG. 1.

The pinch seal assembly and base plate unit 1024 is moved forwardly from the bag production position shown in FIG. 1 to a forward servicing or indexing position by clearing the plastic film and zipper strip from the area of the pinch seal assembly, shutting off the power to the machine control system 120, loosening two threaded fasteners 1066 holding the drawer front 1020 to machine frame 1134 (FIG. 22), uncoupling the electrical quick disconnect 1055 (FIG. 4) and stowing the electrical cable 1054 up and out of the way, raising a locking collar 1070 up off of a hinge 1072 in whisker 18 (FIG. 21) to allow the lower end of the whisker to swing out of the way of the rear pinch seal assembly components including the disc 204, belt 228, and actuator 200, and then simply pulling the drawer front 1020 forwardly which pulls the base plate 1000, drawer bottom 1002 and pinch seal assembly 130 forwardly the desired distance. Drawer slides or guides 1008 and 1010 are selected to be sturdy enough to hold the pinch seal assembly 130, base plate 1000, drawer bottom 1002 and drawer front 1020 cantilevered out in front of the machine 10.

Then, the pinch seal assembly and base plate unit 1024 can be indexed 90° by simply removing the four corner bolts 1006 to free the base plate 1000 from the drawer bottom 1002, lifting the pinch seal assembly and base plate unit 1024 sufficiently to clear the drawer front 1020, rotating the unit 1024 90° clockwise, placing the unit 1024 back on the drawer bottom 1002, and reattaching the base plate 1000 to the drawer bottom 1002 using the four bolts 1006.

The unit 1024 is placed back in an operative pillow type bag production position (FIG. 23) by pushing the drawer front 1020 back toward the machine until drawer front 1020 contacts the machine frame 1134, inserting the bolts 1066, reattaching the electrical cable 1054 to the box 1060, sliding locking collar 1070 over whisker hinge 1072, and turning the power back on to the machine control system 120.

Figure 5:
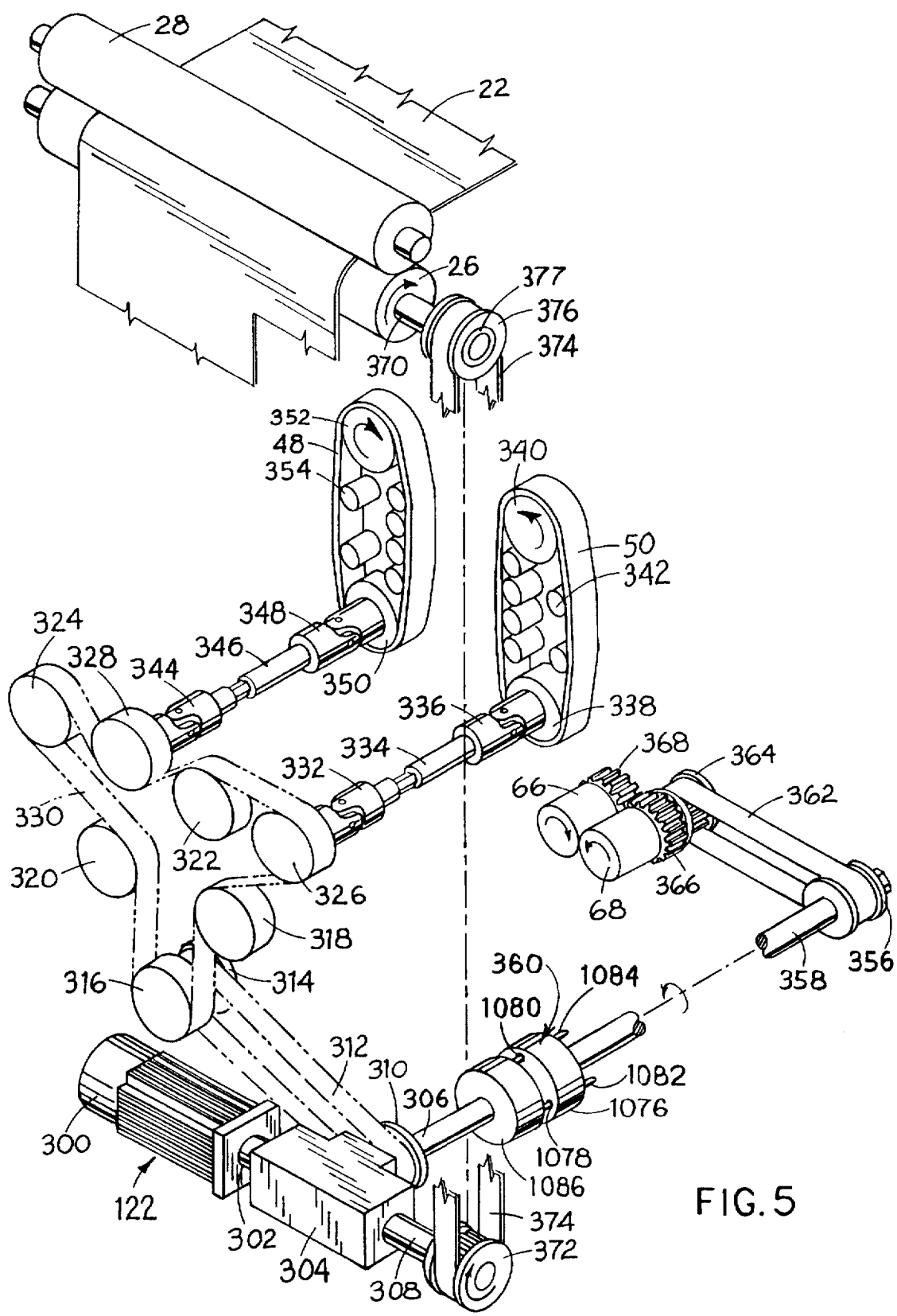
FIG. 5 is a fragmentary rear perspective representation of the common drive arrangement of the machine of FIG. 1.

In accordance with an exemplary embodiment of the present invention and as illustrated in FIG. 5 of the drawings, the common drive source 122 for driving the plastic film drive roll 26, the endless pull belts 48 and 50, and the zipper strip drive rollers 66 and 68 includes an electric servomotor 300, such as, an ELECTRO-CRAFT IQ2000 or IQ5000 Positioning Drive, by Reliance Electric, Eden Prairie, Minn., controlled by computer control system 120 and having an output shaft 302 serving as an input to a right angle or T-transmission 304. The transmission 304 has a first output shaft 306 which provides drive to both the pull belts 48 and 50 and the zipper drive rollers 66 and 68 and a second output shaft 308 which provides drive to the drive roll 26. When servomotor 300 is activated by computer control system 120, motor output shaft 302 and transmission output shafts 306 and 308 rotate clockwise.

The drive train for the pull belts 48 and 50 includes a drive sprocket 310 mounted on shaft 306 adjacent the transmission 304 and a toothed drive belt 312 transferring drive from the sprocket 310 to a drive sprocket 314. Drive sprocket 314 is mounted on a common rotation axis with another drive sprocket 316 which forms part of a belt transmission including idler sprockets 318, 320, 322, and 324, drive sprockets 326 and 328, and a toothed drive belt 330 which has teeth on both its inner and outer surfaces. The belt transmission provides a horizontally compact vertical drive arrangement which drives the pull belts 48 and 50 at equal speed but in opposite directions. It is preferred that the rotation axis of each of the drive sprockets 316, 326, and 328 and each of the idler sprockets 318, 320, 322, and 324 is parallel to the rotation axis of the transmission output shaft 306.

Figure 23:
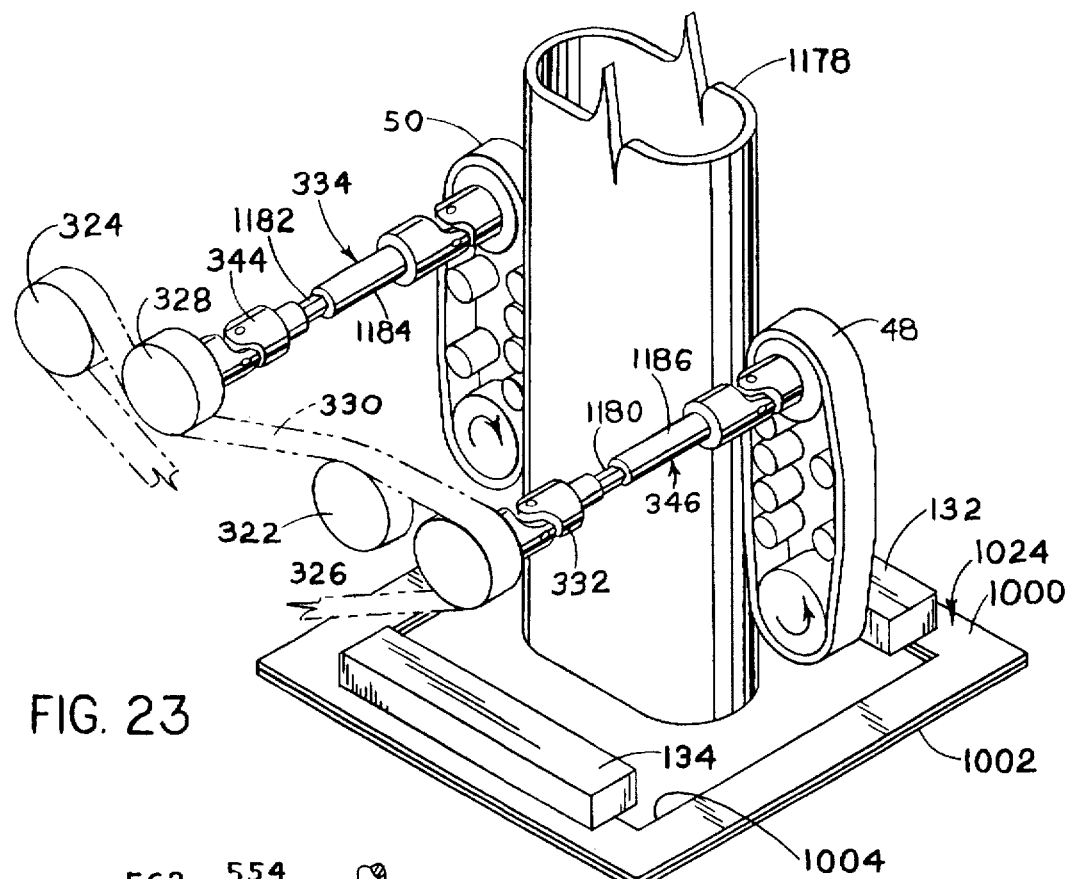
FIG. 23 is a fragmentary rear perspective representation of the pull belts in an inverted orientation and in use with the machine having been converted to produce pillow bags.
Figure 24:
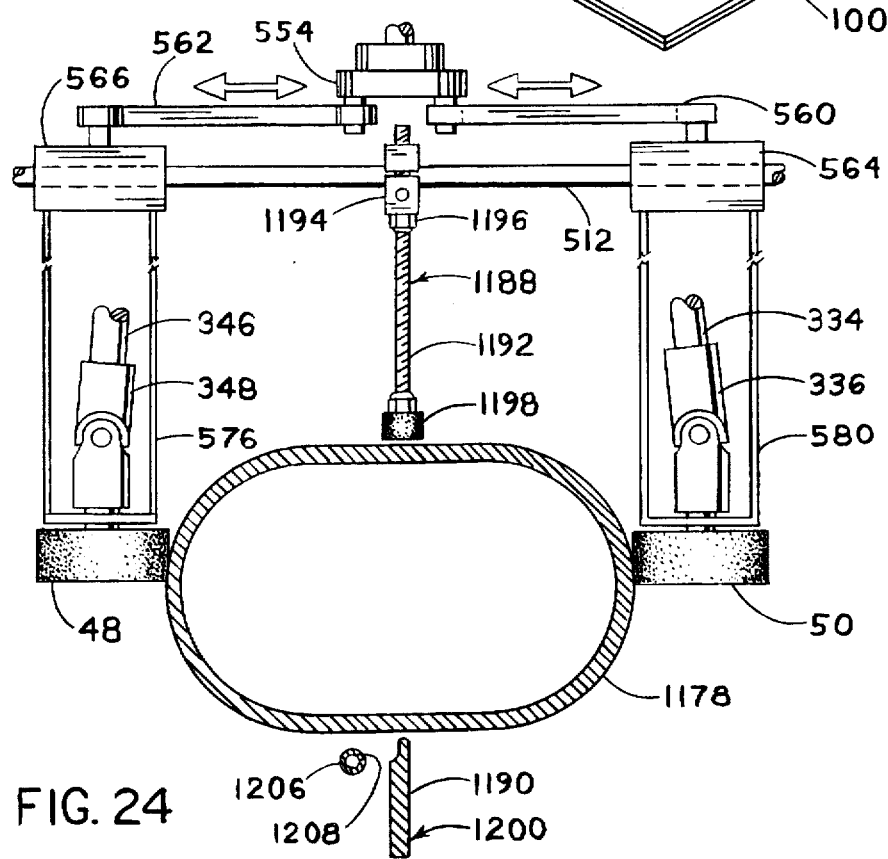
FIG. 24 is a section view of the machine of FIG. 23 with the long axis of the oval fill tube extending between the film pull belts.

The drive sprocket 326 is connected to an expanding universal joint or coupling 332 which is in turn connected to an extensible shaft 334 having another expanding universal joint 336 at its opposite end. Universal joint 336 is connected to a drive pulley or roller 338 which contacts the interior surface of the pull belt 50. The film pull belt 50 is entrained around the drive pulley 338, a large idler pulley 340, and supported by a plurality of small idler pulleys 342. Similarly, the drive sprocket 328 is connected to an expanding universal joint 344 which is connected to one end of an extensible shaft 346 having another expanding universal joint 348 at its opposite end. The universal joint 348 is connected to a drive pulley or roller 350 which provides drive to the pull belt 48 by friction engagement with the interior surface of the belt. The pull belt 48 is entrained around the drive pulley 350, a large idler pulley 352 and supported by a plurality of small idler pulleys 354. The expanding universal joints 332, 344, 336, and 348 are used in the drive train to the pull belts 48 and 50 to allow for spring biasing of the pull belts 48 and 50 against the plastic film 22, to accommodate the movement of the pull belts 48 and 50 away from the fill tube 12 during loading and unloading of the plastic film and during cleaning and maintenance of the fill tube 12. Extensible shafts 334 and 346 allow an entire pull belt unit 1074 (FIG. 2) including both pull belts 48 and 50 to be removed from the machine for service or to invert the pull belt assembly 1074 to, for example, convert the machine 10 of FIG. 1 from a machine for producing edge fin seal bags to a machine for producing pillow type bags using a product fill tube of increased vertical length (FIGS. 23 and 24).

The drive train for the zipper drive rollers 66 and 68 includes a drive sprocket 356 attached to one end of a shaft 358 operatively connected to shaft 306 by a disc and pin arrangement 360. The disc and pin arrangement 360 includes a first disc 1076 attached to shaft 358 and including spaced cylindrical openings 1078 and 1080 preferably spaced 180° from one another. The openings are adapted to receive respective elongate pins 1082 and 1084 fixed to a second disc 1086 attached to shaft 306. The pins 1082 and 1084 not only force disc 1076 and shaft 358 to rotate along with disc 1086 and shaft 306, but also allow the shaft 358 to move axially away from and toward shaft 306 when the zipper drive rollers 66 and 68 are extended or retracted and allow the disc 1076 to be quickly and easily operatively attached to or separated from pins 1082 and 1084 and disc 1086. Hence, the drive sprocket 356 rotates along with shaft 358 which rotates along with shaft 306. A toothed drive belt 362 transfers drive from the drive sprocket 356 to a drive sprocket 364 which is coaxial with and connected to drive gear 366 and zipper drive roller 68. The teeth of drive gear 366 intermesh with the teeth of drive gear 368 which is coaxial with and connected to zipper drive roller 66. Hence, as viewed from the rear of the machine, zipper drive roller 68 is rotated counterclockwise while zipper drive roller 66 is rotated clockwise. The rotational axis of the sprockets 356 and 364, and gears 366 and 368, and of the zipper drive rollers 66 and 68 are parallel to the axis of the output shaft 306.

Drive is transferred from the transmission output shaft 308 to a drive shaft 370 of the plastic film drive roll 26 by a drive sprocket 372 mounted on the shaft 308 and a toothed drive belt 374 entrained around the drive sprocket 372 and a drive sprocket 376 mounted on the drive roll shaft 370. The rotational axis of output shaft 308 is parallel to the rotational axis of drive roll 26 and the shaft 370. In accordance with one embodiment of the present invention, the drive sprocket 376 includes an over-running clutch 377 which provides for positive drive to the shaft 370 and drive roll 26 when the sprocket 376 is rotated clockwise (due to rotation of the shaft 308), but also allows the roller 26 and shaft 370 to rotate clockwise when the sprocket 376 is stationary. As such, the over-running clutch 377 allows the plastic film 22 to be pulled through the drive and pinch rolls 26 and 28 by a machine operator, a movable idler roller (phaser roller), or the film pull belts 48 and 50 and the zipper drive rollers 66 and 68.

Although it is preferred that toothed drive sprockets and toothed drive belts be used in the drive trains transferring drive from the servomotor 300 to the drive roll 26, film pull belts 48 and 50, and zipper drive rollers 66 and 68, in order to provide positive drive and precise relative drive ratios therebetween, it is contemplated that other drive transferring means such as sprockets and chain belts may be used. In accordance with an exemplary embodiment, the drive roll 26 is formed of metal while the pinch roll 28 is formed of rubber, the drive pulleys 338 and 350 have a crowned rubber exterior surface which provides an effective friction drive contact with the interior surface of the film pull belts 48 and 50, and the zipper drive rollers 66 and 68 have a rubber exterior surface which provides an effective friction grip with the zipper strip 52 squeezed therebetween.

In accordance with a preferred embodiment of the present invention, the drive roll 26 is driven at a slightly slower speed than the film pull belts 48 and 50 and the zipper strip drive rollers 66 and 68 to accommodate stretch or elongation of the plastic film 22 and zipper strip 52. The drive ratios are selected to accommodates stretching of the particular plastic film and zipper strip material being used. The drive ratios can be changed by changing the radii of the drive rollers or the number of teeth on the drive sprockets used in the different drive trains.

Figure 9:
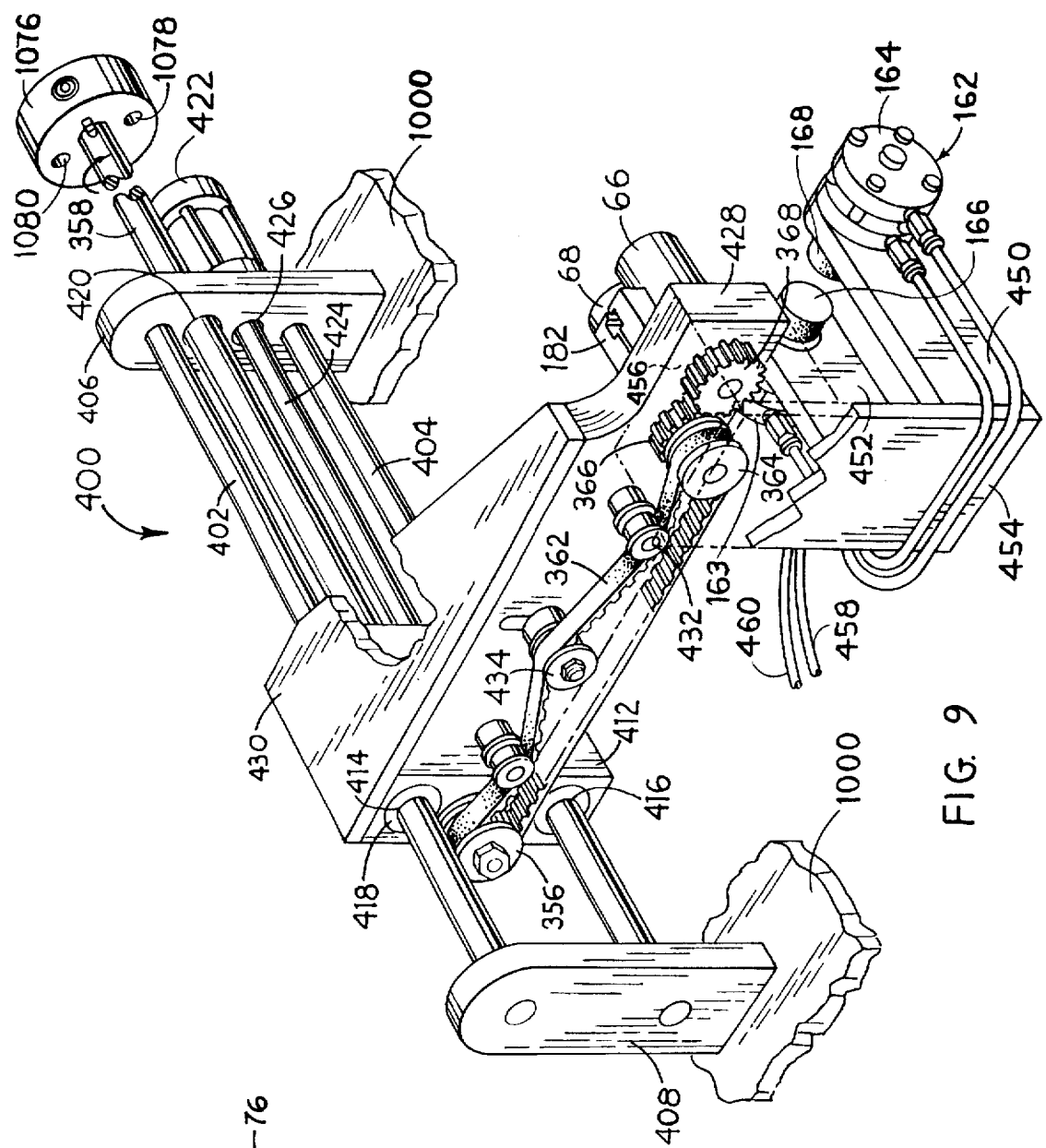
FIG. 9 is a detailed front perspective view of the zipper drive roller and bag grabber support and reciprocation assembly.

In accordance with an exemplary embodiment of the present invention and as represented in FIGS. 6, 7, and 9 of the drawings, the zipper drive rollers 66 and 68 and the bag grabber 162 are extended to a tube elongating or tensioning position (FIG. 7) prior to squeezing of the product-filled tube 124 below the clamping jaws by bag squeezer unit 950, severing the plastic tube and formation of the cross-seals 158 and 160. Zipper strip drive rollers 66 and 68 and bag grabber 162 are returned to their retracted position (FIG. 6) vertically aligned with guide bar 76 at the start of the next bag-forming cycle.

With particular reference to FIG. 9 of the drawings, a zipper drive roller and bag grabber supporting and reciprocating assembly is generally designated by the reference numeral 400 and shown to include a pair of upper and lower slide rods 402 and 404 mounted transverse to the fill tube 12 and fixed to the base plate 1000 by end brackets 406 and 408. Hence, the assembly 400 is part of the pinch seal assembly and base plate unit 1024. A vertical slide block 412 includes upper and lower parallel cylindrical openings 414 and 416 for receiving slide rods 402 and 404. Each of the openings 414 and 416 includes a friction-reducing bushing 418 which allows slide block 412 to move freely along slide rods 402 and 404. Slide block 412 also includes another cylindrical opening extending therethrough and parallel to the openings 414 and 416 for accommodating the shaft 358 which passes through slide block 412. Likewise, end bracket 406 includes a cylindrical opening 420 which provides for the passage of the shaft 358 therethrough. Cylindrical opening 420 is dimensioned larger than the shaft 358 to allow the shaft to rotate relative to the bracket 406 without obstruction.

An air cylinder unit 422 is mounted on the exterior surface of bracket 406 and has a piston rod or shaft 424 extending through a cylindrical opening 426 in bracket 406 and connected at its far end to the rear surface of slide block 412. As such, extension and retraction of the shaft 424 upon activation and deactivation of the air cylinder unit 422 causes translational movement of the slide block 412 along slide rods 402 and 404, thus, extension and retraction of the zipper drive rollers 66 and 68 and bag grabber 162 relative to the plastic tube 124.

Zipper drive rollers 66 and 68 are mounted in a cantilever fashion by being supported on an elongate member 428 which is fixed to a side surface of the slide block 412 and extends perpendicular therefrom. A generally triangular upper plate 430 is connected to the upper surface of slide block 412 and the upper surface of cantilever member 428 to provide support and rigidity thereto. The member 428 supports a plurality of idler rollers 432 and a drive belt tensioning sprocket 434 for the drive belt 362. As mentioned above with respect to FIG. 5, drive sprocket 356 is fixed to the end of the drive shaft 358 with the shaft 358 and disc 1076 moving in response to movement of slide bar 412 involved in the extension and retraction of zipper drive rollers 66 and 68 and bag grabber 162. Idler rollers 432 and tensioning sprocket 434 ensure that drive belt 362 remains entrained about drive sprockets 356 and 364. Air cylinder unit 422 is connected to a source of pressurized air via elongate flexible conduits or a quick disconnect and a solenoid valve which is operated under the control of electronic control system 120 to activate and deactivate air cylinder unit 422 at the proper times during the bag-forming cycle.

In accordance with the embodiment of the present invention shown in FIG. 9 of the drawings, bag grabber or clamping mechanism 162 includes opposing air cylinder units 163 and 164 each having respective piston rods or shafts extending toward each other and supporting end caps 166 and 168 thereon. Each of the opposing air cylinder units 163 and 164 is mounted on a respective cantilever member 452 and 450 which is suspended from plate 454 fixed to the member 428 by plates 456. A source of pressurized air is connected to air cylinders 163 and 164 by elongate flexible conduits 458 and 460, quick disconnects and solenoid valves controlled by control system 120. With reference to FIGS. 1 and 17–19 of the drawings, bag squeezer unit 950 is fastened to the machine 10 below drawer bottom 1002 with squeeze plates 952 and 954 positioned on opposite sides of the plastic tube 124 with the upper edge of the squeeze plates 952 and 954 positioned downstream of bag grabber mechanism 162 to contact with as much of the product-filled plastic tube 124 as possible. Although it is not preferred, it is contemplated that bag grabber mechanism 162 may be removed from the machine and squeeze plates 952 and 954 can be located with the upper edge thereof just downstream of the sealing jaws 132 and 134.

Figure 10:
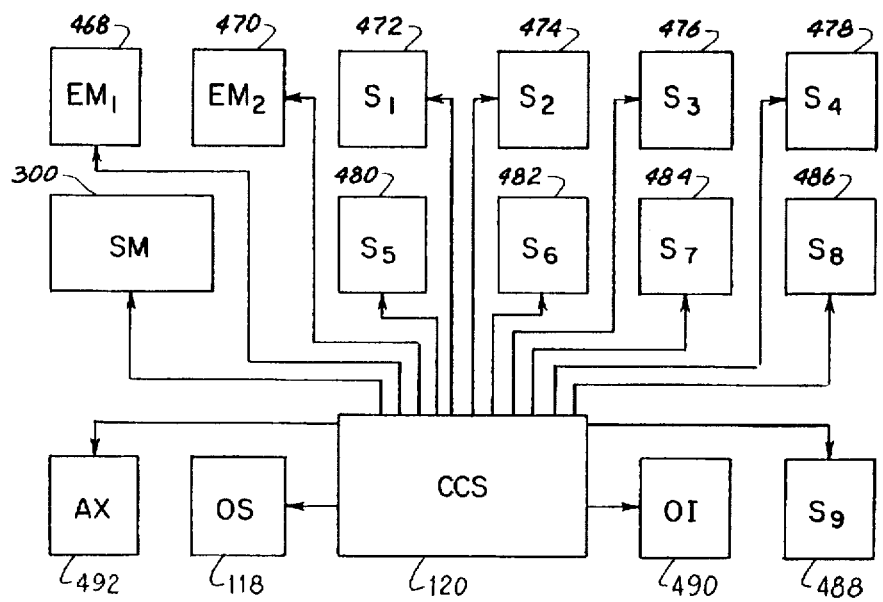
FIG. 10 is a schematic block diagram of the control system for the machine of FIG. 1.

In accordance with an exemplary embodiment of the present invention as illustrated in FIG. 10 of the drawings, the vertical form, fill and seal machine 10 includes three or more electric motors, the electric servomotor 300, a first small bi-directional electric motor 468, and another small bi-directional electric motor 470. The motor 470 is used to drive a linear actuator for positioning the plastic film supply roll 24 along its rotational axis to center the plastic film 22 with respect to the fill tube 12 and the drive and pinch roll pair 26 and 28. Electric motors 300, 468, and 470 are controlled by computer control system 120. The rest of the actuators in the machine 10 are pneumatic, that is, operated by a conventional industrial source of pressurized air which is controlled through nine or more solenoid valves 472–488 which are themselves controlled by computer control system 120. The nine or more solenoid valves 472–488 control the flow of pressurized air to the respective pneumatic (air cylinder or rotary actuator) units which are used to reciprocate the following components: heater platens 88 and 90, film pull belts 48 and 50, zipper pinch (crushing) means 116, zipper drive rollers 66 and 68, jaw members 132 and 134, heater bars 144 and 146, knife 156, bag grabber 162, and bag squeezer 950. Computer control system 120 receives input via optical sensor 118, one or more position sensors and an operator input means 490, such as a touch sensitive display screen and manually operated switches, to start and stop the machine, adjust the speed, sequence, and duration of bag producing steps, to adjust the temperature of the heater means, and to operate the electric motors. Computer input from another source, for example, a lap-top PC 492 is preferred for changes in operating parameters which should not be operator accessible. An auxiliary motor 492 may be added to the machine 10, for example, to serve as a zipper roller drive means when the pinch seal and base plate unit 1024 is indexed 90° from the position shown in FIG. 1. Such a servomotor having an output shaft driven forward by a solenoid and attached to a disc with protruding relatively short pins can be added to the right side of the machine in position to have the pins cooperate with the openings 1078 and 1080 in disc 1076.

With particular reference to FIG. 11 of the drawings, an upper end 532 of whisker 18 tapers toward the fill tube 12 to provide a smooth transition for the plastic film 22.

Figure 12:
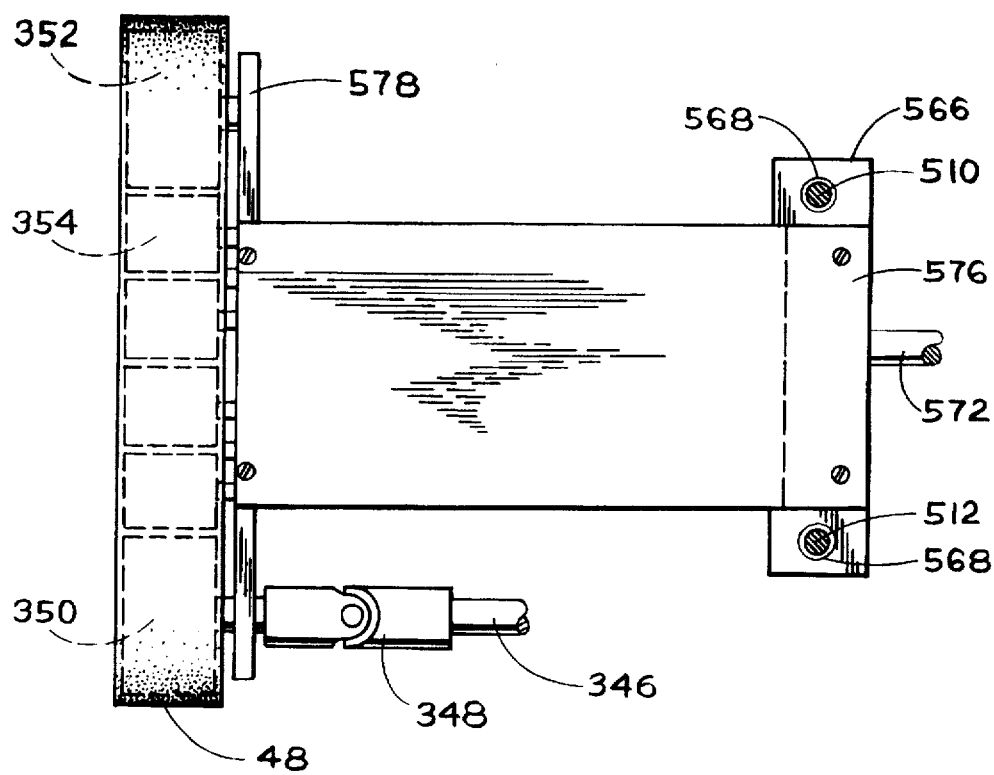
FIG. 12 is a side view representation of the pull belt biasing and support assembly.

In accordance with one embodiment of the present invention as shown in FIGS. 2 and 12 of the drawings, reciprocation of the pull belts 48 and 50 toward and away from the fill tube 12 and spring biasing of the belts 48 and 50 against the plastic film 22 is accomplished using a disc, link and rotary actuator assembly 550 similar to the disc 204, links 210 and 212, and rotary actuator 200 of the pinch seal assembly 130. Likewise, heater platens 88 and 90 and zipper pinch means 116 may be reciprocated by disc, link, and rotary actuator assemblies. Although it is preferred that disc, link and rotary actuator assemblies are used for reciprocating the jaws 132 and 134, film pull belts 48 and 50, heater platens 88 and 90, zipper pinch means 116 and squeeze plates 952 and 954, it is contemplated that other means including air cylinders and electric solenoids or motors may be used for reciprocating these items.

Rotary actuator assembly 550 includes a rotary actuator 551, for example a double rack pneumatic rotary actuator, with an output shaft 552 secured to the center of a first disc 553 attached to a second larger disc 554 which serves as a two lever crank. The rotary actuator 551 is connected to a source of pressurized air via elongate air hoses, quick disconnect fittings, and a solenoid valve responsive to electric control signals from computer control system 120. The crank function of disc 554 is implemented by pins 556 and 558 serving as pivots for links 560 and 562. The links 560 and 562 have L-shaped ends which permit rotation of the disc 554 through 180° without interference between the links 560 and 562.

Upper and lower slide rods 510 and 512 (FIG. 12) serve as a track for the reciprocating motions of respective sliders or slide blocks 564 and 566. Low friction bushings 568 reduce the sliding friction of the sliders 564 and 566 on the rods 510 and 512. The sliders 564 and 566 are provided with respective pins 570 and 572 serving as pivot pins to connect the slider 564 to the link 560 and the slider 566 to the link 562.

As shown in FIG. 2 of the drawings, the sliders 564 and 566 are near their most proximate position (pull belts 48 and 50 biased against plastic film 22 and fill tube 12) and will be pushed apart by clockwise rotation of disc 554 when it is desired to move pull belts 48 and 50 away from fill tube 12. Pull belt 48 is supported in a cantilevered fashion from the slider 566 by a pair of leaf springs 574 and 576 and a bracket member 578 which supports the shafts of end roller 352 and idler rollers 354 and includes a bearing for a central shaft of drive roller 350. Likewise, pull belt 50 is supported from slider 564 by a pair of leaf springs 580 and 582 and a bracket member 584 which supports the shafts for idler rollers 340 and 342 and includes a bearing for a central shaft of drive roller 338. The leaf springs 574, 576, 580 and 582 provide for horizontal spring biasing of the belts 48 and 50 against the plastic film 22 and fill tube 12 while at the same time providing a strong and rigid vertical support for operating the belts at high speeds and rapid accelerations and decelerations. In accordance with one example, each of the leaf springs is made of one-thirty seconds (1/32) inch thick spring steel with height and length dimensions of about three (3) inches by seven (7) inches.

The pull belt unit 1074 includes not only the assembly 550 but also an actuator support bracket 1088, and slide rod anchoring blocks 1090 and 1092. The support bracket 1088 is attached to the slide rods 510 and 512 and provides a rigid support for the rotary actuator 551. The anchoring blocks 1090 and 1092 are fixed to opposite ends of the slide rods 510 and 512. The pull belt unit 1074 is self-contained, removable, invertible, replaceable, and adjustable. With the fill tube 12 and associated apparatus moved out of the way or taken out of the machine 10, the entire unit 1074 can be taken out of the machine for service or inversion for converting the belts from the position shown in FIGS. 1 and 5 to the position shown in FIGS. 23 and 24 of the drawings.

The anchoring blocks 1090 and 1092 are releasably secured to respective cantilevered shafts 1094 and 1096 by a plurality of threaded fasteners 1098. The cantilever shafts 1094 and 1096 are fixed to the machine 10 by brackets 1100 and 1102 secured to side panels 704 and 702.

To increase or decrease the distance between the pull belts 48 and 50, rotary actuator 551 is activated to rotate disc 554. To adjust the front to back position of the pull belts along the sides of the fill tube to accommodate different sizes and types of fill tubes or to allow for obstructions, for example a side zipper strip, bolts 1098 are loosened and anchoring blocks 1090 and 1092 are moved along shafts 1094 and 1096 to the desired position and then locked into place by tightening bolts 1098. The height of the pull belts 48 and 50 on the fill tube can be adjusted by moving brackets 1100 and 1102 to thereby raise or lower shafts 1094 and 1096 or the entire pull belt unit 1074 can be taken out, inverted, and put back on shafts 1094 and 1096. Quick disconnects on the air hoses to the rotary actuator 551 and bolts 1098 provide for quick removal of the unit 1074.

In accordance with one example of the present invention, a bag-forming cycle represented as starting at 0° and ending at 359° is as follows: from 0° to 15° a previously produced, product-filled reclosable bag 126 is released from the machine 10 by deactivating air cylinders 164 of bag grabber 162; starting at 20° a bag-length increment of plastic film 22 and zipper strip 52 is drawn down through the machine 10 by activating common drive source 122 through an accelerate-run-decelerate cycle to drive film pull down belts 48 and 50 and zipper drive rollers 66 and 68 aided by film drive roll 26 to draw a bag-length increment of plastic film and zipper strip down along fill tube 12; from 110° to 359° the air cylinders 164 of bag grabber 162 are activated to clamp the zipper strip 52 between caps 166 and 168; from 110° to 359° zipper drive rollers 66 and 68 and bag grabber 162 are extended to stretch or tension plastic tube 124 by activating air cylinder unit 422 and extending shaft 424 thereby moving slide block 412 away from rear bracket 406 and toward front bracket 408; from 120° to 260° heater platens 88 and 90 are reciprocated toward divider 46 so that heater surfaces 92 and 94 are brought into contact with the edges 42 and 44 of plastic film 22 to form the seal between the zipper strip webs 60 and 62 and the edges 42 and 44; from 125° to 359° jaws 132 and 134 are reciprocated toward plastic tube 124 in order to clamp the tube 124 therebetween to place the stagers 136 and 138 in position adjacent the tube 124 for the receipt of product, and to position the heater members 144 and 146 and the knife 156 adjacent the tube 124; from 150° to 325° bag squeezer unit 950 is activated to squeeze the product-filled tube 124 between squeeze pads 956 and 958 and thereby remove excess air and/or compact the product in the tube prior to cross-sealing; from 180° to 220° knife blade 156 is reciprocated to slice through tube 124; from 160° to 260° the heater bars 144 and 146 are reciprocated to have their front surfaces 148 and 150 and 152 and 154 brought into contact with opposite sides of the plastic tube 124 to thereby form cross-seals 158 and 160; from 160° to 240° zipper weld or flattening means 116 are brought into contact with zipper strip 52 to crush or flatten the zipper in an area of zipper strip 52 where cross-seals 158 and 160 are to be made; starting at 260° product is dropped through fill tube 12 into plastic tube 124; from 260° to 359° pressurized air is released from openings 112 and 114 in conduits 108 and 110 to cool the heat seal formed between the zipper strip and the plastic film; and from 300° to 359° pressurized air is released from the openings 290 and each of plates 258, 260, 262, and 264 to cool the cross-seals 158 and 160 in the tube 124. It is to be understood that this is an exemplary bag-forming sequence, and that the duration and sequence of events is determined by factors such as the bag-forming materials being used, the rate of operation, and the amount and type of product added to each bag.

With reference again to FIGS. 1, 6, 7, and 11 of the drawings, the flexible boot or sleeve 21 is added to the lower end 20 of fill tube 12 by a releasable or replaceable metal band or strap 600 which draws the sleeve 21 tightly against the exterior of the fill tube 12. Further, the fill tube can be modified to include a plurality of nipples or nubs 602 which protrude from the fill tube 12 and help keep the band 600 and (sleeve 21) from slipping down the fill tube 12. The sleeve 21 is located between the fill tube 12 and the whisker 18 with an upper end 604 located below the pull belts 48 and 50 and a lower end 606 located above the zipper drive rollers 66 and 68.

It is contemplated that flexible sleeve 21 may be extended upwardly on the fill tube 12 to cover the entire length of the fill tube 12 allowing for projection of divider 46 therefrom by, for example, slitting the sleeve 21 and applying retaining bands 600 above and below the divider 46. The plastic sleeve 21 can serve to reduce the friction between the fill tube 12 and plastic film 22, reduce sweating (moisture build up) on the exterior of the fill tube and on the plastic film 22, as well as keep the interior of the plastic tube 124 free of moisture product and/or grease in the area to be severed and sealed. The plastic film 22 and zipper strip 52 are not shown in FIG. 11 for the sake of clarity. It is to be understood that during bag forming operation of the machine 10, the plastic film 22 covers the whisker 18, fill tube 12, wear strip 117, flexible sleeve 21, and retaining band 600.

As shown in FIG. 13 of the drawings, and in accordance with a particular embodiment, the machine 10 includes an intermittent, controlled release, zipper strip supply assembly or festooner arrangement 610 including first and second spaced vertical brackets 612 and 614 which are attached to the left side of the machine 10 as viewed from the front of the machine. The assembly 610 supports the supply roll 64 and feeds the zipper strip 52 therefrom to the grooved idler roller 70. The supply roll 64 and bracket member 614 are shown in hidden lines to provide a clear view of the other components of the assembly 610. Supply roll 64 is rotatably supported on an idler shaft 616 which rests on and is journaled by respective pairs of idler rollers 618 and 620 attached to the exterior of each bracket member 612 and 614. The idler rollers extend into an annular recess 622 near each end of the shaft 616.

An adjustable collar 624 on shaft 616 is brought up against one side of supply roll 64 and locked in position. The collar 624 ensures that the other side of supply roll 64 is brought to bear against the inner surface of a brake disc which is fixed to shaft 616 and has projecting prongs 628 which embed in supply roll 64 so that the supply roll 64 rotates with disc 626 and shaft 616. A replaceable brake pad 630 is attached to the lower surface of the free end of a lever arm 632 pivoted about a bolt or pin 634 which is attached to bracket member 612. Brake pad 630 is brought to bear against the outer surface of disc 626 by a linkage arrangement including an elongate shaft 636 which passes through lever 632 and has a brake release assembly 638 including a release handle 640 attached to its upper end and a plurality of stacked cup springs 642, a rubber spacer 644, and a pair of lock nuts 646 on its lower end. The shaft 636 passes through an opening 648 in one end 650 of a lever 652. A pin 654 retains the shaft 636 within the opening 648. Thus, the cup springs 642 are trapped between the end 650 of lever 652 and the spacer 644 and bias the brake pad 630 against disc 626 when the lever 652 is in the position shown in FIG. 13. The lever 652 is pivotally attached to bracket member 612 by a bolt or pin 655.

The upper end of an adjustable length rod 656 is attached to an end 658 of lever 652 by a bolt 659 while the lower end of rod 656 is attached to an end 660 of a first support member 662 by a bolt or pin 664. A spring 666 has its lower end secured to bolt 664 and its upper end secured to a bolt or pin 668 attached to bracket member 612.

A plurality of lower idler rollers 670, 672 and 674 extend between an end 676 of the first support member 662 and an end 678 of a second support member 662 and an end 678 of a second support member 680. A spacer bar 682 serves to define the space between support members 662 and 680 and adds rigidity and strength to the structure. A pivot bar 684 passes through each of the support members 662 and 680 and has its ends attached to bracket members 612 and 614. A stop rod 686 has its opposite ends fixed to bracket members 612 and 614 and serves to limit upward travel of the end 660 of support member 662 and an end 688 of support member 680. A pair of upper idler rollers 690 and 692 have their ends journaled in bracket members 612 and 614.

The upper and lower idler rollers 690, 692, 670, 672 and 674 serve as a festooner or accumulator for the zipper strip 52 which is pulled from supply roll 64. The spring 666 applies an upward force to the end 660 of support member 662 and tends to draw the ends 660 and 688 up against stop rod 686 and, thereby, tension the zipper strip 52 between the upper and lower idler rollers. Also, the weight of idler rollers 670, 672 and 674, spacer bar 682 and the ends 676 and 678 of support members 662 and 680 tend to cause the array of idler rollers 670, 672 and 674 to hang downwardly and thereby force the ends 660 and 688 of support members 662 and 680 up against stop bar 686. As the zipper strip 52 is driven through the machine 10, an upward force is applied to idler roller 674 by the zipper strip 52. The upward force of the zipper strip 52 and the feeding of the zipper strip from the idler rollers will cause upward movement of the idler rollers 670, 672 and 674, upward movement of the ends 676 and 678 of support members 662 and 680 and downward movement of the ends 660 and 688. Downward movement of the end 660 of support member 662 causes downward movement of rod 656 and the end 658 of lever 652. Downward movement of the end 658 causes lever 652 to pivot about pin 655 and raise end 650 which in turn raises shaft 636 and raises brake pad 630 from disc 626. Lifting of the brake pad 630 from disc 626 allows the supply roll 64 to rotate and the zipper strip 52 to be pulled therefrom.

When the zipper strip 52 is no longer being drawn through the machine 10 and supply roll 64 continues to rotate, the accumulator (idler rollers 670, 672, 674, 690, and 692) becomes filled with zipper strip. Spring 666 and the weight of the idler rollers 670, 672 and 674 returns the end 660 of the support member 662 to the upper position shown in FIG. 13 which causes the brake pad 630 to be lowered against disc 626 and stop rotation of supply roll 64. Thus, there is a controlled feed and proper tensioning of the zipper strip 52 to the machine 10.

It is contemplated that cup springs 642 may be replaced by a coil spring which would serve the same purpose of biasing the brake pad 630 against the disc 626 and cushioning the impact of the pad and disc so the brake pad 630 does not bounce on the disc 626.

In order to keep the zipper strip 52 properly entrained over grooved idler roller 70 it is preferred to add another grooved idler roller 694 parallel and adjacent to idler roller 70 to trap the zipper strip between the rollers 694 and 70. This is especially helpful when the zipper strip 52 feeds from the face of the supply roll 64 in a back and forth motion, and as such, the zipper strip travels back and forth across idler roller 674 as it exits the festooner or accumulator.

Figure 14:
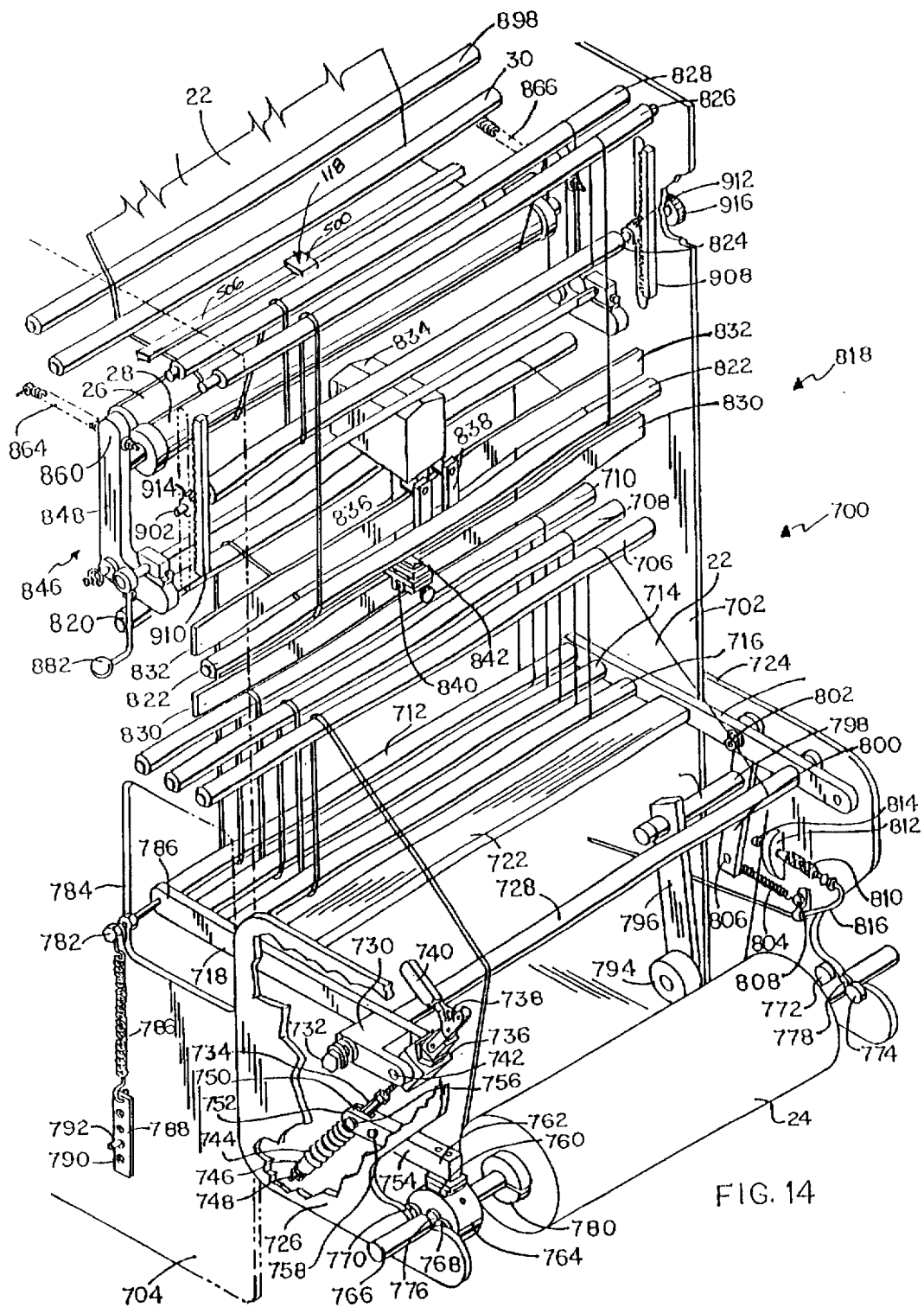
FIG. 14 is a rear perspective view illustration of the plastic film supply assembly.

In accordance with the particular embodiment of the present invention as is shown in FIG. 14 of the drawings, plastic film 22 from plastic film supply roll 24 passes through a festooner or accumulator arrangement generally designated 700 on its way to the drive and pinch roll pair 26 and 28. In the shown embodiment, the plastic film 22 feeds from the supply roll 24 in the back of the machine with the machine having right and left hand sidewalls 702 and 704 as viewed from the rear of the machine. Although the plastic film 22 is shown to be fully transparent in FIG. 14 for the sake of clarity of the other machine components, it is to be understood that machine 10 is designed to operate with plastic film which is transparent, has registration marks, has sequential packaging patterns or designs, and/or which is opaque. Usually, the plastic film 22 is transparent in the area surrounding the registration marks so that mark sensor 118 registers the sighting of a registration mark when a beam emitted therefrom is broken by the leading edge of the mark. However, it is contemplated that when using opaque or printed plastic film, the registration marks may be in the form of transparent or white areas which reflect the beam emitted by mark sensor 118 so that the sensor provides an indication of the sensing of a registration mark by receiving its emitted beam instead of having the emitted beam blocked.

The festooner arrangement 700 of FIG. 14 is similar to that of the festooner for the zipper strip 52 shown in FIG. 13. For example, the festooner arrangement 700 includes a plurality of fixed position upper idler rollers 706, 708 and 710, and an opposing levered array of lower idler rollers 712, 714 and 716 supported by first and second support members 716 and 718.

A spacer bar 722 having its ends attached to the support members 718 and 720 defines the space between the members and adds rigidity to the array or rack of lower idler rollers. Support members 718 and 720 are pivotally attached to vertical bracket members 724 and 726 along the axis of an idler roller 728 mounted between support members 718 and 720. An L-shaped member 730 is attached to the exterior of support member 718 and is adapted to receive the threaded end of a pin or bolt 732 which provides for the pivotal attachment of support member 718 to vertical bracket 726. An adjustable length rod 734 passes through a block 736 and has a brake release mechanism 738 attached to its upper end. The brake release mechanism includes a brake release handle 740. The block 736 is pivotally attached to member 730 by a pin 742 and a like pin which passes through an end of support member 718. The lower end of adjustable length rod 734 supports a plurality of stacked cup springs 744, a rubber spacer 746, and a pair of lock nuts 748. The rod 734 passes through an opening 750 and an end 752 of a brake lever 754. The rod 734 is retained within the opening 750 by a pin 756. The brake lever 754 is pivotally attached to vertical bracket 726 by a pin or bolt 758.

A replaceable brake pad 760 is attached to the lower surface of an end 762 of lever 754. The brake pad 760 rests on the outer surface of a brake disc 764 which is attached to a rotation shaft 766 which supports plastic film supply roll 24. Pairs of idler rollers 768, 770 and 772, 774 support respective ends of rotation shaft 766 and are received within respective annular recesses 776 and 778 to allow for rotation of shaft 766 while at the same time limiting axial movement thereof. Idler roller pairs 768, 770 and 772, 774 are attached to respective brackets 726 and 724. Locking collars 780 are forced against the sides of supply roll 24 and locked to shaft 766 so that supply roll 24 rotates with shaft 766. The distance between vertical brackets 724 and 726 is fixed, however, the position of brackets 724 and 726 relative to the machine 10 (sidewalls 702 and 704) is adjustable by a linear actuator including the bi-directional motor 470. Consequently, the position of plastic film 22 can be precisely centered with respect to drive roll 26 and fill tube 12.

A pin 782 extends through an opening or window 784 in sidewall 704 and is attached to an end 786 of support member 718. A spring 788 has its upper end attached to pin 782 and its lower end attached in an adjustment member 788 including a plurality of openings 790 adapted to receive a pin 792 which extends from sidewall 704.

Downward movement of the idler rollers 712, 714 and 716 is limited by an assembly including an idler roller 794, a first vertical member 796, an arm 798, and a second vertical member 800 which is fixedly attached to support member 720 by a threaded fastener 802. Idler roller 794 abuts against the plastic film on supply roll 24 and thereby limits downward travel of the support members 718 and 720 as they pivot about the axis of idler roller 728. A spring 804 has one end attached in an opening in the lower end of member 800 and its other end attached to a threaded fastener 808 which is fixed to vertical bracket 724. The spring 804 tends to draw the idler roller 794 against the plastic film on the supply roll 24.

In the position shown in FIG. 14 of the drawings, the plastic film 22 is motionless, that is, not being drawn through the machine 10. The springs 786 and 804 and the weight of idler rollers 712, 714, 716 and spacer bar 722 tend to draw the idler rollers to their lower position. In this lower position, the brake pad 760 is forced against brake disc 764 and thereby prevents rotation of plastic film supply roll 24. When plastic film 22 is drawn through the machine 10 through the combined action of pull belts 48 and 50, zipper drive rollers 66 and 68, and drive roll 26, the plastic film 22 provides an upward or lifting force on idler roller 712 which tends to draw the idler roller 712 upwardly, and force downward movement of the block 736 and adjustable rod 734. Downward movement of the rod 734 causes downward movement of the end 752 of brake lever 754 which in turn causes upward movement of the end 762 and release of the brake pad 760 from the brake disc 764. When the brake pad 760 is moved upwardly away from the brake disc 764, the supply roll 24 is free to rotate and, as such, plastic film 22 can be drawn therefrom and into the accumulator or festooner of idler rollers. When the plastic film ceases to be drawn through the machine 10 and the accumulator fills with plastic film 22, the springs 786 and 804 and the weight of the lower idler rollers 712, 714 and 716 draws the forward end of the support members 718 and 720 downwardly which causes upward movement of the rearward end of support member 718, and, thereby, reapplication of the brake pad against the brake disc 764 and stops rotation of supply roll 24.

The machine 10 includes a plastic film 22 detector 810 which is fixed to vertical bracket 724 by a flange 812. The detector 810 includes a plunger having a friction reducing end cap 814 made of nylon or a synthetic resin polymer and which rides against the plastic film 22 and provides an indication that plastic film 22 is being supplied under tension from supply roll 24 and up over idler roller 728. If for some reason there is no plastic film loaded in the machine, the plastic film tears, or the accumulator ceases to function properly and the correct tension is not applied to the plastic film 22 as it passes over idler roller 728, the plunger of detector 810 moves forward and provides an indication along a line 816 to control system 120 that there is a problem with the supply of plastic film. This causes the sounding of an alarm and causes normal operation of the machine 10 to shut down until the problem with the plastic film is fixed.

The machine 10 provides for the printing of information such as sequential numbering of packages or date stamping of sequential bags in a printing station located between the plastic film accumulator 700 and the pinch and drive roll pair 26 and 28. The printing station includes a plurality of idler rollers 820, 822, 824, 826 and 828, upper and lower vertically oriented slide bars 830 and 832, a printing unit 834 having a depending printing head 836 and a pair of positioning members 838 which are received on upper slide bar 832, and an adjustable mount 840 received on lower slide bar 830 and having a resilient pad 842 on its upper surface. The resilient pad 842 is designed to be located directly beneath the printing head 836 so that the plastic film 22 passes between the pad 842 and printing head 836 with the pad 842 serving as a resilient backing or support for the plastic film as it is being printed upon by the printing head 836. Idler rollers 820 and 822 provide for a horizontal run of the plastic film 22 between the print head 836 and backing pad 842. The printing unit 834 and mount 840 can be moved along slide bars 830 and 832 so that the plastic film can be printed on in a desired location such as along the edge or in the center of the plastic film.

Figure 15:
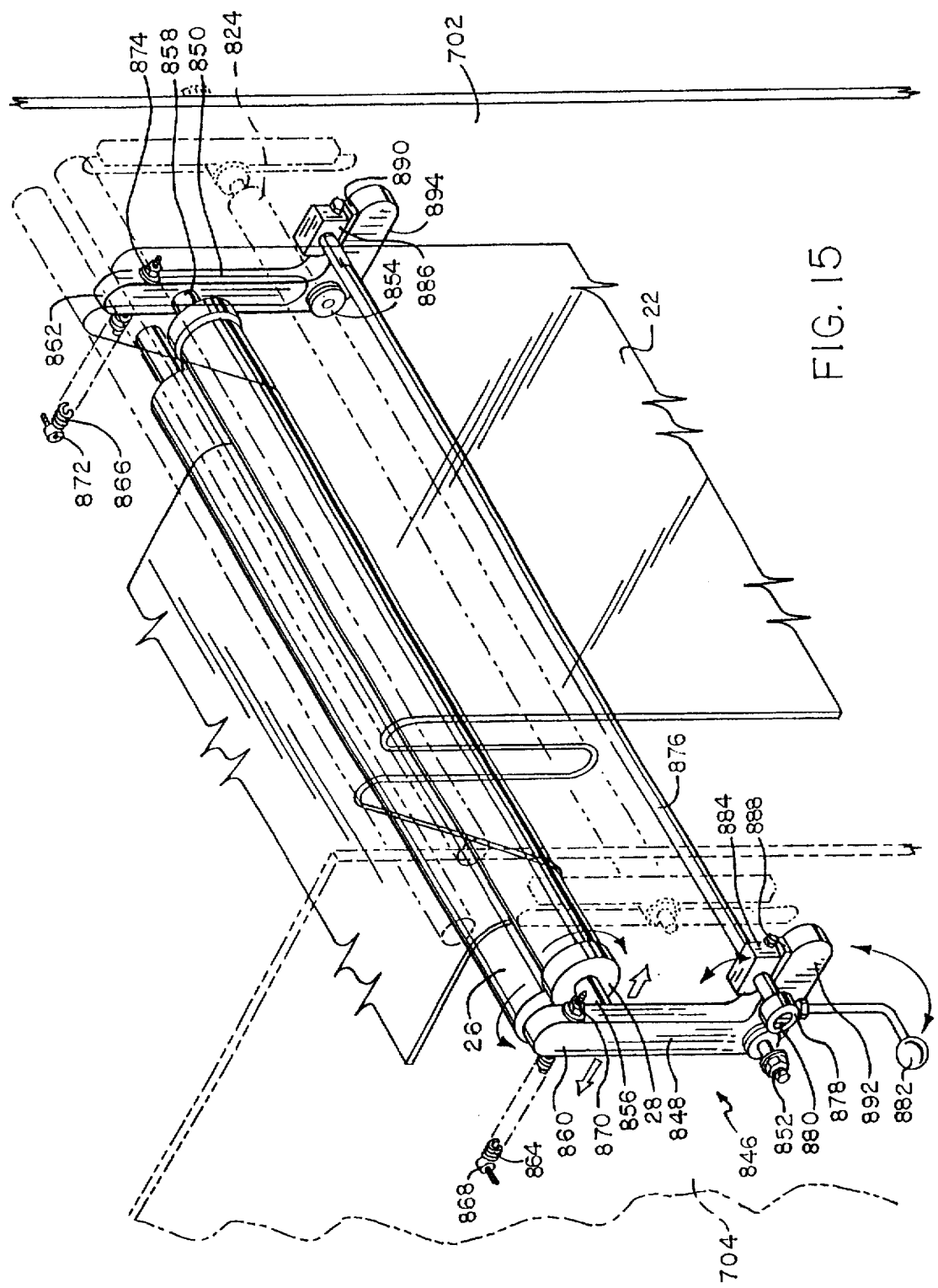
FIG. 15 is an enlarged perspective view of the plastic film drive and pinch roll of FIG. 14.

As illustrated in FIGS. 14–16 of the drawings, idler roller 824 is mounted for vertical movement with respect to idler rollers 826 and 828 to adjust and correctly position the plastic film 22 within the printing station to provide that the printed matter appear in the correct location relative to each bag length increment and any product labeling or package printing that appears on the plastic film 22. The path length of the plastic film 22 between the print head 836 and the pinch seal assembly 130 (FIG. 1) is adjusted by vertically moving idler roller 824 relative to idler rollers 826 and 828.

Brake release mechanism 738 and a pinch roll release mechanism 846 provide for the manual loading and unloading of the plastic film 22 in the machine 10. For example, lifting of the brake release handle 740 causes downward movement of adjustable rod 734 and downward movement of the end 752 of brake lever 754, thus causing upward movement of end 762 and movement of brake pad 760 away from brake disc 764. Release of the brake pad 760 from the brake disc 764 allows for free rotation of plastic film supply roll 24 to facilitate manual loading of the plastic film 22 into the machine 10. The plastic film 22 is drawn from the supply roll 24, fed over idler roller 728, over idler roller 706, down under idler roller 716, back up over idler roller 708, down under idler roller 714, back up over idler roller 710, down under idler roller 712, up over idler roller 820, under idler roller 822, over idler roller 826, under idler roller 824, over idler 828, under pinch roll 28, and up between pinch roll 28 and drive roll 26.

As much as the drive roll 26 is in a fixed position relative to the machine 10, release mechanism 846 provides for pivotal movement of the pinch roll 28 away from drive roll 26 and thereby allows feeding of the plastic film therebetween. The pinch roll 28 is an idler roller which is free to rotate about its rotation axis, so once it is moved away from drive roll 26 it is a simple matter to feed the plastic film 22 under pinch roll 28 and up over drive roll 26. Once the plastic film is located between the pinch and drive roll 28 and 26, the pinch roll is returned to its operative position biased against drive roll 26 and further movement of the plastic film through the machine is facilitated by pulsing of common drive source 122 to cause forward rotation of drive roll 26.

With reference to FIGS. 14 and 15 of the drawings and in accordance with a particular embodiment of the present invention, the pinch roll release mechanism 846 includes first and second L-shaped members 848 and 850 pivotally attached to the respective side walls 704 and 702 by threaded bolts or pins 852 and 854. The pinch roll 28 has respective end shafts 856 and 858 which are attached to the L-shaped members 848 and 850 near their upper ends 860 and 862. The L-shaped members 848 and 850 are biased forwardly so that the pinch roll 28 is biased against drive roll 262 to squeeze the plastic film 22 therebetween by first and second springs 864 and 866. The spring 864 has one end attached to side wall 704 by a threaded fastener 868, and its other end attached to the upper end 860 of member 848 by a threaded fastener 870. Likewise, spring 866 has its forward end attached to sidewall 702 by a threaded fastener 872 and its other end attached to the upper end 862 of member 850 by a threaded fastener 874.

The release mechanism 846 further includes an elongate rod 876 having its ends journaled in side walls 702 and 704, and a circular collar 878 fixed to an end 880 of rod 876 which extends through side walls 704. Attached to the collar 878 is a handle 882 which is adapted to be rotated through 90° from the position shown in FIG. 15 to a substantially horizontal position rotating the rod 876 counterclockwise. Attached to the rod 876 are two spacing blocks 884 and 886 which rotate with rod 876 and bear against wear plates 888 and 890 which are attached to the upper surface of the respective ends 892 and 894 of L-shaped members 848 and 850. In the position shown in FIG. 15 of the drawings, the blocks 884 and 886 are positioned with a short distance between the rod 876 and plates 888 and 890. When the handle 882 is rotated counter-clockwise through 90°, a curved surface on the front end of each of blocks 884 and 886 is brought to bear against plates 888 and 890 to gradually increase the distance between the rod 876 and the plates 888 and 890. The increased dimension of the blocks 884 and 886 located below the rod 876 forces downward movement of the ends 892 and 894 of members 848 and 850 and thereby causes rearward movement of the upper ends 860 and 862 of the members 848 and 850 against the bias of springs 864 and 866 to cause the movement of pinch roll 28 away from drive roll 26. Clockwise movement of the handle from a horizontal position back to the vertical position shown in FIG. 15 of the drawings allows the springs 864 and 866 to return the pinch roll 28 against drive roll 26 and thereby squeeze the plastic film 22 between the drive and pinch roll. The bias of springs 864 and 866 against the upper ends 860 and 862 of members 848 and 850 is sufficient to keep the plates 888 and 890 against blocks 884 and 886 and thereby tends to hold the release mechanism 846 in the position shown in FIG. 15 of the drawings.

As illustrated in FIGS. 14 and 20 of the drawings, an idler roller 898 has been added between idler roller 30 and forming collar 32 to facilitate the feeding of the plastic film 22 up over forming collar 32. Optical mark sensor 118 includes light emitting and receiving sensor heads 500 and 501 and respective elongate, flexible, fiber optic cables 502 and 504 which extend to a conventional light emitting and receiving unit which provides a registration mark sensed signal to control system 120 when the leading edge of a registration mark on plastic film 22 passes between the emitting and sensor heads 500 and 501. Mark sensor 118 is located a few inches upstream of forming collar 32 with the emitting and receiving heads 500 mounted between idler roller 30 and drive roll 26, with each head on opposite sides of plastic film 22 and centered with respect to the center line of machine 10. Heads 500 and 501 are fastened, for example, to respective movable mounting elements 503 and 505 on slide bars 506 and 507 attached to side panels 704 and 702 of the machine 10 which allows for repositioning of the heads 500 and 501 to the edge of the film if the film is marked with edge marks rather than center marks.

As illustrated in FIGS. 14 and 20 of the drawings, idler roller 30 is mounted for horizontal movement with respect to idler roller 828 and drive roll 26 to adjust the path length of the plastic film 22 between the mark sensor 118 and the pinch seal assembly 130 (FIG. 1).

With reference to FIGS. 14 and 20 of the drawings and in accordance with a particular embodiment of the present invention, the horizontally movable idler roller 30 includes a roller body 1104 which is mounted for rotation relative to a central shaft 1106 which extends through roller body 1104 and protrudes through elongate horizontal openings 1108 and 1110 in brackets 1112 and 1114 attached to side walls 702 and 704 of machine 10. A first rack 1116 is attached to the inner surface of bracket 1112 adjacent opening 1108 and a second rack 1118 is attached to the inner surface of bracket 1114 adjacent opening 1110. A first pinion 1120 is fixed to one end of shaft 1106 so that its teeth fit into the teeth of rack 1116 while a second pinion 1122 is fixed to the other end of shaft 1106 so that its teeth fit into the teeth of rack 1118. Handles 1124 and 1126 are attached to T-brackets 1128 by threaded shafts 1130 which protrude through openings 1108 and 1110 so that clockwise rotation of the handles 1124 and 1126 causes the T-brackets 1128 to squeeze against the side brackets 1112 and 1114 and lock the pinions 1120 and 1122 in a selected position in the racks 1116 and 1118. Forward movement of the idler roller or phaser 30 with respect to feed roll 26 increases the path length of the plastic film 22 from mark sensor 118 to pinch seal assembly 130 (FIG. 1).

With reference to FIGS. 14 and 16 of the drawings and in accordance with a particular embodiment of the present invention, the vertically movable idler roller 824 includes a roller body 900 which is mounted for rotation relative to a central shaft 902 which extends through roller body 900 and protrudes through elongate vertical openings 904 and 906 in side walls 702 and 704 of machine 10. A first rack 908 is attached to the inner surface of side wall 702 adjacent opening 904 and a second rack 910 is attached to the inner surface of side wall 704 adjacent opening 906. A first pinion 912 is fixed to shaft 902 so that its teeth fit into the teeth of rack 908 while a second pinion 914 is fixed to shaft 902 so that its teeth fit into the teeth of rack 910. A circular handle 916 is attached to the end of shaft 902 which protrudes through side wall 702 so that clockwise rotation of the handle 916 causes clockwise rotation of pinions 912 and 914 which causes the pinions to move down the racks 908 and 910 to lower idler roller 824 with respect to idler rollers 826 and 828 and thereby increase the path length of the plastic film from idler roller 824 to pinch seal assembly 130 (FIG. 1). Counterclockwise rotation of handles 916 causes upward movement of idler roller 824 and thereby shortens the path length of the plastic film 22 between idler roller 824 and pinch seal assembly 130. Once the desired location of idler roller 824 has been acquired, shaft 902 is locked in position relative to sidewalls 704 and 702 by tightening threaded nuts against the outer surface of side walls 704 and 702.

It is to be understood that FIG. 1 is schematic and that in accordance with at least one embodiment of the present invention the zippered cap strip and plastic film supply assemblies shown in FIGS. 13–16 of the drawings form a part of the machine 10 shown in FIG. 1 of the drawings. Although the phaser bar or roller 824 is shown to be manually raised and lowered in FIGS. 14–16 of the drawings, it is contemplated that the vertical adjustment of the idler roller 824 can be controlled by control system 120 using the electric motor 468 and a suitable drive mechanism such as a linear actuator.

Figure 17:
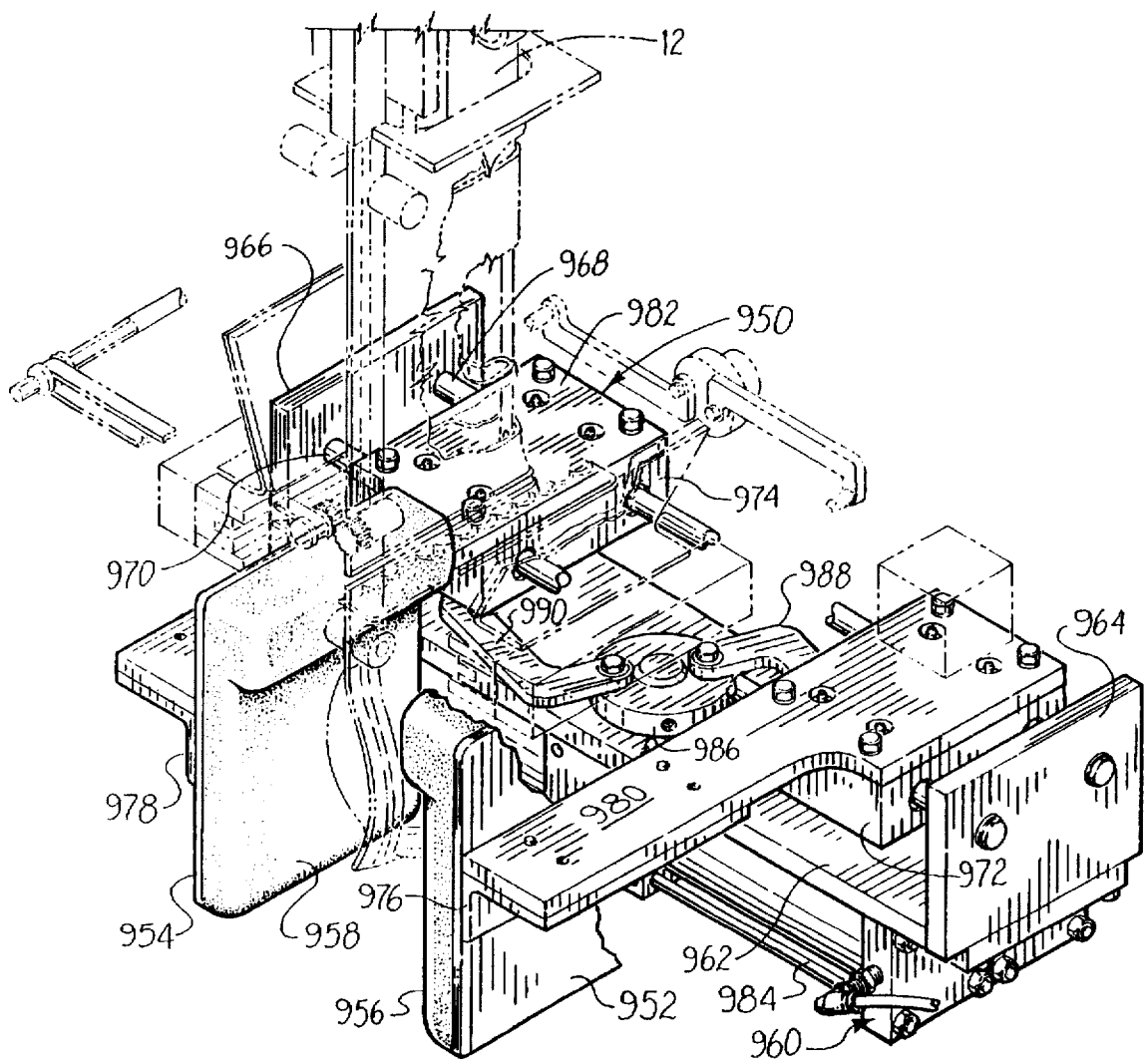
FIG. 17 is an enlarged, detailed front perspective view of the bag squeezer unit of the machine of FIG. 1.
Figure 18:
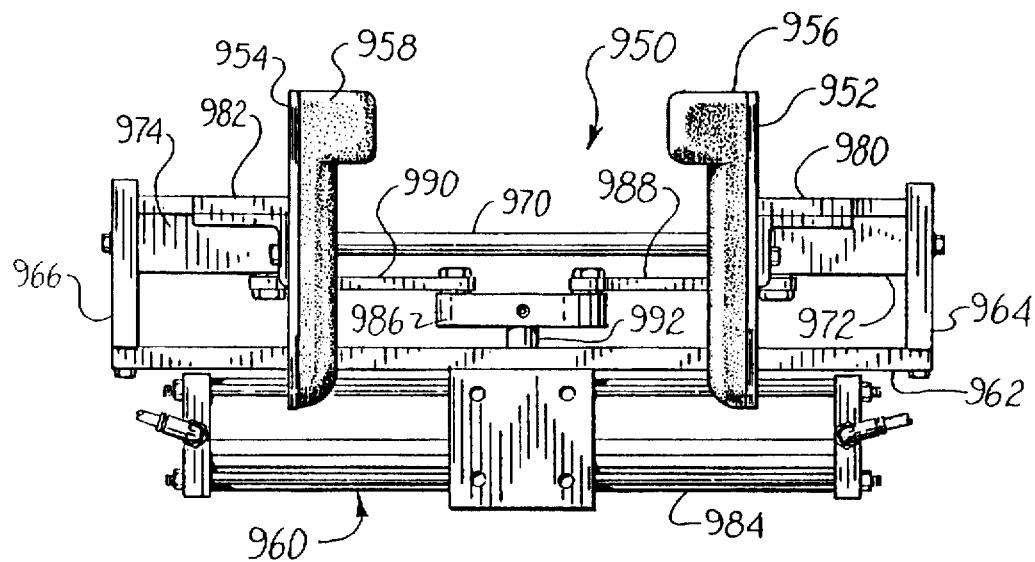
FIG. 18 is a front elevational view of the bag squeezer unit of FIG. 17 with the squeeze plates reciprocated spaced apart from each other.
Figure 19:
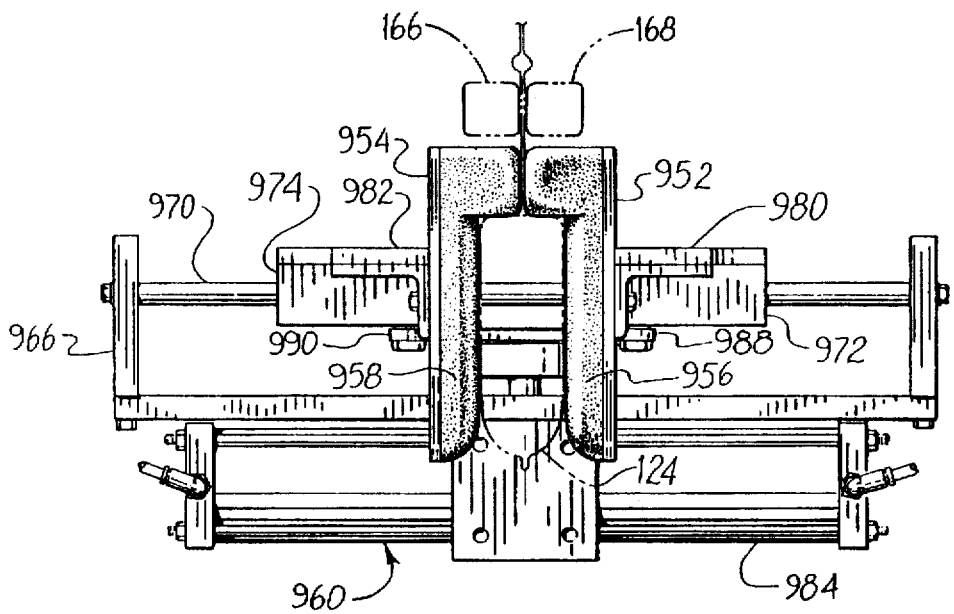
FIG. 19 is a front elevational view representation similar to that of FIG. 18 except that the bag squeezer plates are shown in their most proximal position with the product-filled tubes squeezed therebetween.

In accordance with the exemplary embodiment of the present invention as shown in FIGS. 17–19 of the drawings, bag squeezer unit 950 includes a single crank rotary actuator assembly 960 for reciprocating squeeze plates 952 and 954 and squeeze pads 956 and 958 toward and away from the product-filled tube 124 during formation of the reclosable bags 126. The single crank rotary actuator assembly 960 includes a mounting plate 962 which is fixed to the machine 10 and has attached thereto right and left hand end plates 964 and 966. End plates 964 and 966 support respective parallel slide rods 968 and 970 which support respective slide blocks 972 and 974 for purely translational movement transverse to the fill tube 12 on linear bearings or bushings housed within the slide blocks.

Each of the squeeze plates 952 and 954 is removably attached to the respective slide blocks 972 and 974 for translational movement toward and away from the product-filled tube 124 by respective sections of angle iron 976 and 978 and cantilever brackets or plates 980 and 982. The plates 980 and 982 and angle iron 976 and 978 are attached to one another and to the slide blocks and squeeze plates by removable threaded fasteners. This not only facilitates the removal and substitution of various forms of squeeze plates or squeeze pads to the slide blocks, but also provides for position adjustments to accommodate machine variations, bag variations, and different types and amounts of products.

The slide blocks 972 and 974 are moved along the slide rods 968 and 970 by a rotary actuator and crank arrangement including a rotary actuator 984, circular cam 986, and respective cam levers or links 988 and 990. Circular cam 986 is operatively connected to a vertical output shaft 992 of rotary actuator 984 by a shaft key and set screw. Crank levers 988 and 990 are pivotally attached to the circular cam 986 and respective slide blocks 972 and 974 by threaded bolts or pins and annular bearings made of a conventional bearing material such as a friction reducing synthetic resin or a soft metal such as brass.

The rotary actuator 984 is operated under computer control by the computer control system 120. As illustrated, the rotary actuator may comprise a two inch bore double rack pneumatic rotary actuator sold under the trademark "BIMBA PNEUTURN" by BIMBA Manufacturing Corp. The rotary actuator 984 provides approximately 180° of clockwise or counterclockwise rotation of output shaft 992 with up to several hundred inch pounds of torque. Various other forms of rotary actuators including electric motor actuators and other air or hydraulic cylinder actuators are available and may be utilized for the rotary actuator 984. The double rack mechanism is preferred in that the linear motions involved tend to balance due to the oppositely directed linear motion of the two racks. The rotary actuator 984 is provided with connection to an air pressure source via solenoid valves responsive to electronic control signals from the computer control system 120, and it is contemplated that air flow control valves for controlling speed and acceleration of the bag squeezer may be used.

The rotary actuator and crank assembly 960 is similar to that used in the pinch sealer drive mechanism and other rotary actuated drive mechanisms of the machine 10. The crank levers 988 and 990 have offsets or doglegs in each end to permit rotation of the cam 986 through 180° without interference between the levers 988 and 990. The rotary actuator and crank assembly 960 is vertically compact, and, as such, allows the bag squeezer unit 950 to be mounted in the machine 10 with the squeeze plates 952 and 954 close to the pinch seal assembly 130.

With particular reference to FIG. 19 of the drawings, the squeeze pads 956 and 958 have contoured inner bag contacting surfaces having respective enlargements 994 and 996 at the upper ends thereof which tend to force all air and product from the upper region of the product-filled plastic tube 124. The enlargements 994 and 996 of squeeze pads 956 and 958 are spaced apart a sufficient yet small distance to allow air to escape from the upper end of the filled tube 124. The lower portions of the squeeze pads 956 and 958 define a bag opening which provides for the selected excess air removal and product compaction therebetween. In accordance with one embodiment, the squeeze pads 956 and 958 are formed of a rigid material having wear resistant exterior surface.

In accordance with another embodiment, the squeeze pads 956 and 958 are formed of a resilient material such as foam rubber having a sealed pore exterior surface. The pads 956 and 958 have curved surfaces to avoid damaging the plastic tube 124. The squeeze plates 952 and 954 and/or squeeze pads 956 and 958 can be replaced with alternative plates and pads depending on the type and amount of product being packaged, the size of the bags, and the like. For example, the machine 10 may in one instance be used to package frozen chicken breasts, and in another, shredded lettuce or salad products. While the squeeze pads 956 and 958 may work well with frozen products, just the bare squeeze plates 952 and 954 (FIG. 21) may be all that is necessary to squeeze shredded salad products.

Figure 22:
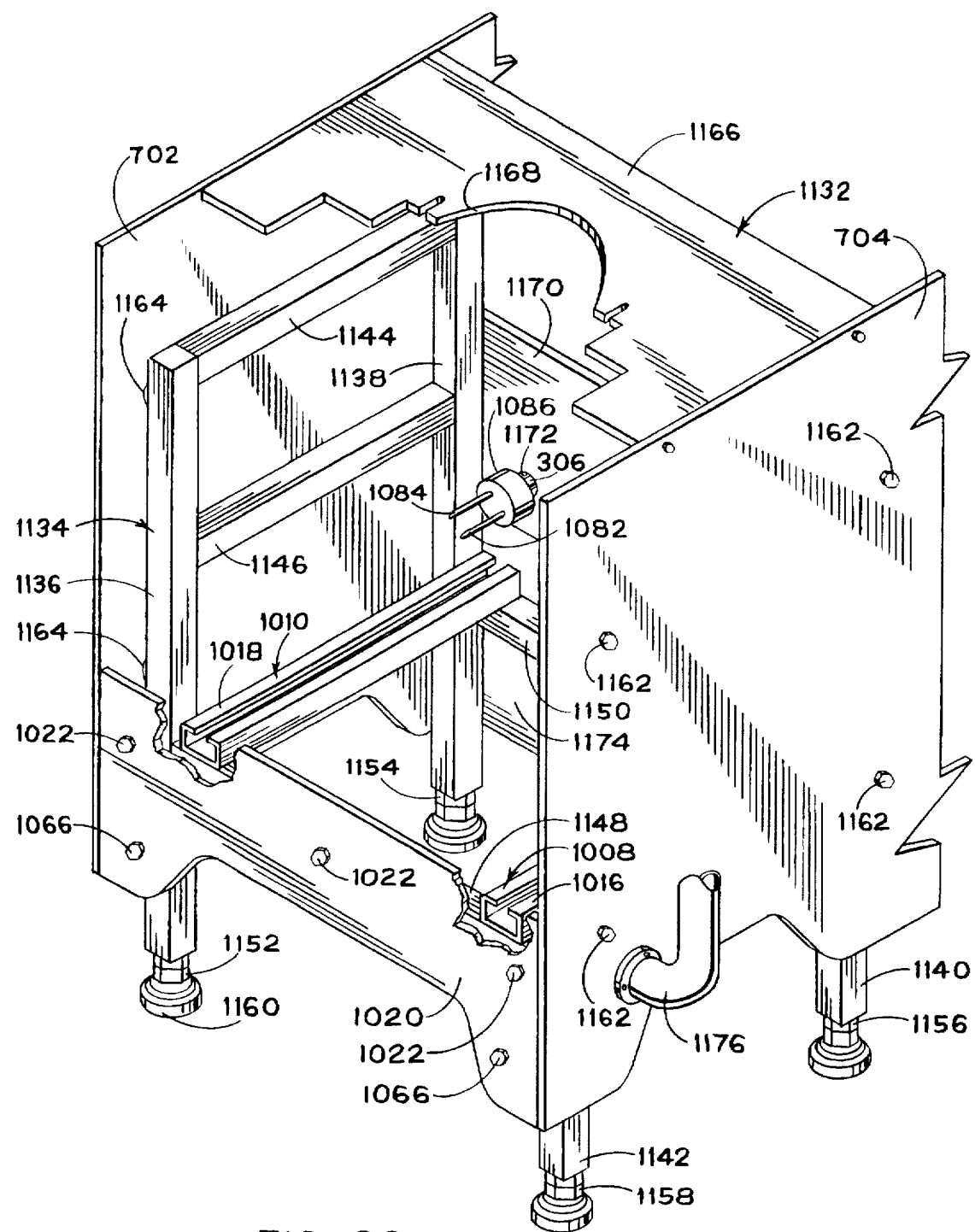
FIG. 22 is a front perspective view illustration of the stainless steel tubular frame and side panels of the machine of FIG. 1.

In accordance with an exemplary embodiment of the present invention as shown in FIG. 22 of the drawings, the machine 10 includes a stainless steel substructure generally designated 1132 including a tubular stainless steel frame or skeleton 1134 and a plurality of removable stainless steel panels or skins. Frame 1134 has four vertical corner members 1136, 1138, 1140, and 1142, six horizontal side members (three on each side) 1144 and 1146, a horizontal front member 1148, and a horizontal back member 1150. These tubular members or box beams are welded together and form a sturdy, rigid frame providing a rigid stable support for a plurality of stainless steel panels. At the base of each of the corner members 1136, 1138, 1140, and 1142 are respective vertically adjustable feet 1152, 1154, 1156, and 1158 each having a rubber base 1160.

Side panels 702 and 704 are attached to frame members 1136 and 1138 and 1140 and 1142 by a plurality of threaded fasteners or bolts 1162 which pass through the side panels, through circular spacers 1164, and into the frame members. The spacers 1164 are preferably stainless steel discs which are welded to the frame members and keep the side panels spaced a distance of one-quarter inch or more from the frame members to allow for cleaning and disinfecting therebetween. It is preferred to use stainless steel materials for as many of the machine components as possible so that these materials can be cleaned and sanitized at the end of each working cycle, will not rust or corrode, and provide a sturdy construction.

The C-channels 1016 and 1018 of drawer slides or guides 1008 and 1010 are attached to the front and back frame members 1148 and 1150. Drawer front 1020 is releasably secured to frame members 1136 and 1142 by threaded fasteners 1066 which pass through drawer front 1020, spacer elements 1164, and into the frame members. Drawer front 1020 is attached to drawer bottom 1002 by the threaded fasteners 1022. A top panel 1166 is attached to each of the side panels 702 and 704 by a plurality of threaded fasteners. Top panel 1166 serves as a support for the feed tube and former. The feed tube 12 is at least partially received within a concave recess 1168 in top panel 1166.

An upper back panel 1170 is attached to each of the frame members 1138 and 1140 by a plurality of threaded fasteners which pass through the back panel 1170, through spacer members 1164 and into the frame members. Back panel 1170 includes a circular opening 1172 which provides for passage of the drive shaft 306 therethrough. Disc 1086 is located just inside back panel 1170 with pins 1082 and 1084 protruding toward the front of the machine. Pins 1082 and 1084 are long enough to accommodate the extension and retraction movement of the zipper drive rollers and have rounded forward ends which facilitate the insertion of the pins into the receiving openings 1078 and 1080. A lower back panel 1174 is attached to frame members 1138 and 1140 by a plurality of threaded fasteners and spacer members.

A stainless steel conduit is attached to side panel 704 and is adapted to extend to a control box or control panel for control system 120 with the control box being attached to side panel 704. Side panels 702 and 704 also provide support for a transparent or translucent safety door (not shown) which extends between side panels 702 and 704 in the front of the machine above drawer front 1020 to protect the machine operator while the machine is in operation. A similar safety door is attached to the back of the machine between side panels 702 and 704 and above the film supply roll 24. With the machine operating at high bag production rates, for example 30–100 bags per minute, the machine components operate at very high speeds and the safety doors help to prevent someone from inadvertently or mistakenly reaching into the machine while it is operating.

With reference to FIGS. 23–28 of the drawings, the machine 10 has been converted to the production of pillow type bags rather than edge fin seal bags (FIG. 1) by removing the feed tube 12, former 32, and associated apparatus and replacing it with a fill tube 1178 having an oval cross-section with the long axis oriented right to left in the machine rather than front to back. Also, the pinch seal and base plate unit 1024 has been indexed 90° so that the sealing jaw 132 is located in the front of the machine and sealing jaw 134 is located in the back of the machine rather than being on the right and left sides thereof. In the exemplary embodiment shown in FIGS. 23 and 24 of the drawings, the fill tube 1178 is vertically longer than the fill tube 12 and, as such, the pull belt unit 1074 has been removed from the machine, inverted and replaced back into the machine, so that, instead of extending upwardly from their respective drive shafts 346 and 334, the pull belts 48 and 50 extend downwardly along the length of the fill tube 1178. The conversion of the machine 10 from a machine producing edge fin seal bags (FIG. 1) to a machine for producing pillow type bags with midline overlap or fin seals is made easy by having the pull belt unit 1074 and the pinch seal and base plate unit 1024 self-contained and easily removed, repositioned, and replaced back into the machine. Also, top panel 1166 of machine substructure 1132 accommodates different fill tubes and formers for producing the different types of bags in machine 10. To facilitate the removal of the pull belt unit 1074 from the machine, inversion, and replacement of the unit back into the machine, each of the extensible drive shafts 334 and 346 for the respective pull belts 50 and 48 have an internal, male, hexagonal shaft segment or stub 1180 and 1182 slidably received within an elongate, female, hexagonal recess in shaft segments 1184 and 1186. This arrangement of hexagonal shaft and recess allows for elongation and contraction of the length of the drive shafts 334 and 346 and also permits the quick separation of the respective shaft elements to provide for removal of the pull belt unit 1074 from the machine 10. Hexagonal shaft 1180 of drive shaft 334 has the exact same dimensions as the hexagonal shaft 1182 of drive shaft 346. Thus, the hexagonal shaft of drive shaft 334 can be placed within the hexagonal recess of drive shaft 346 and are, as such, interchangeable.

For the sake of clarity, FIG. 23 is highly fragmentary and schematic and all the components of the pinch seal assembly and base plate unit 1024 are not shown. However, it is to be understood that the unit 1024 is complete as shown in FIGS. 1, 4, and 9 of the drawings and has simply been indexed 90° with respect to the position shown in FIG. 1 of the drawings. If, for example, the pillow type bags to be made using the machine in its converted form shown in FIGS. 23–28 of the drawings are not to include a reclosable zipper element, the zipper drive rollers 66 and 68 are not used and, as such, may be removed. However, it is preferred that the pinch seal assembly and base plate unit 1024 remain intact with all of its components shown in FIGS. 1, 4, and 9 of the drawings so that the machine can be converted back and forth between a machine for producing an edge fin seal bag (FIG. 1) to a machine for producing pillow type bags (FIGS. 23–28).

As is well known in the art, each different fill tube has a particular former which takes the planar film feed stock 22 and shapes and forms it into the particular fill tube configuration. Thus, it is to be understood that the former for the fill tube 1178 is constructed to produce a plastic tube 124 having an oval cross-section with the long diameter extended right to left and the short diameter front to back in the machine. Also, the particular former chosen determines which type of overlap or fin seal is to be produced along the midline of the pillow type bag. In accordance with an exemplary embodiment of the present invention, it is preferred to use a multipurpose former which will produce not only an overlap seal (FIG. 26) given a plastic film with one selected width, but also will produce a midline fin seal (FIG. 27) using a plastic film having a larger width. Thus, by using the multipurpose former together with the fill tube 1178, one is able to produce either a midline overlap seal pillow bag or a midline fin seal (potatochip type) pillow bag.

With reference to FIG. 24 of the drawings, a fill tube backstop 1188 has been added behind the fill tube 1178 to counteract the force of a vertical heater platen 1190 which contacts the plastic film to produce a midline vertical seal. Without the backstop 1188, heater platen 1190 may cause the fill tube to move out of its proper vertical position and possibly pinch the plastic film up near the former. Backstop 1188 includes an elongate threaded shaft 1192 supported in a substantially horizontal orientation by a bracket 1194 attached to slide rods 512 and 510. The backstop 1188 is locked into position relative to the fill tube 1178 by a locking nut 1196 on the threaded shaft 1192. A resilient rubber cap 1198 is added to the forward end of the shaft 1192 to prevent damage to the fill tube 1178 and the plastic film 22 wrapped therearound.

Figure 25:
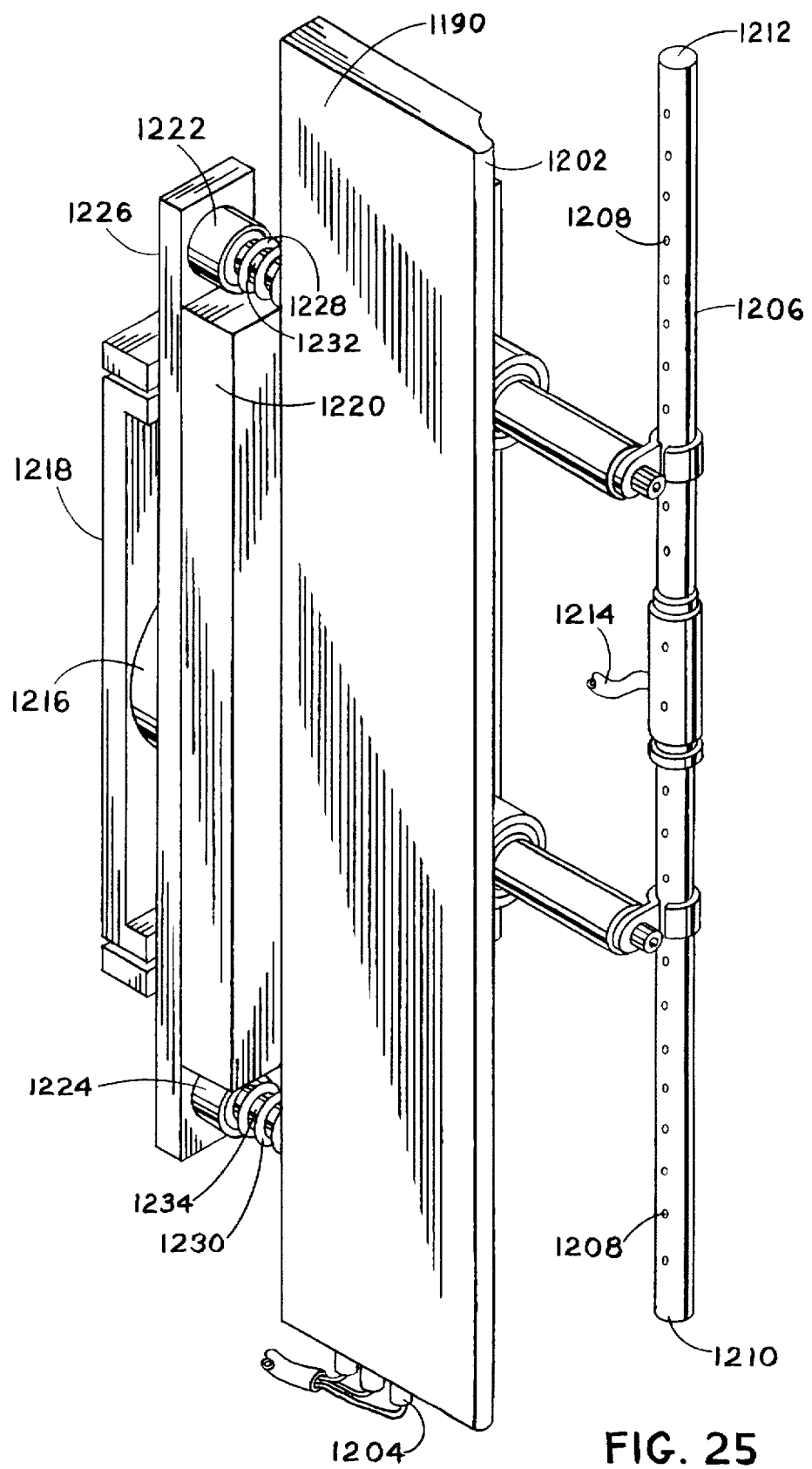
FIG. 25 is a perspective view of the vertical heater platen of FIG. 24 used when producing a pillow type bag with a midline overlap or fin seal which lies up against the fill tube.

With reference to FIGS. 24 and 25 of the drawings, when it is desired to produce a pillow type bag having a midline overlap seal (FIG. 26) or a midline fin seal (FIG. 27) wherein the fin seal is laid flat up against the side of the fill tube rather than extending outwardly from the fill tube (FIG. 28), it is necessary to replace the vertical heater platens 88 and 90 of FIGS. 1–3 of the drawings with the single heater platen 1190 which is reciprocated directly toward and away from the front face of the fill tube 1178. In accordance with the exemplary embodiment shown in FIGS. 24 and 25 of the drawings, this single reciprocating heater platen 1190 is part of a vertical or longitudinal seal producing unit 1200. Vertically oriented heater platen 1190 is positioned along the midline of the front of the fill tube 1178 and spaced a short distance therefrom to provide for the edges 42 and 44 of the plastic film 22 to be located between the heater platen 1190 and the fill tube 1178. The heater platen 1190 has a convex edge 1202 which is reciprocated into and out of contact with the outer surface of the edge 44 of plastic film 22. The heater platen 1190 seals the edges 42 and 44 together to form the bag precursor or flexible tube 124. Heat shields may be added adjacent the heater platen 1190 to shield the remainder of the plastic film 22 and the fill tube 1178 from the heat given off by heater platen 1190. Heater platen 1190 includes one or more heater elements 1204 extending axially along the length of the heater platen. Heater platen 1190 by itself may have an identical construction to the heater platen 88 shown in FIGS. 1–3 of the drawings.

Vertical sealing unit 1200 also includes an elongate stainless steel conduit 1206 having a plurality of small openings 1208 and closed ends 1210 and 1212 to provide for the release of pressurized air in the area of the forward edge 1202 of heater platen 1190 to cool the vertical midline seal formed by the heater platen. Conduit 1206 is connected to an elongate air hose 1214 which is itself connected via quick disconnects and a solenoid valve to a source of pressurized air. The solenoid valve controls the timed release of the pressurized air through outlets 1208 in conjunction with the end of the formation of the vertical seal by heater platen 1190 during the bag forming cycle. Heater platen 1190 is reciprocated toward and away from the edges 42 and 44 of the plastic film 22 by air cylinder unit 1216 attached to a vertical support 1218. Cylinder unit 1216 includes a drive shaft having its forward end connected to a vertical plate 1220. Heater platen 1190 is operatively connected to the plate 1220 by a pair of spring biasing supports 1222 and 1224 themselves attached to a vertical plate 1226 fixed to the back of plate 1220. Each of the supports 1222 and 1224 includes a spring 1228 and 1230 and an internal shaft 1232 and 1234 received in respective friction-reducing bearings or bushings. The springs bias the heater platen 1190 forwardly of the plate 1220 but allow the heater platen to move toward the plate 1220 upon contact of the forward edge 1202 of heater platen 1190 with the film edges 42 and 44 and the forward surface of fill tube 1178. Springs 1228 and 1230 are selected to provide the desired contact force between the forward surface 1202 of heater platen 1190 and the plastic film edges 42 and 44 to provide for a good airtight seal while, at the same time, not harming the plastic film. If necessary, a resilient pad can be added to the forward surface of fill tube 1178 directly opposite heater platen 1190 to further reduce the possibility of damage to the plastic film 22. Such a resilient pad may be covered with friction-reducing tape to provide a smooth passage of the plastic film thereover. Vertical seal unit 120 is operated by computer control system 120 in the same fashion as heater platens 88 and 90.

Although fill tubes 12 and 1178 of FIGS. 1 and 23 have oval cross-sections, it is contemplated that other fill tubes having circular, rectangular, or larger or smaller oval cross-sections may be used to produce different sizes and styles of bags. Also, it is contemplated that right and left whiskers can be added to the base of fill tube 1178 to tension the plastic tube 124 prior to formation of the horizontal seals by pinch seal assembly 130.

Figure 26:
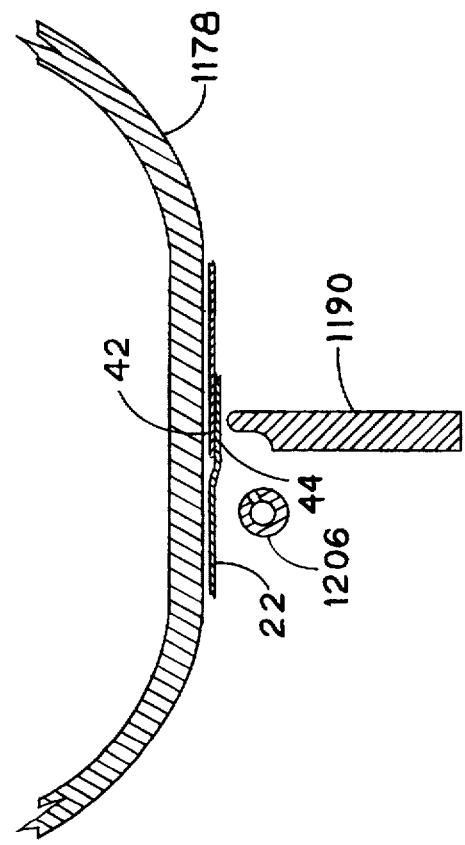
FIG. 26 is a schematic section view representation of the production of a midline overlap seal for a pillow bag.
Figure 27:
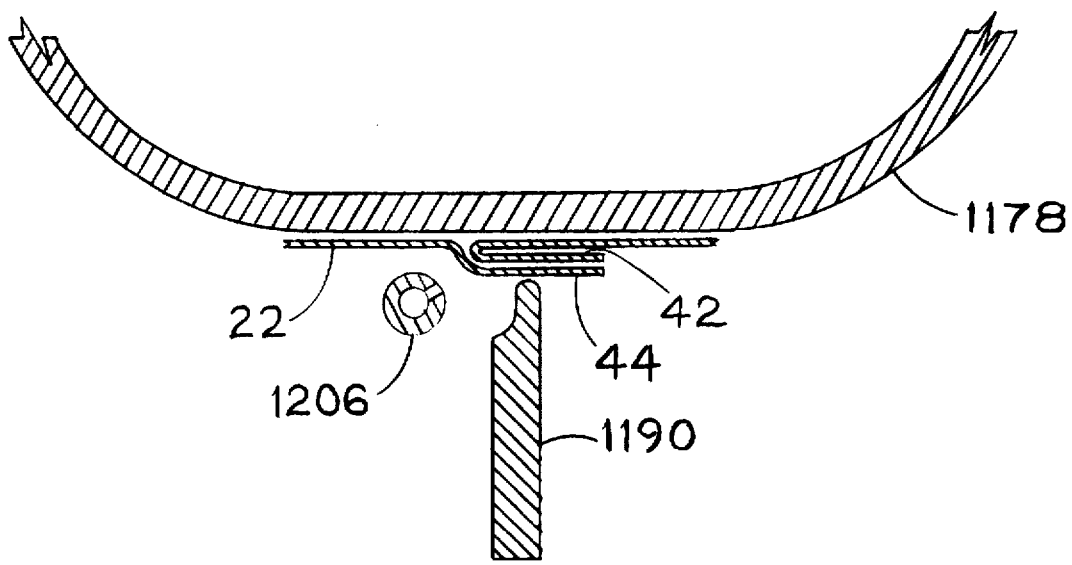
FIG. 27 is a schematic section view illustration of the production of a midline fin seal for a pillow bag; and, FIG. 28 is a schematic section view illustration of the production of a different midline fin seal for a pillow bag.
Figure 28:
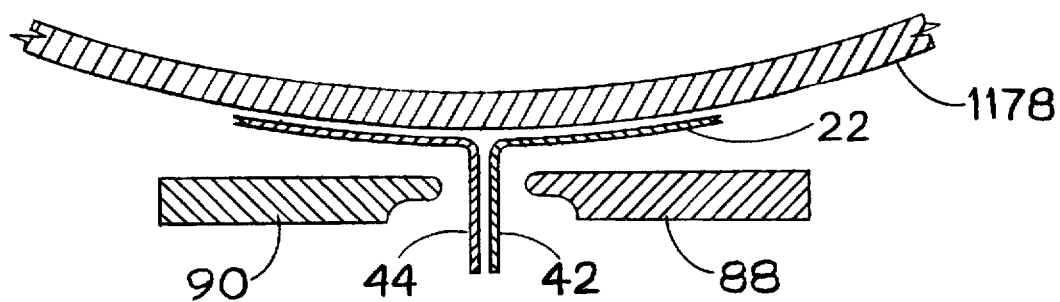

As schematically depicted in FIGS. 26–28 of the drawings, three different types or styles of pillow bags may be produced. The first is the midline overlap seal shown in FIG. 26. The second is a midline fin seal which is laid flat up against the fill tube 1178 shown in FIG. 27. The third is a midline fin seal which protrudes outwardly from the fill tube as shown in FIG. 28. The midline overlap seal and the midline fin seal with the fin lying flat up against the fill tube are produced using the heater platen 1190. The midline fin seal which protrudes outwardly from the fill tube 1178 is produced using vertical heater platens 88 and 90 which reciprocate toward and away from one another to seal the edges 42 and 44 of the plastic film 22 together therebetween. The convex working surfaces of the heater platens 88, 90 and 1190 may be covered with a friction-reducing synthetic resin polymer tape or material.

In accordance with another embodiment of the present invention, a vertical form, fill and seal machine for producing edge fin seal bags (FIG. 1) is constructed in accordance with FIGS. 1–22 of the drawings.

In accordance with another exemplary embodiment of the present invention, a vertical form, fill and seal machine for producing pillow type bags is constructed in accordance with FIGS. 23–28 of the drawings.

The indexable pinch seal assembly and base plate unit 1024 not only provides versatility but also allows for a compact side-to-side construction of the machine 10. If the pinch seal assembly 130 was to be rotatable about a central axis rather than indexable, the machine would have to be much wider than is presently shown. In accordance with one example of the present invention, the base plate 1000 has outer dimensions of 37.75 inches by 37.75 inches and central opening 1004 has dimensions of 31 inches by 21 inches.

The only tool necessary to loosen drawer front 1020 from the machine 10 is a half-inch open end, box end, or socket wrench for loosening the threaded fasteners 1066. It is also contemplated that the threaded fasteners 1066 may be replaced with wingtip bolts, or handles having threaded shafts to further facilitate and ease the operation of separating the drawer front 1020 from the frame members 1136 and 1142 to allow the pinch seal and base plate unit 1024 to be slid forwardly out of the machine. Similarly, the four corner bolts 1006 holding the base plate 1000 to the drawer bottom 1002 may be replaced with wingtip bolts or handles having threaded shafts for facilitating the removal thereof to allow for indexing of the unit 1024. Likewise, the threaded fasteners 1098 of pull belt unit 1074 may be replaced with wingtip bolts or handles having threaded shafts to facilitate the loosening and tightening of the fasteners 1098.

Thus, it will be appreciated that, as a result of the present invention, a highly effective, improved, vertical form, fill and seal machine and method for producing product-filled bags is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. For example, the vertical form, fill and seal machine of the present invention may be used to produce product-filled bags which do not include a reclosable zipper. Zipper cap strip 52 could be replaced by either a non-zippered cap strip, a cap strip including a tear strip, or a cap strip including a reclosable element other than a zipper. Accordingly, it is expressly intended that the foregoing description and accompanying drawings are illustrative of preferred embodiments only and not limiting.

What is claimed is:

1. A convertible vertical form, fill and seal apparatus of the type that operates in conjunction with a product supply apparatus providing product in discrete quantities and that forms a continuous, heat sealable plastic film and zipper strip into separate product-filled, reclosable, sealed, pillow style or edge fin seal bags comprising:

a first controlled release festooner arrangement for storing and supplying a continuous plastic film;

a second controlled release festooner arrangement for storing and supplying a continuous, plastic, zippered cap strip;

a generally vertical fill tube assembly including a vertical fill tube downstream of the first and second storing and supplying festooner arrangements for the continuous film and zippered cap strip and around which the continuous film is formed and wrapped;

feeding means for feeding the zippered cap strip and plastic film along the length of the vertical fill tube in bag length increments with edges of the plastic film in overlapping relationship with edges of the zippered cap strip;

vertical sealing means for sealing the edges of the plastic film to the edges of the zippered cap strip to form a length of flexible, plastic tube;

a pinch seal assembly downstream of the vertical fill tube for forming first and second horizontal seals across the flexible, plastic tube and for severing the plastic tube, the first horizontal seal defining a downstream edge of a bag about to be filled with product and the second horizontal seal defining an upstream edge of a bag which has already received product, said pinch seal assembly being mounted on a rectangular base plate having a central opening for passage of said bags therethrough; and said base plate being attached to a rectangular drawer bottom having a central opening for accommodating passage of said bags therethrough and being supported on respective drawer slides allowing said drawer bottom, base plate and pinch seal assembly to be drawn forwardly out of the apparatus for at least one of servicing, maintenance, and indexing of the pinch seal assembly and base plate through 90°.

2. Apparatus as recited in claim 1 further comprising a bag squeezer unit downstream of said pinch seal assembly having opposing squeeze elements for squeezing the excess air from the product-filled, flexible, plastic tube prior to formation of said second horizontal seal and for sequentially releasing each completed, reclosable, product-filled, sealed bag following formation of the second horizontal seal and severing of the bag from the flexible tube.

3. Apparatus as recited in claim 2 wherein said squeeze elements comprise removable squeeze plates mounted to respective reciprocating cantilever means for selectively moving said squeeze plates toward one another to squeeze the product-filled plastic tube therebetween.

4. Apparatus as recited in claim 3 wherein said cantilever means are reciprocated by a single crank rotary actuator assembly.

5. Apparatus as recited in claim 2 wherein said pinch seal assembly and said squeezer unit are each independent of one another and selectively actuated during bag formation.

6. Apparatus as recited in claim 1 further comprising tensioning means for horizontally elongating the plastic tube transverse to its length prior to formation of said horizontal seals.

7. Apparatus as recited in claim 1 further comprising an optical sensor located upstream of said vertical fill tube for sensing registration marks on said plastic film.

8. Apparatus as recited in claim 1 wherein said feeding means includes a plastic film drive roll, a pair of pull belts, and a pair of zippered cap strip drive rollers.

9. A convertible vertical, form, fill and seal apparatus of the type that operates in conjunction with a product supply apparatus providing product in discrete quantities and that forms a continuous, heat sealable, plastic film into separate product-filled sealed pillow type or edge fin seal bags comprising:

first means for storing and supplying a continuous, plastic film;

second means for storing and supplying a continuous, plastic cap strip;

a generally vertical fill tube assembly including a vertical fill tube downstream of said first means for storing and supplying the continuous plastic film, said vertical fill tube being a tube of oval horizontal cross-section and means for forming said plastic film around said vertical fill tube;

feeding means including a plastic film drive roll, a pair of pull belts, and a pair of cap strip drive rollers for feeding the cap strip and the plastic film along the length of said vertical fill tube in bag length increments;

vertical sealing means for sealing the edges of the plastic film to the edges of the cap strip to form a length of flexible, plastic tube;

each of said pair of pull belts being mounted on a respective side of the vertical fill tube and biased against the plastic film and said vertical fill tube;

horizontal sealing and severing means downstream of said vertical fill tube for severing the plastic tube and forming first and second horizontal seals across the plastic tube, the first horizontal seal defining a downstream edge of a bag about to be filled with product and the second horizontal seal defining an upstream edge of a bag which has already received product;

tensioning means for horizontally elongating the plastic tube transverse to its length prior to severing and formation of said first and second horizontal seals; and, drawer means for supporting said horizontal sealing and severing means and including a central opening for accommodating passage of said bags therethrough and providing for horizontal movement of said horizontal sealing and severing means for at least one of servicing, adjustment, replacement, and indexing of horizontal sealing and severing means through 90°.

10. Apparatus as recited in claim 9 further comprising squeezing means for removing excess air from the product-filled plastic tube prior to formation of said horizontal seals.

11. Apparatus as recited in claim 10 wherein said squeezing means and said horizontal sealing and severing means include separate, independent reciprocation means and are mounted for separate and independent reciprocation toward and away from said plastic tube.

12. Apparatus as recited in claim 10 wherein said squeezing means includes a pair of opposing removable squeeze plates operatively connected to a rotary actuator assembly for selective reciprocation toward and away from said plastic tube.

13. Apparatus as recited in claim 9 wherein said tensioning means includes said cap strip drive rollers and an opposing rod extending downwardly from said vertical fill tube.

14. Apparatus as recited in claim 10 wherein said tensioning means further includes bag grabber means comprising a pair of opposing air cylinder units located downstream of said vertical fill tube for selectively clamping said plastic tube therebetween.

15. A convertible vertical, form, fill and seal apparatus of the type that operates in conjunction with a product supply apparatus providing product in discrete quantities and that forms a continuous, heat sealable, plastic film into separate, product-filled, sealed, pillow style or edge fin seal bags comprising:

a controlled release festooner arrangement for storing and supplying a continuous plastic film;

a generally vertical fill tube assembly including a vertical fill tube downstream of the festooner arrangement for the continuous film and around which the continuous film is wrapped and formed;

feeding means for feeding the plastic film along the length of the vertical fill tube in bag length increments with edges of the plastic film adjacent one another;

vertical sealing means for sealing the edges of the plastic film to one another to form a length of flexible, plastic tube;

a pinch seal assembly downstream of the vertical fill tube for forming first and second horizontal seals across the flexible, plastic tube and for severing the plastic tube, the first horizontal seal defining a downstream edge of a bag about to be filled with product and the second horizontal seal defining an upstream edge of a bag which has already received product;

said pinch seal assembly being mounted on a rectangular base plate having a central opening for passage of said bags therethrough, said base plate being attached to a rectangular drawer bottom having a central opening for accommodating passage of said bags therethrough and being supported on respective drawer slides allowing said drawer bottom, base plate and pinch seal assembly to be drawn forwardly out of the apparatus for at least one of servicing, maintenance, and indexing of the pinch seal assembly and base plate through 90°.

16. Apparatus as recited in claim 15 further comprising tensioning means for horizontally elongating the plastic tube transverse to its length prior to formation of said horizontal seals.

17. Apparatus as recited in claim 15 further comprising a bag squeezer unit downstream of said pinch seal assembly having opposing squeeze elements for squeezing the excess air from the product-filled, flexible, plastic tube prior to formation of said second horizontal seal and for sequentially releasing each completed, product-filled, sealed bag following formation of the second horizontal seal and severing of the bag from the flexible tube.

18. A convertible vertical, form, fill and seal apparatus of the type that operates in conjunction with a product supply apparatus providing product in discrete quantities and that forms a continuous, heat sealable, plastic film into separate, product-filled, sealed pillow type or edge fin seal bags comprising:

means for storing and supplying a continuous plastic film;

a generally vertical fill tube assembly including a vertical fill tube downstream of said means for storing and supplying a continuous plastic film and means for forming said plastic film around said vertical fill tube;

feeding means including a plastic film drive roll and a pair of pull belts for feeding the plastic film along the length of said vertical fill tube in bag length increments;

vertical sealing means for sealing the edges of the plastic film to one another to form a length of flexible, plastic tube;

each of said pair of pull belts being mounted on a respective side of the vertical fill tube and biased against the plastic film and said vertical fill tube;

horizontal sealing and severing means downstream of said vertical fill tube for severing the plastic tube and forming first and second horizontal seals across the plastic tube, the first horizontal seal defining a downstream edge of a bag about to be filled with product and the second horizontal seal defining an upstream edge of a bag which has already received product;

tensioning means for horizontally elongating the plastic tube transverse to its length prior to severing and formation of said first and second horizontal seals; and, drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

19. Apparatus as recited in claim 18 further comprising squeezing means for removing excess air from the product-filled, plastic tube prior to formation of said horizontal seals.

20. A convertible vertical, form, fill and seal apparatus of the type that operates in conjunction with a product supply apparatus providing product in discrete quantities and that forms a continuous, heat sealable, plastic film into separate, product-filled, sealed, pillow type or edge fin seal bags comprising:

means for storing and supplying the continuous plastic film;

a generally vertical fill tube assembly including a vertical fill tube downstream of the means for storing and supplying the continuous film and around which the continuous film is wrapped and formed;

feeding means for feeding the plastic film along the length of the vertical fill tube in bag length increments with edges of the continuous film in overlapping relationship with one another;

vertical sealing means for sealing the edges of the continuous film together to form a flexible, plastic tube;

horizontal sealing and severing means downstream of the vertical fill tube for forming upper and lower horizontal seals across the flexible, plastic tube and for severing the plastic tube; and, drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

21. A convertible vertical, form, fill and seal apparatus of the type that operates in conjunction with a product supply apparatus providing product in discrete quantities and that forms a continuous, heat sealable, plastic film into separate, product-filled, sealed, pillow type or edge fin seal bags comprising:

means for storing and supplying a continuous, plastic film;

a generally vertical fill tube assembly including a vertical fill tube downstream of said means for storing and supplying the plastic film, said vertical fill tube being a tube of oval horizontal cross-section and means for forming said plastic film around said vertical fill tube with edges of the plastic film meeting at one end of the minor diameter of said tube;

feeding means including a plastic film drive roll and a pair of pull belts for feeding the plastic film along the length of said vertical fill tube in bag length increments;

vertical sealing means for sealing the edges of the plastic film to one another to form a length of flexible, plastic tube;

each of said pair of pull belts being mounted on a respective side of the vertical fill tube and biased against the plastic film and said vertical fill tube;

horizontal sealing and severing means downstream of said vertical fill tube for severing the plastic tube and forming first and second horizontal seals across the plastic tube, the first horizontal seal defining a downstream edge of a bag about to be filled with product and the second horizontal seal defining an upstream edge of a bag which has already received product; and, drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

22. A convertible vertical, form, fill and seal apparatus of the type that operates in conjunction with a product supply apparatus providing product in discrete quantities and that forms one or both of a continuous, heat sealable, plastic film and zipper strip into separate, product-filled, reclosable or non-reclosable, sealed, pillow style or edge fin seal bags comprising:

a first controlled release festooner arrangement for storing and supplying a continuous, plastic film;

a second controlled release festooner arrangement for storing and supplying a continuous, plastic, zippered cap strip;

a generally vertical fill tube assembly including a vertical fill tube downstream of the first and second storing and supplying festooner arrangements for the continuous film and zippered cap strip and around which the continuous film is wrapped and formed;

feeding means for feeding at least one of the zippered cap strip and plastic film along the length of the vertical fill tube in bag length increments;

vertical sealing means for sealing at least one of the edges of the plastic film to the edges of the zippered cap strip and the edges of the plastic film to one another to form a length of flexible, plastic tube;

a pinch seal assembly downstream of the vertical fill tube for forming first and second horizontal seals across the flexible, plastic tube and for severing the plastic tube, the first horizontal seal defining a downstream edge of a bag about to be filled with product and the second horizontal seal defining an upstream edge of a bag which has already received product; and, said pinch seal assembly being mounted on a rectangular base plate having a central opening for passage of said bags therethrough, said base plate being attached to a rectangular drawer bottom having a central opening for accommodating passage of said bags therethrough and being supported on respective drawer slides allowing said drawer bottom, base plate and pinch seal assembly to be drawn forwardly out of the apparatus for at least one of servicing, maintenance, and indexing of the pinch seal assembly and base plate through 90°.

23. Apparatus as recited in claim 22 further comprising a bag squeezer unit downstream of said pinch seal assembly having opposing squeeze elements for squeezing the excess air from the product-filled, flexible, plastic tube prior to formation of said second horizontal seal and for sequentially releasing each completed, reclosable, product-filled, sealed bag following formation of the second horizontal seal and severing of the bag from the flexible tube.

24. A convertible vertical, form, fill and seal apparatus of the type that operates in conjunction with a product supply apparatus providing product in discrete quantities and that forms a continuous, heat sealable, plastic film into separate, product-filled, sealed, pillow style or edge fin seal bags comprising:

means for storing and supplying the continuous plastic film;

a generally vertical fill tube assembly including a vertical fill tube downstream of the means for storing and supplying the continuous film and around which the continuous film is wrapped and formed;

feeding means for feeding the continuous plastic film along the length of the vertical fill tube in bag length increments with edges of the continuous film in at least one of overlapping relationship and abutting relationship;

vertical sealing means for sealing the edges of the continuous film to one another to form a flexible, plastic tube;

horizontal sealing and severing means downstream of the vertical fill tube for forming upper and lower horizontal seals across the flexible, plastic tube and for severing the plastic tube; and, drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

25. In a vertical, form, fill and seal apparatus including a vertical fill tube, vertical sealing means, and horizontal sealing and severing means and of the type that forms a continuous, heat sealable, plastic film and a continuous, plastic, zippered cap strip into a flexible tube, a three-sided, partially formed, product-filled bag and then into a four-sided, separate, reclosable, product-filled, sealed bag, the improvement comprising:

drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

26. In a vertical, form, fill and seal apparatus including a vertical fill tube, vertical sealing means, and a pinch seal assembly and of the type that forms a continuous, heat sealable, plastic film into a flexible tube and then into separate, sealed bags, the improvement comprising:

said pinch seal assembly being mounted on a rectangular base plate having a central opening for passage of said bags therethrough.

said base plate being attached to a rectangular drawer bottom having a central opening for accommodating passage of said bags therethrough and being supported on respective drawer slides allowing said drawer bottom, base plate and pinch seal assembly to be drawn forwardly out of the apparatus for at least one of servicing, maintenance, and indexing of the pinch seal assembly and base plate through 90°.

27. In a vertical, form, fill and seal apparatus including a vertical fill tube, vertical sealing means, and horizontal sealing and severing means and of the type that forms a continuous, heat sealable, plastic film and a continuous, plastic, cap strip into a flexible tube, a three-sided, partially formed, product-filled bag and then into a four-sided, separate, product-filled, sealed bag, the improvement comprising:

drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

28. In a convertible vertical, form, fill and seal apparatus including a vertical fill tube, vertical sealing means, and a pinch seal assembly and of the type that forms a continuous, heat sealable, plastic film into a flexible tube and then into separate, sealed, pillow type or edge fin seal bags, the improvement comprising:

said pinch seal assembly being mounted on a rectangular base plate having a central opening for passage of said bags therethrough.

said base plate being attached to a rectangular drawer bottom having a central opening for accommodating passage of said bags therethrough and being supported on respective drawer slides allowing said drawer bottom, base plate and pinch seal assembly to be drawn forwardly out of the apparatus for at least one of servicing, maintenance, and indexing of the pinch seal assembly and base plate through 90°.

29. In a convertible vertical, form, fill and seal apparatus including a vertical fill tube, vertical sealing means, and horizontal sealing and severing means and of the type that forms at least one of a continuous, heat sealable, plastic film and a continuous, plastic, zippered cap strip into a flexible tube, a three-sided, partially formed, product-filled bag and then into a four-sided, separate, reclosable or non-reclosable, product-filled, sealed pillow type or edge fin seal bag, the improvement comprising:

drawer means for supporting said horizontal sealing and severing means and including a central opening for accommodating passage of said bags therethrough and providing for horizontal movement of said horizontal sealing and severing means for at least one of servicing, adjustment, replacement, and indexing of said horizontal sealing and severing means through 90°.

30. A method of converting a convertible, vertical, form, fill and seal machine from a machine for making reclosable, edge fin seal, product-filled bags to a machine for making midline overlap seal, pillow type nonreclosable bags comprising the steps of:

changing a bag forming film stock roll in a back of the machine, adjusting a film path length and machine controls for a new bag type, size, product and the like, changing a former and fill tube, using slidable drawer means to index a pinch seal assembly 90° so that respective pinch seal clamping jaws are located in front and behind a plastic tube rather than to right and left sides thereof.

31. The method as recited in claim 30 wherein said indexing of the pinch seal assembly is facilitated by having the entire assembly mounted on a base plate which is itself mounted on a drawer mechanism which allows the pinch seal assembly to be pulled forwardly out of the machine, lifted from the drawer, indexed 90°, set back into the drawer and then pushed back into the machine.

32. A method of moving a pinch seal assembly and base plate unit mounted on a drawer bottom of a slidable drawer means including a drawer front attached to the drawer bottom in a vertical, form, fill and seal machine from a bag production position in the machine to a forward servicing or indexing position, the machine having a supply of plastic film and zipper strip, means for feeding the plastic film and zipper strip through the machine, a machine control system, a machine frame supporting machine components, an electrical quick disconnect in an electrical cable to the pinch seal assembly, a hinged whisker having a movable locking collar, the pinch seal assembly including rear components of a disc, belt and actuator, comprising the steps of:

clearing the plastic film and zipper strip from the area of the pinch seal assembly, shutting off power to the machine control system, loosening threaded fasteners holding the drawer front to the machine frame, uncoupling the electrical quick disconnect and stowing the electrical cable up and out of the way, raising the locking collar up off of a hinge in the whisker to allow a lower end of the whisker to swing out of the way of the rear pinch seal assembly components including the disc, belt and actuator, and then pulling the drawer front forwardly which pulls the base plate drawer bottom, and pinch seal assembly forwardly a desired distance.

33. The method as recited in claim 32 further comprising the steps of indexing the pinch seal assembly and base plate unit 90° by removing four corner bolts to free the base plate from the drawer bottom, lifting the pinch seal assembly and base plate unit sufficiently to clear the drawer front, rotating the unit 90° clockwise, placing the unit back on the drawer bottom, and reattaching the base plate to the drawer bottom using the four bolts.

34. The method as recited in claim 33 further comprising the steps of placing the pinch seal assembly and base plate unit back in an operative pillow type bag production position by pushing the drawer front back toward the machine until the drawer front contacts the machine frame, inserting the bolts, reattaching the electrical cable to the box, sliding the locking collar over the whisker hinge, and turning the power back on to the machine control system.

35. A pinch seal assembly, base plate and drawer unit for a vertical, form, fill and seal machine comprising:

a pinch seal assembly for forming first and second horizontal seals across a flexible plastic tube and for severing the plastic tube between the said horizontal seals;

a rectangular base plate supporting said pinch seal assembly and including a central opening for passage of said plastic tube therethrough;

a rectangular drawer bottom supporting said base plate and including a central opening for passage of said plastic tube therethrough; and, drawer slides supporting said drawer bottom and allowing said drawer bottom, base plate, and pinch seal assembly to be simultaneously moved; whereby said drawer unit indexes said pinch seal assembly 90° in order to form pillow and fin seal type bags.

36. The unit as recited in claim 35 wherein said pinch seal assembly includes quick disconnect means for at least one of electrical, pressurized air and rotary drive elements.

* * * * *

UNITED STATES PATENT AND TRADEMARK OFFICE
CERTIFICATE OF CORRECTION

PATENT NO. : 5,746,043
DATED : May 5, 1998
INVENTOR(S) : Emanuele Terminella et al.

It is certified that error appears in the above-identified patent and that said Letters Patent is hereby corrected as shown below:

Col. 1, line 41, delete "Cl. 53-241);" and substitute --Cl. 53-24);-- therefor;

Col. 2, line 25, after "the" and before "web", delete "is"; and

Col. 8, line 37, after "numeral" insert --10--.

Signed and Sealed this

Twenty-fifth Day of August, 1998

Attest:

BRUCE LEHMAN

*Attesting Officer*     *Commissioner of Patents and Trademarks*